(12) United States Patent
Alexander et al.

(10) Patent No.: US 11,638,935 B2
(45) Date of Patent: May 2, 2023

(54) PRESSURE WASHER SYSTEM

(71) Applicant: FNA Group, Inc., Pleasant Prairie, WI (US)

(72) Inventors: Gus Alexander, Inverness, IL (US); Christopher C. Alexander, Park Ridge, IL (US); Richard J. Gilpatrick, Burlington, WI (US); Robert E. Dowd, Oconomowoc, WI (US); Giles Denham, Kenosha, WI (US); Peter D. Joseph, Mukwonago, WI (US); Michael C. Hansen, Crystal Lake, IL (US); Paulo Rogerio Funk Kolisheski, Gurnee, IL (US)

(73) Assignee: FNA Group, Inc., Pleasant Prairie, WI (US)

( * ) Notice: Subject to any disclaimer, the term of this patent is extended or adjusted under 35 U.S.C. 154(b) by 722 days.

(21) Appl. No.: 16/561,954

(22) Filed: Sep. 5, 2019

(65) Prior Publication Data

US 2020/0197983 A1 Jun. 25, 2020

Related U.S. Application Data

(60) Provisional application No. 62/781,765, filed on Dec. 19, 2018.

(51) Int. Cl.
| | |
|---|---|
| *B08B 3/02* | (2006.01) |
| *F04B 17/05* | (2006.01) |
| *H01M 50/244* | (2021.01) |
| *H01M 50/247* | (2021.01) |
| *F04B 17/06* | (2006.01) |
| *H01M 50/20* | (2021.01) |

(52) U.S. Cl.
CPC ............ *B08B 3/02* (2013.01); *F04B 17/05* (2013.01); *H01M 50/244* (2021.01); *H01M 50/247* (2021.01); *B08B 3/026* (2013.01); *F04B 17/06* (2013.01); *H01M 50/20* (2021.01); *H01M 2220/30* (2013.01)

(58) Field of Classification Search
CPC .. H01M 50/20; H01M 50/247; H01M 50/213; H01M 50/244; H01M 2220/30; F04B 17/06; F04B 17/05; B08B 3/02; B08B 3/026; Y02E 60/10
See application file for complete search history.

(56) References Cited

U.S. PATENT DOCUMENTS 11,035,521 B2 * 6/2021 Pierce .................... B05B 15/58
2005/0191183 A1 * 9/2005 Kawakami ............. F04B 49/02
417/34

(Continued)

*Primary Examiner* — Benjamin L Osterhout
(74) *Attorney, Agent, or Firm* — Brian J. Colandreo; Jeffery T. Placker; Holland & Knight LLP

(57) ABSTRACT

A pressure washer system includes a fluid pump having a fluid inlet and a fluid outlet. A flow sensor is in fluid communication with one of the fluid inlet and the fluid outlet. An internal combustion engine is in driving communication with the fluid pump. A control module is mounted to the fluid pump. The control module is configured to receive an indication of flow through the fluid pump and to control a starting operation of the internal combustion engine to start the internal combustion engine in response to receiving the indication of flow through the fluid pump when the internal combustion engine is not running.

30 Claims, 35 Drawing Sheets

(56) References Cited

U.S. PATENT DOCUMENTS

| | | | |
|---|---|---|---|
| 2013/0092745 A1* | 4/2013 | Karp | B08B 3/026 239/70 |
| 2013/0111865 A1* | 5/2013 | Hansen | F04B 17/06 56/11.3 |
| 2013/0343906 A1* | 12/2013 | Funke | F02N 11/101 417/10 |
| 2014/0203102 A1* | 7/2014 | Gilpatrick | A01G 25/145 239/68 |
| 2014/0299089 A1* | 10/2014 | Koenen | F04B 17/05 123/179.28 |
| 2016/0115933 A1* | 4/2016 | Koenen | A01D 34/001 290/38 R |
| 2018/0029056 A1* | 2/2018 | Alexander | F04B 49/02 |
| 2019/0341826 A1* | 11/2019 | Zeiler | H02K 7/003 |
| 2020/0001313 A1* | 1/2020 | Bindl | B05B 12/006 |

* cited by examiner

FIG. 20 Spare Input / Output

PRESSURE WASHER SYSTEM

CROSS-REFERENCE TO RELATED APPLICATIONS

This application claims the benefit of U.S. provisional patent application Ser. No. 62/781,765, filed on Dec. 19, 2018, entitled "Pump Mounted Starting System And Flow Detection Device," the entire disclosure of which is incorporated herein by reference.

TECHNICAL FIELD

The present disclosure generally relates to pressure washer systems, and more particularly to pressure washer systems including automated starting functionality.

BACKGROUND

Many domestic and commercial water usage applications may require relatively high pressures, which may be beyond the capacity of residential and/or municipal water distribution and supply systems. For example, heavy duty cleaning applications may benefit from increased spraying pressure that is greater than the pressure available from common residential and/or municipal water distribution and supply systems. In some situations, various nozzles may be utilized to constrict the flow of the water to provide an increase in the pressure of the resultant water stream. However, many tasks may benefit from even greater pressures than can be achieved with common pressure nozzles that may be attached to a hose. In such circumstances pressure washers may be utilized, in which a power driven pump may be employed to increase the pressure significantly above pressures that are readily achievable using hose attachments. Such elevated pressures may increase the efficiency and/or effectiveness of some cleaning and spraying tasks.

While the increase in pressure that may be provided by a pressure washer may be useful for many applications, in many circumstances the demand for the pressurized water may be intermittent, or required on a stop and go basis. Often the intermittent demand for the pressurized water may be satisfied by manually starting an engine driving the pressure washer when the pressurized water is needed, and stopping the engine during time periods when the pressurized water is not needed. However, the need to continually start and stop the engine can often be viewed as burdensome or inconvenient.

SUMMARY

According to one implementation a pressure washer system may include a fluid pump having a fluid inlet and a fluid outlet. A flow sensor may be in fluid communication with one of the fluid inlet and the fluid outlet. The pressure washer system may also include an internal combustion engine in driving communication with the fluid pump. The pressure washer system may further include a control module mounted to the fluid pump. The control module may be configured to receive an indication of flow through the fluid pump and to control a starting operation of the internal combustion engine to start the internal combustion engine in response to receiving the indication of flow through the fluid pump when the internal combustion engine is not running.

One or more of the following features may be included. The control module may be mounted to the fluid pump by one or more vibration isolating members. The one or more vibration isolating members may include respective rubber bushings attached to a control module mounting bracket about an exterior of the rubber bushings, and a compression sleeve extending through a generally central portion of the rubber bushings for receiving fasteners affixing the control module mounting bracket to the fluid pump. The control module may be disposed within a cavity of a control module housing. The control module housing may include a battery interface for removably mechanically coupling a battery to the control module housing, and removably electrically coupling the battery to the control module.

The flow sensor may include a sensor chamber having a fluid inlet associated with a lower region of the sensor chamber and a fluid outlet associated with an upper region of the sensor chamber to define a fluid pathway through the sensor chamber. A blocking element may be disposed within the fluid chamber. The blocking element may rest adjacent the lower region of the sensor chamber in a no-flow condition. The blocking element may be raised toward the upper region of the sensor chamber during flow of fluid through the sensor chamber. A sensing assembly may include an optical transmitter and an optical receiver defining an optical pathway through the sensor chamber. The blocking element may at least partially obstruct the optical pathway in the no-flow condition. The blocking element may be at least partially outside of the optical pathway during flow of fluid through the sensor chamber. The upper region of the sensor chamber may include one or more channels to facilitate passage of fluid through the fluid outlet during flow of fluid through the sensor chamber. The blocking element may have a specific gravity of between about 1.09 to about 1.20.

A sensor calibration module may be configured to provide power to the optical transmitter causing the optical transmitter to generate an optical signal based upon the power. The sensor calibration module may be configured to measure an output of the optical receiver in response to receiving the optical signal. The sensor calibration module may be further configured to adjust the power to the optical transmitter to achieve the output of the optical receiver having one or more of a predefine threshold and a predefined threshold range. The sensor calibration module may be configured to adjust the power to the optical transmitter based upon, at least in part, historically measured outputs of the optical receiver in response to receiving the optical signal. The control module may include the sensor calibration module.

The control module may include a processor and a memory coupled with the processor. The processor may be configured to execute computer program code including instructions for monitoring one or more system characteristics. The computer program code may also include instructions for defining a plurality of discrete operating states of the pressure washer system. The computer program code may also include instructions for transitioning the pressure washer system between the plurality of discrete operating states based upon, at least in part, one or more of the one or more system characteristics, and one or more user interactions with the pressure washer system. The one or more system characteristics include one or more of flow through the flow sensor, engine speed of the internal combustion engine, battery voltage of a battery coupled with the control module, battery current of the battery coupled with the control module, ambient temperature of the control module, and temperature of the battery coupled with the control module.

The plurality of discrete operating states comprise one or more of an idle state, a ready state, a run state, an off state, a fault state, and an event state. The idle state may define a state during which the control module is powered, one or more self tests are performed, and is awaiting a user input indicating an intent to begin operation of the pressure washer system. The ready state may define a state during which the control module may start the internal combustion engine in response to receiving the indication of flow through the pump. The run state may define a state during which the internal combustion engine is running. The off state may define a state during which the control module is not actively controlling the pressure washer system. The fault state may define a state during which the control module has detected a failure of one or more tested operating conditions. The event state may define a state during which the control module has identified one or more actionable operating conditions.

The control module may be further configured to provide power to a starter associated with the engine as a pulse width modulated signal having a first duty cycle at a first time period. The control module may further be configured to provide power to the starter as a pulse width modulated signal having a second duty cycle at a second time period. The second duty cycle may be greater than the first duty cycle, and the second time period may occur after the first time period. Providing the power at the second pulse width modulated duty cycle may include incrementally increasing the duty cycle over a period of time.

The control module may be further configured to measure a current of the power provided to the starter during one or more of the first time period and the second time period. Measuring the current may include sampling the current of the power provided to the starter at a sampling frequency substantially greater than a cycle rate of the pulse width modulated signal. A sample of the current may be stored. The control module may further iteratively compare a subsequent sample of the current to the stored sample of the current. If the subsequent sample of the current is greater than the stored sample of the current, the control module may store the subsequent sample of the current and discard the earlier sample of the current.

The control module may include a tilt sensor. The control module may be configured to determine if the internal combustion engine is running. The control module may disable the tilt sensor when the internal combustion engine is running, and may enable the tilt sensor when the internal combustion engine is not running. The control module may be further configured to prevent starting of the internal combustion engine in response to the tilt sensor detecting a tilt angle greater than a predetermined threshold. Disabling the tilt sensor may include one or more of not acting on a signal from the tilt sensor, and depowering the tilt sensor. Enabling the tilt sensor may include one or more of acting on a signal from the tilt sensor, and powering the tilt sensor.

The control module may include an engine shutdown module configured to stop the internal combustion engine from a running state in response to a signal from a processor of the control module. The engine shutdown module may include a TRIAC coupled with a magneto of the internal combustion engine to short the magneto to ground when the TRIAC is triggered. The engine shutdown module may also include an opto-TRIAC configured to trigger the TRIAC in response to receiving the signal from the processor.

According to another implementation, a pressure washer system may include a fluid pump having a fluid inlet and a fluid outlet. The pressure washer system may also include a flow sensor including a sensor chamber in fluid communication with one of the fluid inlet and the fluid outlet. The flow sensor may also include an optical transmitter and an optical receiver defining an optical pathway through the sensor chamber. The flow sensor may further include a blocking element configured to be at least partially disposed within the optical pathway in the absence of fluid flow through the sensor chamber and to be at least partially removed from the optical pathway during fluid flow through the sensor chamber. The pressure washer system may also include an internal combustion engine in driving communication with the fluid pump. A control module may be mounted to the fluid pump by one or more vibration isolating members. The control module may be configured to receive a flow signal from the optical receiver when the blocking element is at least partially removed from the optical pathway. The control module may also be configured to initiate a starting operation of the internal combustion engine in response to receiving the flow signal when the internal combustion engine is not running.

One or more of the following features may be included. The control module may be further configured to provide power to the optical transmitter causing the optical transmitter to generate an optical signal based upon, at least in part, the power. The control module may be configured to measure an output of the optical receiver in response to receiving the optical signal. The control module may also be configured to adjust the power to the optical transmitter to achieve the output of the optical receiver within a predefined range. When the internal combustion engine is running, the control module may be configured to shut down the internal combustion engine at a predetermined time after the flow signal is no longer being received.

Initiating the starting operation of the internal combustion engine may include providing power to a starter associated with the internal combustion engine as a pulse width modulated signal having a first duty cycle at a first time. A duty cycle of the pulse width modulated signal may be incrementally increased to achieve a second duty cycle at a second time that is after the first time.

The control module may include a tilt sensor. The control module may be configured to determine if the internal combustion engine is running. The control module may disable the tilt sensor when the internal combustion engine is running. The tilt sensor may be enabled when the internal combustion engine is not running. The control module may be configured to prevent starting of the internal combustion engine in response to the tilt sensor detecting a tilt angle greater than a predetermined threshold. The control module may include a processor and a memory coupled with the processor. The processor may be configured to execute computer program instructions for monitoring one or more system characteristics. Instructions may also be included for defining a plurality of discrete operating states of the pressure washer system. Instructions may further be included for transitioning between the plurality of discrete operating states based upon, at least in part, one or more of the one or more system characteristics.

According to another implementation, a pressure washer system may include a fluid pump having a fluid inlet and a fluid outlet. The pressure washer system may also include a flow sensor in fluid communication with one of the fluid inlet and the fluid outlet. The pressure washer system may also include an internal combustion engine in driving communication with the fluid pump. The pressure washer system may also include a control module mounted to the fluid pump. The control module may be configured to receive an indication of flow through the fluid pump and to control a starting operation of the internal combustion engine to start the internal combustion engine in response to receiving the indication of flow through the fluid pump when the internal combustion engine is not running. The pressure washer system may further include a mounting platform mounted to one or more features of the pressure washer system. The mounting platform may at least partially define a battery receiver. The control module may be mounted to the mounting platform.

One or more of the following features may be included. The control module may be at least partially separated from the battery by the mounting platform. The mounting platform may be mounted to one or more of the fluid pump, the internal combustion chamber, a pressure washer chassis, a pressure washer housing, and a pressure washer trailer. The control module may be configured to be electrically coupled with the battery via one or more electrical conductors. The battery receiver may be configured for removably retaining the battery.

DETAILED DESCRIPTION

In general, the present disclosure may provide an engine driven pressure washer system capable of on-demand starting of the engine. As such, high pressure capabilities can be provided, when needed. However, it may not be necessary to continuously run the engine, for example, when high pressure water is not desired. Additionally, the need to manually restart and shut off the engine may be avoided. Various additional features, objectives, and advantages that may be realized in some embodiments consistent with the present disclosure will be appreciated in view of the following description and the associated drawings.

Figure 1:
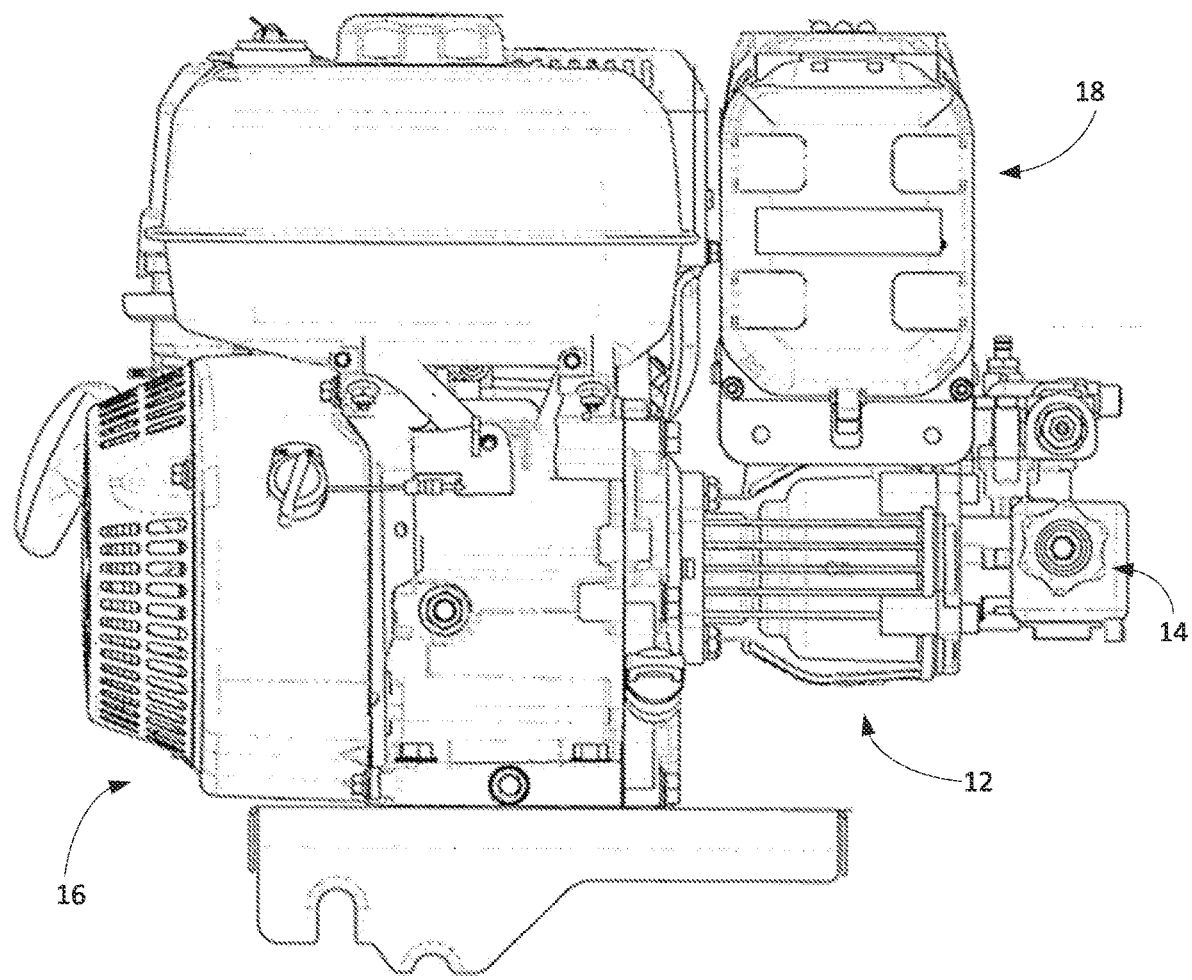
FIG. 1 depicts a pressure washer system, according to an example embodiments.

Referring to FIG. 1, an illustrative example embodiment of a pressure washer system 10 is shown. In general, the pressure washer system 10 may include a fluid pump 12 having a fluid inlet and a fluid outlet (not shown). The pressure washer system may also include an internal combustion engine 14 in driving communication with the fluid pump 12. A flow sensor 16 may be in fluid communication with one of the fluid inlet and the fluid outlet of the fluid pump 12. The pressure washer system 10 may further include a control module (which may be at least partially contained within housing 18) mounted to the fluid pump 12. The control module may be configured to receive an indication of flow through the fluid pump and to control a starting operation of the internal combustion engine 14 to start the internal combustion engine 14 in response to receiving the indication of flow through the fluid pump when the internal combustion engine is not running. It will be appreciated that a pressure washer system may include various other components and/or features (such as various frames or other mounting components, covers or housing, hose and/or gun storage arrangements, and the like), which have not been depicted in FIG. 1 for the sake of simplicity and understanding.

According to various embodiments, the fluid pump 12 may include any suitable pump capable of being driven by the internal combustion engine (herein also referred to as the "engine") to convey a fluid at a higher pressure and/or higher flow rate than an inlet fluid supply to the fluid pump. Illustrative examples of the fluid pump may include, but are not limited to, piston pumps, gear pumps, impeller pumps, and the like. In one specific illustrative example, the fluid pump may include an axial piston pump, in which one or more individual pistons may be driven by a fixed, or variable, angle rotationally driven swashplate. During use, the fluid inlet of the fluid pump may be coupled with any suitable fluid supply, such as a garden hose associated with a domestic or commercial water supply, a tank, a reservoir, or the like. The engine 14 may include any suitable internal combustion engine that may drive the fluid pump 12. Examples of suitable engines may include, but are not limited to, gasoline engines, diesel engines, propane engines, and the like. An electric starter (not shown) may be associated with the engine 14 to effectuate starting of the engine. As is generally known, the starter may include an electric motor capable of driving the engine to effectuate starting. The starter may, in some embodiments, include one or more actuating arrangements, e.g., which may selectively engage the starter with the engine during starting, and disengage the starter from the engine when the engine is not being started. The one or more actuating arrangements may include any suitable actuating arrangement, as is generally known.

Additionally, in some embodiments the internal combustion engine may be manually started by a user, e.g., without utilizing the on-demand capabilities of the pressure washer system. For example, the engine may include a pull-cord recoil starting system that may allow a user to manually start the engine. Additionally and/or alternatively, the pressure washer system may allow a user to manually engage the electric starter for starting the engine. Manually engaging the electric starter may be implemented in any suitable manner, e.g., a push-button, key switch, or other suitable switch gear for engaging the electric starter (e.g., energizing the electric starter for starting the engine). In various implementations, the switch gear for manually engaging the electric starter may be associated with the control module, may be mounted on the engine itself (and/or a housing or component thereof), may be mounted on a frame or chassis associated with the pressure washer system, or otherwise suitably provided. As noted above, manually starting the engine may allow the pressure washer to be operated without using the on-demand capabilities of the pressure washer system. In some embodiments, even if a user has utilized manual starting of the engine, the user may subsequently elect to take advantage of the on-demand capabilities of the pressure washer system, and elect for automatic starting of the engine.

As shown in FIG. 1, in some embodiments, the control module (e.g., within housing 18, in some illustrative embodiments) may be mounted to the fluid pump 12. In some embodiments, mounting the control module to the fluid pump may provide a number of particular advantages. For example, when the control module is mounted to the fluid pump, it may be possible to implement the same fluid pump/control module assembly in connection with a variety of different engines and/or different configurations, without requiring a different mounting solution for each engine or configurations. The same fluid pump and control module may be coupled with a variety of different engines, such as engines having different dimensions, different power ratings, provided by different engine manufacturers, and the like, and may therefore provide an array of pressure washer systems. Each different engine may have a different arrangement, location, size, and/or selection of features and shapes. Further, as shown in FIG. 1, in some embodiments, the fluid pump 12 and the engine 14 may be arranged in a horizontal configuration, e.g., with the drive shaft of the engine and the fluid pump having a generally horizontal orientation. In other embodiments, the fluid pump and the engine may be arranged in a vertical configuration, e.g., with the drive shaft of the engine and the fluid pump having a generally vertical orientation. In an embodiment in which the control module is mounted to the fluid pump (e.g., as opposed to being mounted to the engine or a frame of the pressure washer system), the fluid pump and control module may be used in connection with any such engine variety and/or configuration without the need for a different mounting arrangement of the control module for every such engine variety and/or configuration. That is, the same mounting solution for the control module to the fluid pump may be utilized across a number of different pressure washer systems. Additionally, in some embodiments, the control module may be communicatively coupled with the flow sensor 16 by way of a wired connection and/or a wireless connection (e.g., Bluetooth, Bluetooth Low Energy, Wi-Fi, and/or any other suitable wireless communication technology). In such an embodiment, the length of the wiring harness may be reduce, as compared to a situation in which the control module is mounted to the engine and/or a frame of the pressure washer. Further, As the location of the flow sensor 16 relative to the fluid pump 12 may be same across a variety of different fluid pump/engine varieties and/or configurations, in some embodiments, a common wiring harness may be utilized for connecting the control module and the flow sensor. Accordingly, in some embodiments, mounting the control module to the fluid pump may reduce the number of different components that may be necessary to accommodate different pressure washer systems (e.g., having different engines and/or configurations), and may provide an overall greater simplicity.

The control module may be mounted to the fluid pump by one or more vibration isolating members. In some embodiments, the one or more vibration isolating members may reduce and/or dampen the vibration and/or mechanical stress experienced by the control module. For example, during operation the engine and the fluid pump may generate a significant amount of vibration from the engine, as well as from the fluid pump (e.g., which may include vibration transmitted to the fluid pump, as well as vibration generated by the fluid pump itself). In some embodiments, the one or more vibration isolating members may at least partially reduce and/or dampen the radial, axial, and/or thrust stresses experienced by the control module as a result of the operation of the engine and/or the fluid pump. Reducing the vibration and/or mechanical stress experienced by the control module may increase the useful service life and/or decrease the failure rate of the control module. Additionally, in some embodiments, the one or more vibration isolating members may provide at least some degree of thermal isolation between the control module and the fluid pump and/or the engine. Similar to reducing vibration and/or mechanical stresses experienced by the control module, providing some degree of thermal isolation between the control module and the fluid pump and/or engine may increase the useful service life and/or decrease the failure rate of the control module.

Figure 2:
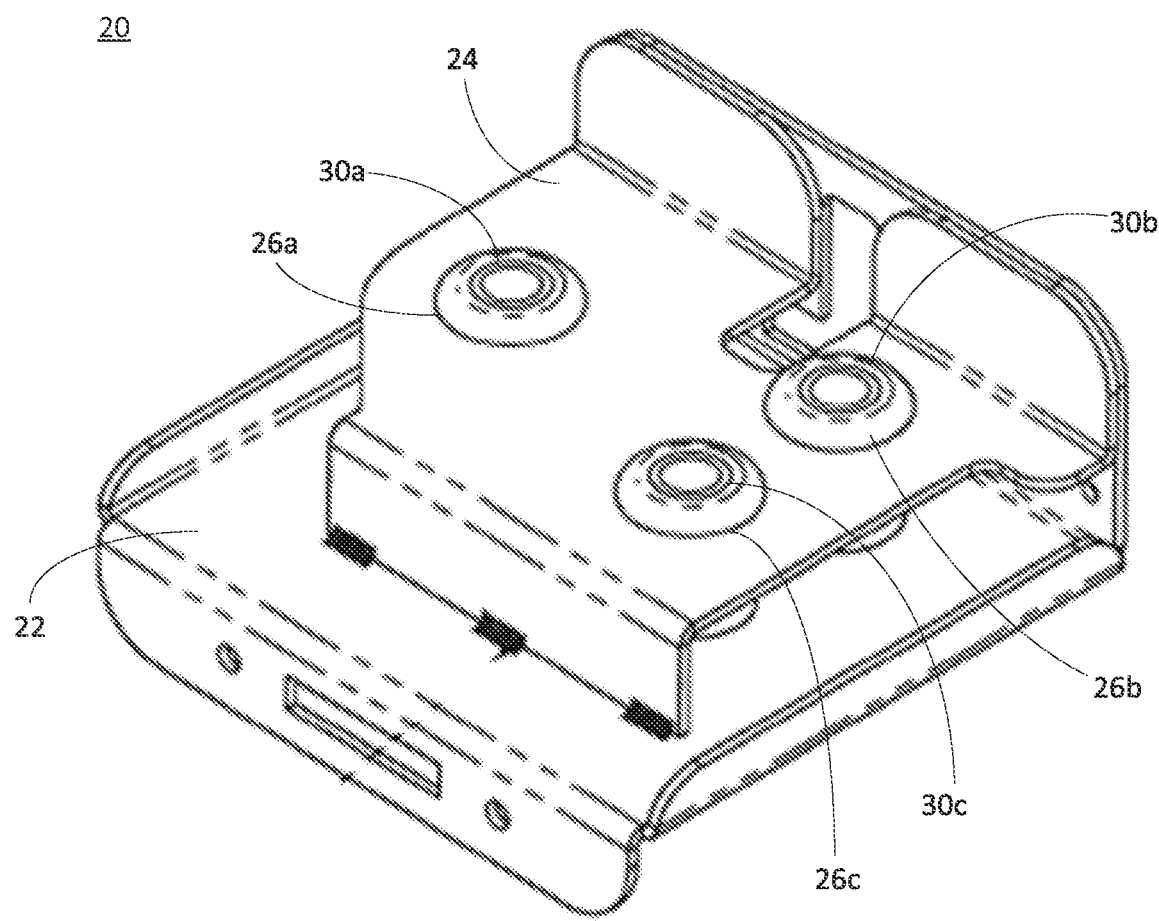
FIG. 2 depicts a bottom perspective view of an example embodiment of a control module mounting bracket including an example embodiment of vibration isolation members.
Figure 3:
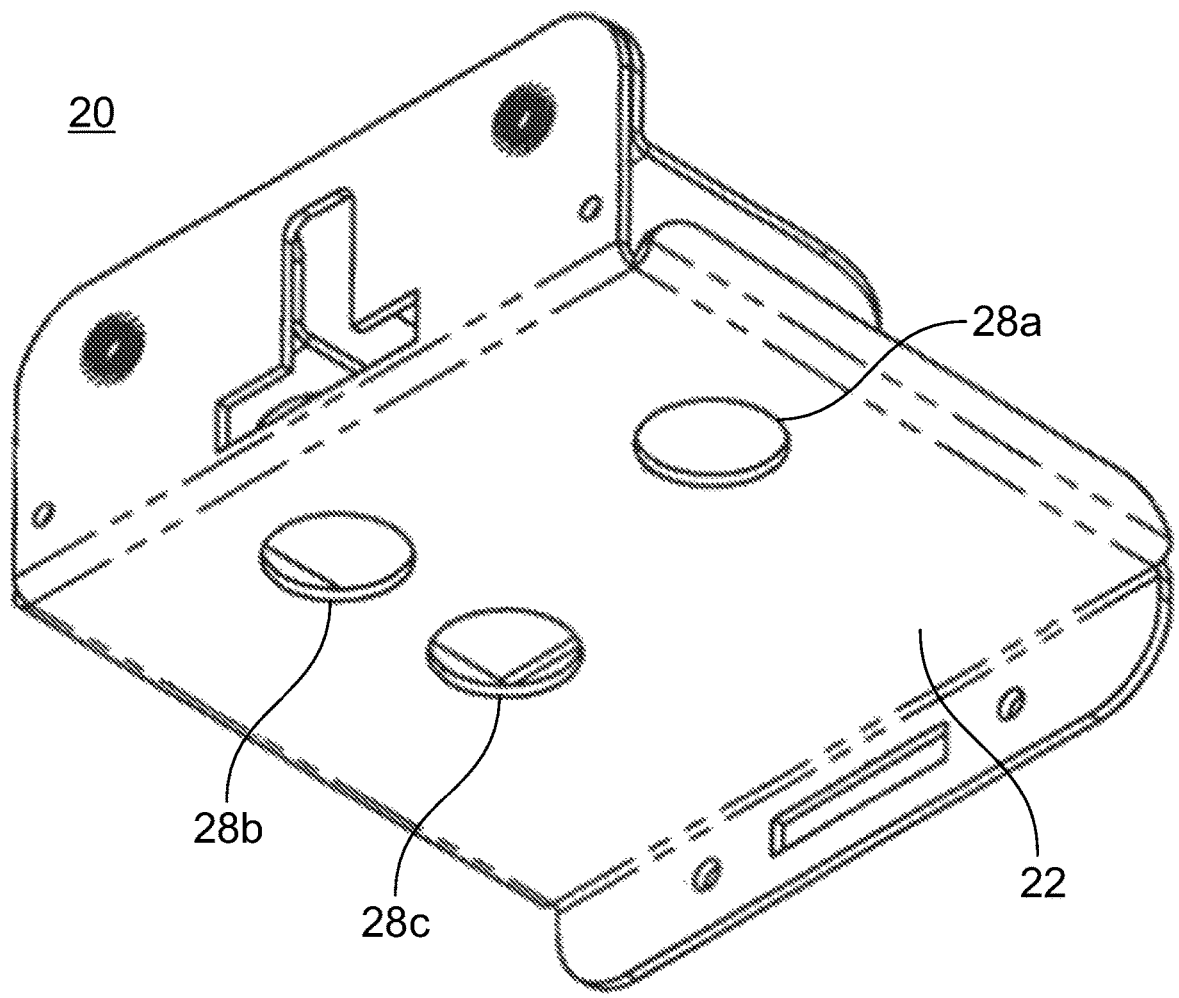
FIG. 3 depicts a top perspective view of the example embodiment of a control module mounting bracket shown in FIG. 2.
Figure 4:
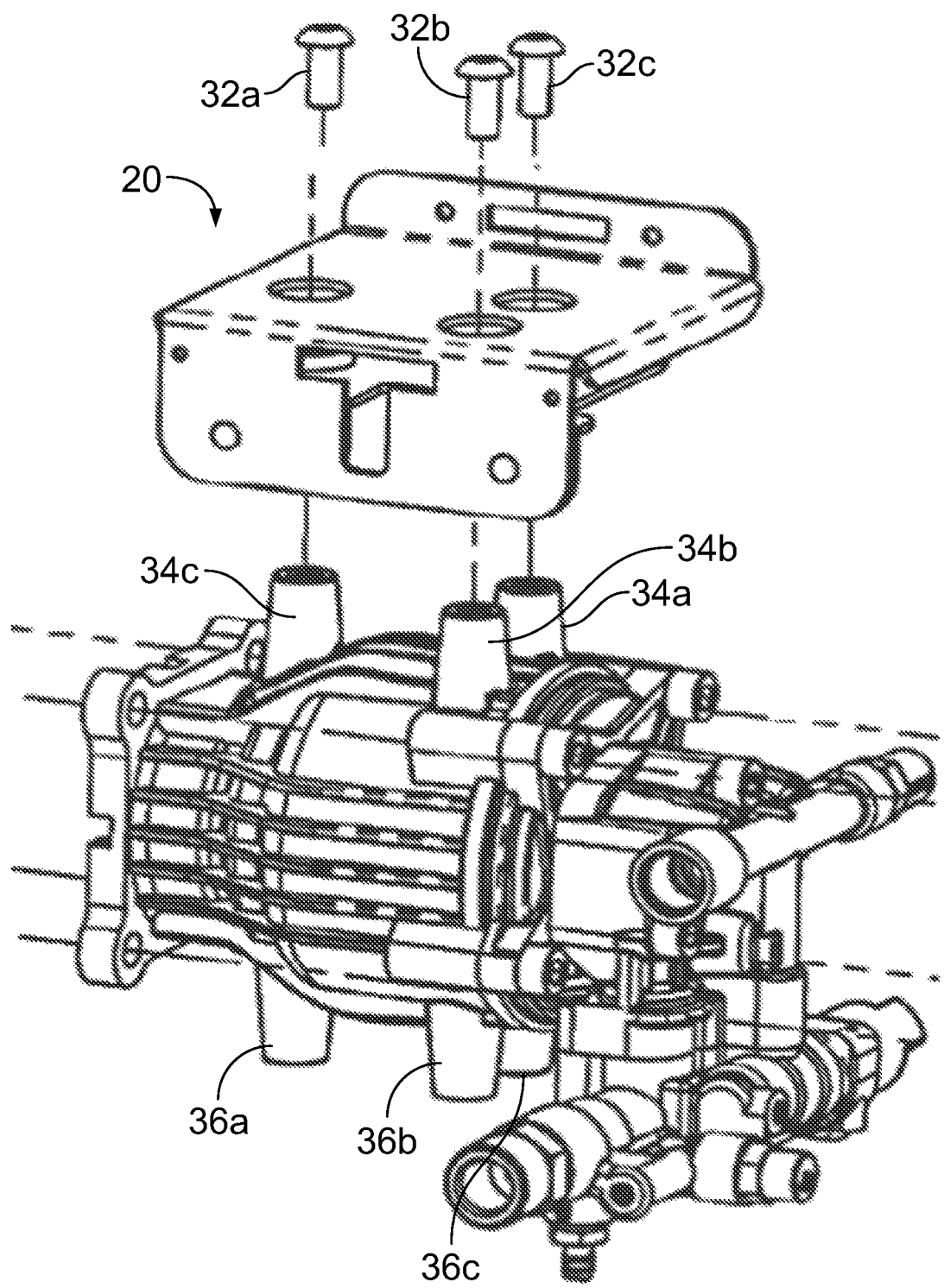
FIG. 4 depicts an exploded view of the example embodiment of a control module mounting bracket of FIG. 2 arranged for mounting to an example embodiment of a fluid pump, according to an example embodiment.

In an illustrative example embodiment, the one or more vibration isolating members may include respective rubber bushings attached to a control module mounting bracket about an exterior of the rubber bushings. For example, and referring to FIGS. 2 through 4, an embodiment of a mounting bracket 20 for mounting the control module to the fluid pump is shown. In the depicted embodiment, the mounting bracket may generally include a tray 22, e.g., to which a control module (e.g., such as may be at least partially contained within a housing) may be attached. The mounting bracket may further include a mounting plate 24 affixed to/integral with, the tray 22. As shown, the mounting plate 24 may include three rubber bushings 266a-c. The rubber bushings 26a-c may be pressed into corresponding holes in the mounting plate, such that the bushings may be attached to the mounting bracket about an exterior of the bushings. In some embodiments, the bushings may include a groove, which may fit over at least a portion of the mounting plate, e.g., to capture the bushings to the mounting and to prevent axial separation of the bushings from the mounting bracket. While the example embodiment of FIGS. 2 through 4 is shown including three rubber bushings, it will be appreciated that a greater or lesser number of bushings could suitably be used. In the illustrative embodiment, the tray 22 may include clearance holes 28a-c generally corresponding to the three rubber bushings 26a-c. As shown in FIG. 4, the clearance holes 28a-c may facilitate fastening the mounting bracket 22 to the fluid pump 12. Additionally, because the mounting plate 24 is spaced from the tray 22, when the mounting bracket 20 is attached to the fluid pump 12 (e.g., using screws or other suitable fastening arrangement), the tray 22 may provide a generally flat surface, which may be unobstructed by protruding screw heads.

In some embodiments, the rubber bushings 26a-c may each include a compression sleeve 30a-c extending through a generally central portion of the rubber bushings for receiving fasteners (e.g., screws 32a-c) affixing the control module mounting bracket 20 to the fluid pump 12. The compression sleeves 30a-c may allow the screws 32a-c to be appropriately torqued to the fluid pump 12, without unduly compressing the rubber bushings 26a-c. By avoiding unduly compressing the rubber bushings 26a-c, the vibration isolating character of the rubber bushings 26a-c may be maintained and/or minimally degraded.

While a particular illustrative embodiment of a mounting bracket has been shown and described, it will be appreciated that a variety of alternative configurations of mounting brackets including vibration isolation members may be utilized without departing from the present disclosure. Additionally, the fluid pump may include more than one set of mounting features (e.g., bosses), which may allow the mounting bracket to be secured in different positions and/or orientations on the fluid pump (e.g., to accommodate use with different engines and/or engine configurations). For example, as shown in FIG. 4, the mounting bracket 20 is depicted in an arrangement to be mounted to bosses 34a-c of the fluid pump 12. As further shown, in some embodiments, the fluid pump 12 may include one or more additional sets of bosses (e.g., bosses 36a-c), which may allow the mounting bracket (and thereby the control module) to be mounted to the fluid pump at a different location, position, and/or orientation. Various additional and/or alternative configurations may similarly be implemented.

Figure 5:
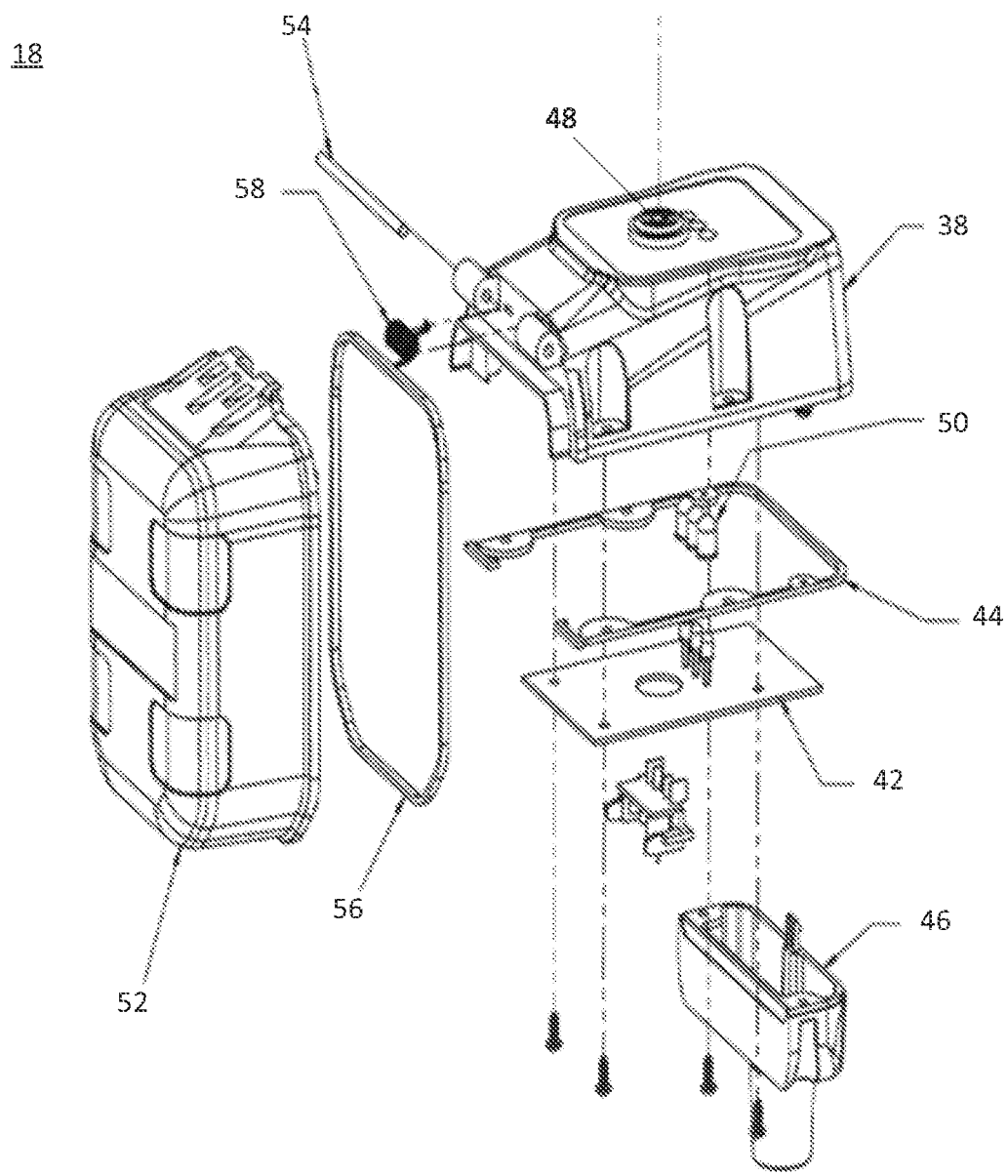
FIG. 5 depicts an exploded view of an example embodiment of a control module housing.
Figure 6:
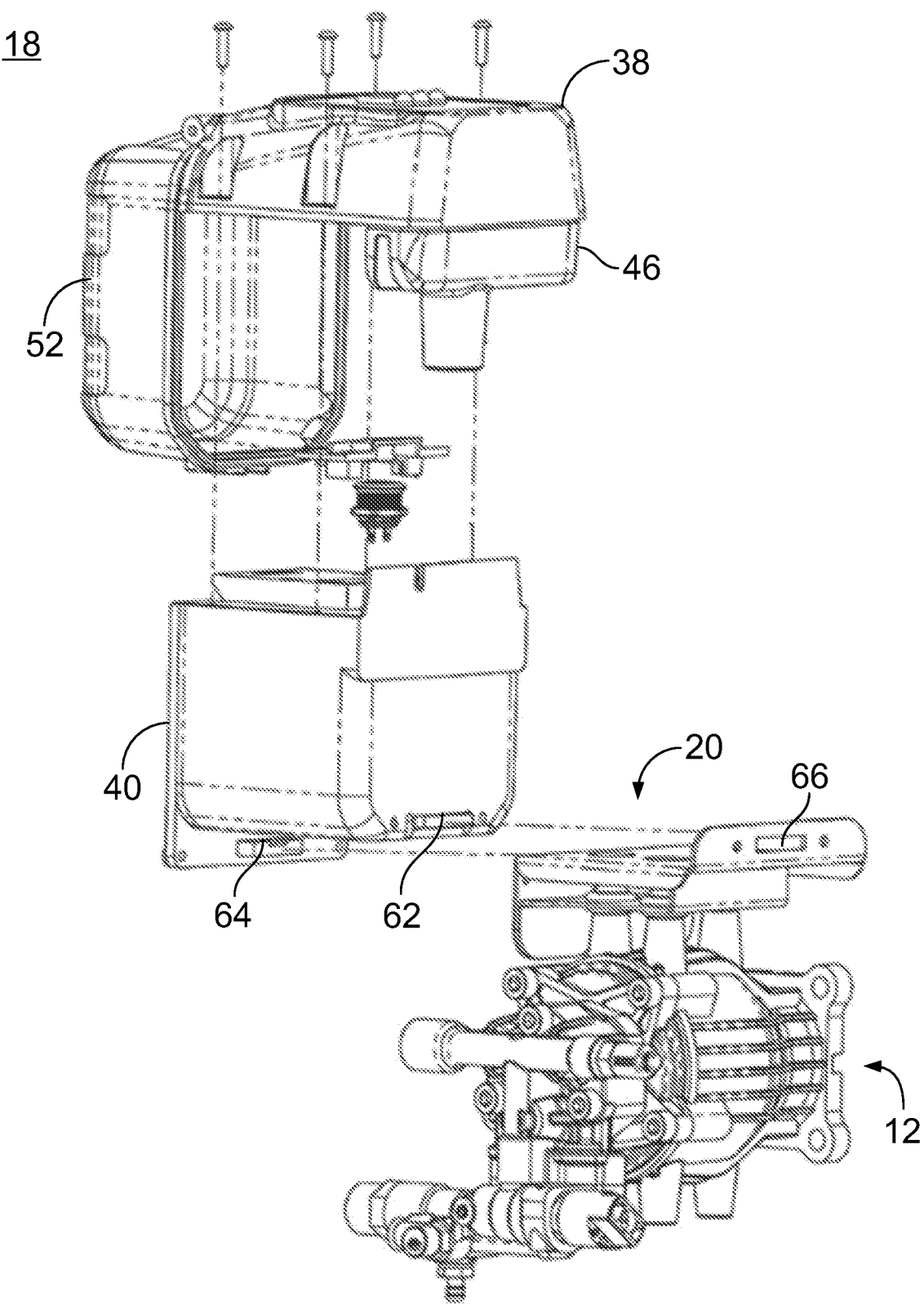
FIG. 6 depicts a partial exploded view of the example embodiment of a control module housing of FIG. 5 arranged for attaching to an example embodiment of a fluid pump by way of the example embodiment of a control module mounting bracket shown in FIGS. 2 through 4.
Figure 7:
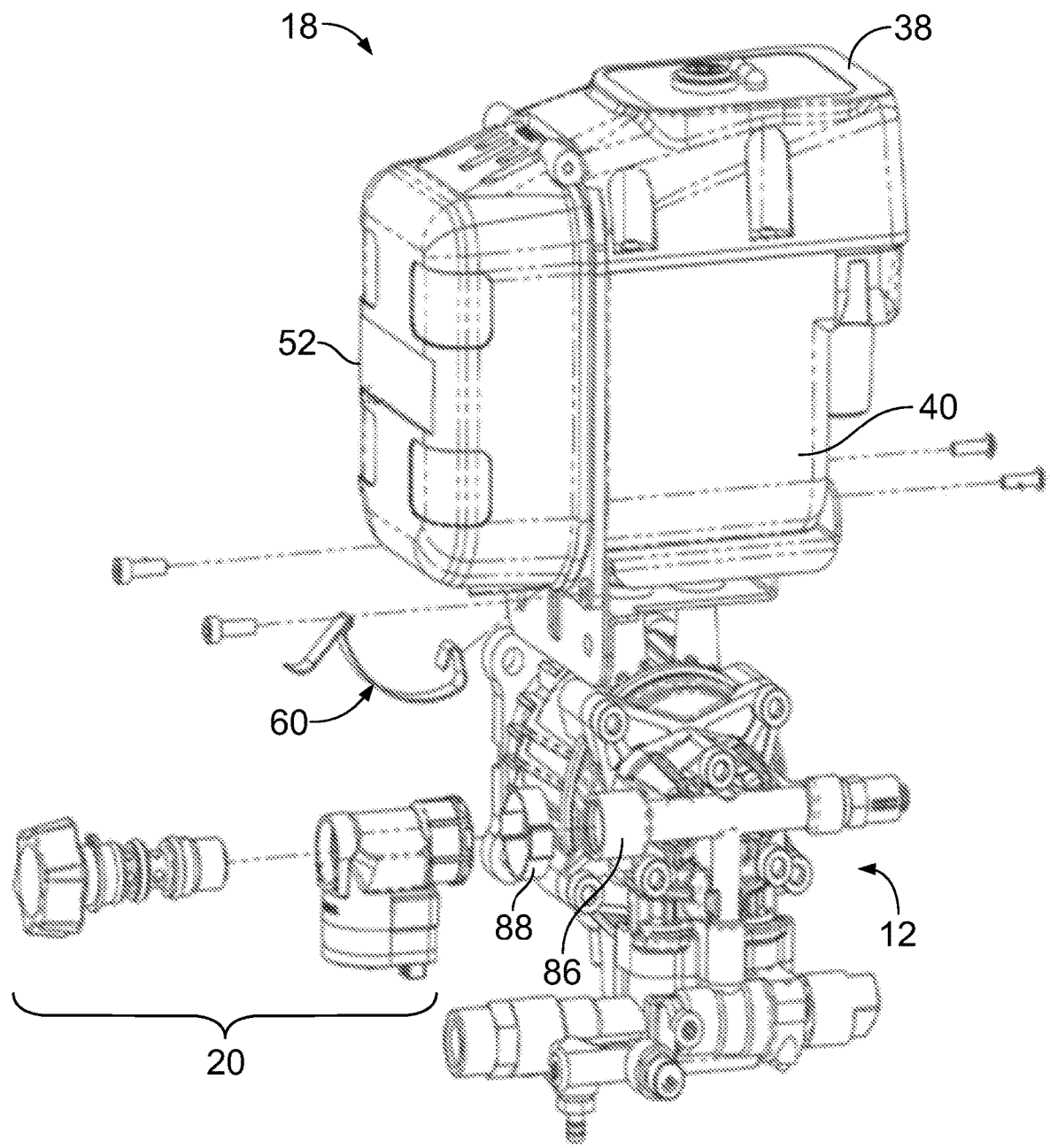
FIG. 7 depicts the control module housing of FIG. 6 in an assembled configuration.

The control module may be disposed within a cavity of a control module housing. The control module may include, in some embodiments, a printed circuit board (PCB), or more than one circuit board, that may include the necessary circuitry and hardware required to implement the various functionality of the control module. In order to minimize the risk of damage to the control module, the PCB may be disposed within a housing to provide protection against environment conditions and physical damage. Referring to FIGS. 5 through 7, an illustrative example embodiment of a housing 18 for the control module is shown. As depicted in the illustrated embodiment, the housing 18 may include one or more housing portions (e.g., top housing 38 and bottom housing 40), which may together define a cavity for containing the control module (e.g., which may, at least in part, be embodied in PCB 42). In some embodiments, the housing portions may be sealed together (e.g., via a gasket 44, an adhesive, or other suitable seal) to render the cavity weather and/or water resistant, thereby improving the protection for the PCB 42. As shown, in some implementations, the housing may further include a component 46 that may allow for the organizing and/or routing of any necessary wiring from the control module to external components (e.g., such as the starter and the flow sensor). The routing of wiring from the housing may be provide strain relieve (e.g., to prevent and/or reduce the transmission of physical strain from the wiring to the PCB), and may be sealed (e.g., to reduce the ingress of water and/or foreign debris into the cavity). In some embodiments, wiring from the control module may be sealed at the point of exit from the housing, and may be weather protected along at least a portion of the length of the wiring (including the entirety of the length of the wiring).

Continuing with the example housing 18, top housing 38 may include one or more user interface features. For example, as shown, top housing 38 may include one or more buttons or switches (e.g., button 48) that may be used to interact with the control module and/or to implement other functionality of the pressure washer system (e.g., directly starting and/or stopping the engine. The button 48 may include a button associated with the top housing 38 (e.g., which may be electrically coupled with the control module), and/or the button 48 may include a pusher that may be positioned to actuate a button mounted on the PCB 42, or otherwise disposed within the housing cavity. Consistent with either implementation, the button may be at least partially sealed, e.g., to maintain the weather resistance/water resistance of the housing cavity. The housing may also include one or more display features such as LEDs, display screens, or the like. For example, as shown in the illustrated example embodiment, one or more LED windows 50 may be provided in the top housing 38, such that the state of one or more corresponding LEDs on the PCB 42 may be perceived from the exterior of the housing 18. Additionally/alternatively one or more LEDs may be directly associated with the top housing 38, and may be electrically connected to the PCB (e.g., rather than being directly mounted on the PCB). In a similar manner as the button, the LED windows 50 may be sealed to the housing, and/or otherwise configured to maintain the weather resistance/water resistance of the housing cavity. It will be appreciated that various additional and/or alternative user interface features, and/or combinations of user interface features may be associated with the housing and/or the The control module housing may include a battery interface for removably mechanically coupling a battery to the control module housing, and removably electrically coupling the battery to the control module. For example, the pressure washer system may utilize a battery for powering the control module and the starter for the engine, as well as any additional electrical/electromechanical features of the power washer system. In some embodiments, the battery may include a removable/replaceable battery. While any suitable battery technology may be utilized in connection with the present disclose, in some embodiments the battery may include a lithium ion battery (e.g., a nickel magnesium cobalt batter, a lithium iron phosphate battery, or other suitable battery chemistry). In some particular embodiments, the lithium ion battery may include a battery of the variety commonly used to power battery operated tools and/or equipment. As is generally known, such batteries often make use of mechanical and electrical interface in which the battery electrical contacts may electrically couple with corresponding electrical contacts of the battery powered equipment (e.g., cooperating spring contacts), and interacting spring loaded mechanical tabs and receptacles of the battery and battery powered equipment mechanically retain the battery to the battery powered equipment. Embodiments consistent with the present disclosure may utilize any variation of such known electrical and mechanical interfaces, and/or other suitable interfaces.

With continued reference to FIGS. 5 through 7, in some embodiments the housing for the control module may further include an integrated battery box, e.g., which may provide at least some degree of protection for the battery, e.g., against environmental conditions and/or physical damage. For example, the housing 18 may include a battery cover 52 that may be pivotally coupled with the housing 18 (e.g., about shaft 54). Consistent with the depicted embodiment, when the battery cover 52 is in the closed position a battery coupled with the pressure washer system 10, and may be completely enclosed by the battery cover 52 and the associated housing assembly. Consistent with some embodiments, a seal 56 may be provided between the battery cover 52 and the associated housing assembly (e.g., including top housing 38 and bottom housing 40). The seal 56 may provide weather resistance and/or water resistance for the battery box (e.g., formed by the battery cover 52 and the associated housing assembly). The seal 56 may be retained by either the battery cover 52 or the associated housing assembly (e.g., via an adhesive, interacting mechanical features, or the like). In some embodiments, the battery cover 52 may be biased toward the closed position (e.g., via torsion spring 58). Further, in some embodiments, the battery cover 52 may be releasably secured in the closed position by a spring clip 60, or other suitable securement features (e.g., snap fits, screws, captured quarter turn fasteners, etc.).

As shown in FIGS. 5 through 7, in some embodiments assembly of the housing 18 with the mounting bracket 20 may be facilitated through the use of various cooperating features of the housing 18 and the mounting bracket. For example, as shown the housing may include various tabs 62, 64, snap fits, protrusions, or other exterior features that may index with corresponding features of the mounting bracket 20, such as cutouts 66, 68. The cooperation between the features of the housing 18 and the mounting bracket 20 may aid in aligning and/or retaining the housing 18 relative to the mounting bracket 20. In some embodiments, the housing 18 may be further secured to the mounting bracket 20 via screws, heat stakes posts, adhesives, and the like.

While not discussed in particular detail, the various components of the housing may be secured to one another to provide the completed housing assembly. For example, the various housing components may be secured by screws, adhesive bonding, welding (e.g., ultrasonic and/or thermal welding), or the like to maintain the integrity of the housing and/or to further facilitate the weather resistance and/or water resistance of the housing.

It will be appreciated that the example control module housing is intended for the purpose of illustration. The housing may take a variety of configurations, which may generally provide adequate environmental and physical protection for the control module and/or facilitate mounting of the control module to the fluid pump.

As generally discussed above, the pressure washer system 10 may include a flow sensor 16 that may be in fluid communication with one of the fluid inlet and the fluid outlet of the fluid pump 12. In some implementations, the flow sensor may be configured for detecting the flow of a fluid (e.g., water) through the pump. The flow of water through the pump may be associated with, for example, a user squeezing a trigger of a pressure washer gun connected to the pump. It will be appreciated that, consistent with the present disclosure, flow control devices other than the trigger of a pressure washer gun may be used to control (e.g., start, stop, and/or vary the flow rate) of fluid through the pressure waster system, thereby allowing (or stopping and/or varying the flow rate) of fluid through the pump. For example, other flow control devices may include, but are not limited to, foot controlled valves, manually operated valves not associated with a pressure washer gun, electrical and/or mechanical switching of a flow control valve, as well as other fluid flow control devices. All such additional and/or alternative flow control devices are contemplated by the present disclosure. However, for the simplicity and consistency of description, a trigger of a pressure washer gun will be discussed in the illustrative example embodiments. The flow of water through the pump, as a result of a user squeezing the trigger, may provide an indication of a request for high pressure water. The control module may receive a signal (e.g., via a wired and/or wireless communication connection, as generally discussed above) as a result of flow being detected through the pump, and, if the engine is not already running, the control module may provide the start signal for starting the engine. As noted, the flow sensor may either be associated with the fluid inlet of the pump or the fluid outlet of the pump. In a particular implementation, the flow sensor may be associated with the fluid inlet of the pump, e.g., which may receive fluid at a relatively lower pressure and/or flow rate as compared to the fluid exiting the pump at the fluid outlet of the pump. In some implementations, locating the flow sensor at the fluid inlet of the pump may subject the flow sensor to lower pressures. This may reduce the required structural strength required for the flow sensor and/or may decrease the rate of wear of the components of the flow sensor. As such, the cost of the flow sensor may be reduced, e.g., as compared to a flow sensor configured to provide adequate operation and expected lifespan of a flow sensor associated with the fluid outlet of the pump.

Consistent with the foregoing illustrative example embodiment, the control module housing may include a battery interface, and may, in some embodiments, include a battery housing that may at least partially protect and/or enclose the battery. In some illustrative example embodiments, the battery may not by mechanically coupled with the control module housing, and/or the control module may not include an enclosure for the battery. For example, in some embodiments, the battery may be at least partially physically separated from the control module. In such an embodiment, the control module may be electrically coupled with the battery (e.g., when a battery is installed in the pressure washer system) via any suitable conductors (e.g., wiring harness, conductor rails, system grounds, etc., as well as combinations of the foregoing). For example, in an illustrative embodiment, the control module may be housed in a control module housing as generally depicted in FIGS. 5-7, but not including a battery cover, that may be mounted to the pump (as generally shown and described). However, rather than including a battery interface for mechanically and electrically coupling the battery with the control module, the control module may include suitable conductors that may electrically couple the control module with the battery, which may be remotely located (e.g., mounted to another feature of the pressure washer system, such as, but not limited to, elsewhere on the pump, on the engine, on a chassis of the pressure washer system, at least partially within another cover associated with pressure washer system (e.g., a pump housing, and engine housing, another housing associated with the pressure washer system, and/or another features associated with the pressure washer system (e.g., a cart or trailer upon which the pressure washer system may be mounted).

Figure 33:
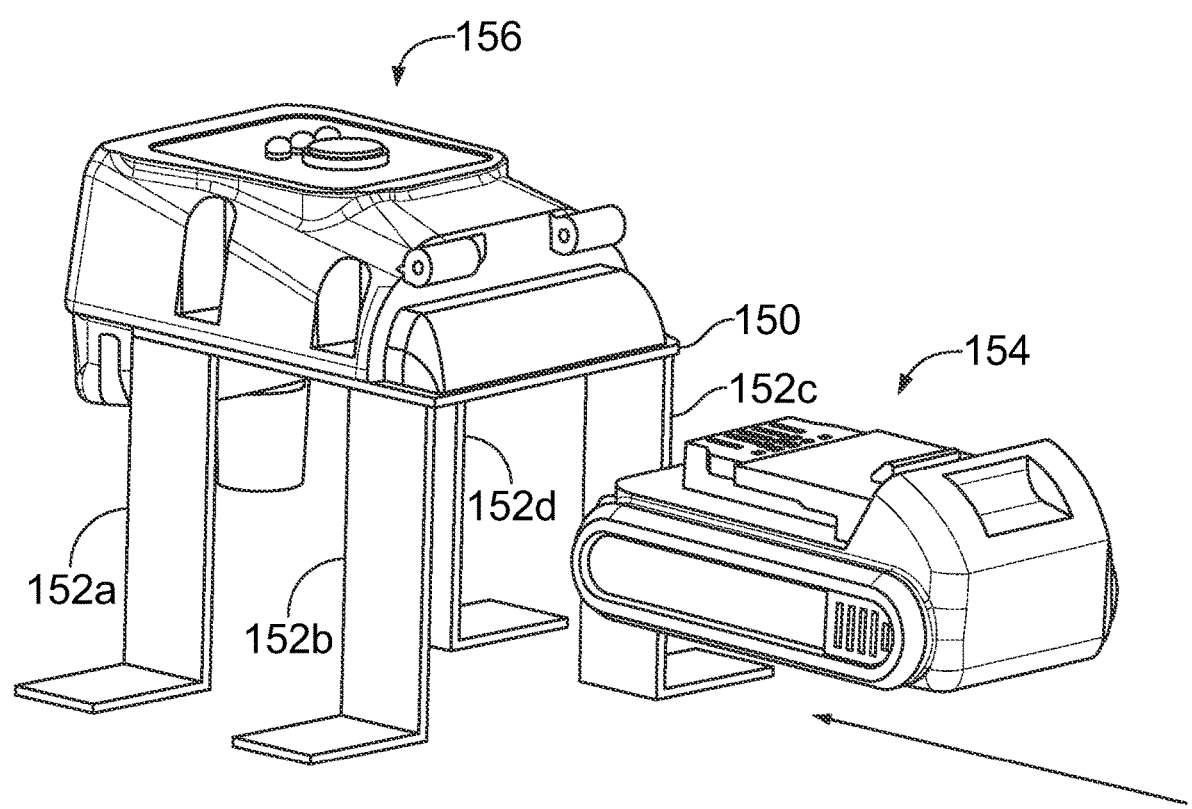
FIG. 33 depicts an illustrative example of a mounting platform and a battery pack configured for use with the same.
Figure 34:
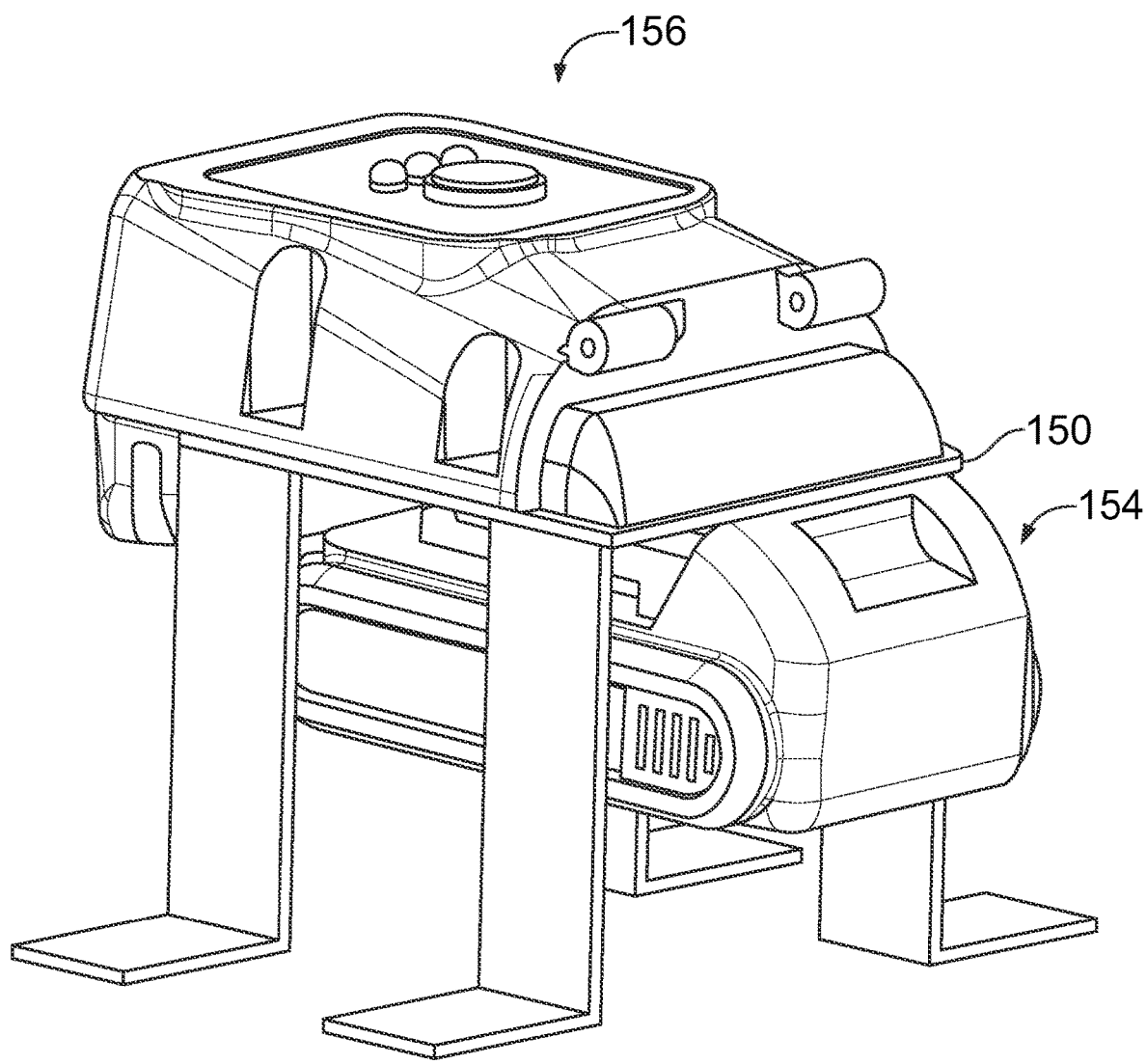
FIG. 34 depicts the illustrative example embodiment of the mounting platform and battery pack in an assembled arrangement.

Referring also to FIG. 33, an illustrative example embodiment of a mounting arrangement is generally shown. As shown, the example mounting arrangement may include a mounting platform 150. The mounting platform 150 may be mounted to any suitable feature of the pressure washer system, as generally discussed above (e.g., to the pump, the engine, a chassis, under another cover, to a cart or trailer, etc.). Consistent with the illustrated embodiment, the mounting platform 150 may include one or more standoffs (e.g., standoffs 152a-d, although a greater or fewer number of standoffs may be utilized) that may facilitate mounting (e.g., via mechanical fasteners, cooperating features, adhesives, and the like) the mounting platform to suitable structure associated with the pressure washer system. In some embodiments, the standoffs (e.g., 152a-d) may at least partially (and/or fully) define a battery receiver, e.g., providing a space underneath the mounting platform 150 for receiving a battery 154 (e.g., as shown with additional reference to FIG. 34). In some embodiments, the mounting platform 150 and/or other associated components may include cooperating features (e.g., guide rails, spring tabs, clips, removable fasteners, etc.) that may aid in releasably retaining the battery in position relative to the mounting platform. While the illustrated embodiment is shown including standoffs to provide spacing under the mounting platform for receiving the battery, it will be appreciated that other configurations may suitably be implemented, including, but not limited to, sidewalls, separate posts (e.g., which may be fastened to the mounting platform, etc.), and the like. For example, the mounting platform may include a formed sheet metal or plastic component that may include one or more downwardly extending sidewalls that may facilitate mounting the mounting platform to suitable features of the pressure washer system, as well as providing the spacing for receiving the battery.

Continuing with the illustrative example embodiment, the control module (e.g. which may be at least partially contained within a control module housing 156) may also be mounted to the mounting platform 150. For example, the control module housing 156 may provide at least some degree of physical and/or environmental protection for the control module. In some embodiments, the control module housing may be weather and/or water resistant. For example, the control module may include one or more housing components (e.g., in a generally similar manner as described with respect to FIGS. 5-7) which may include one or more of gaskets, seals, adhesives, etc., and the combination thereof, to provide a weather and/or water resistant enclosure for the control module. The control module housing may be mounted to the mounting platform via any suitable arrangement and/or fasteners. For example, the mounting platform and the control module housing may include cooperating features (e.g., tabs and slots, bosses and holes, snap fits, etc.) that may facilitate indexing the control module housing relative to the mounting platform and/or attachment of the control module housing to the mounting platform (e.g., which may include in a manner generally similar to the embodiment described with respect to FIGS. 5-7). Other suitable mounting arrangements may include, but are not limited to, the use screws or other mechanical fasteners (alone and/or in combination with cooperating features of the control module and mounting platform). Further, in a similar manner as described previously, in some embodiments the control module may be mounted to the mounting platform via one or more vibration isolating members, and/or the mounting platform may be mounted to features associated with the pressure washer system via one or more vibration isolating members.

As generally discussed, suitable conductors (including combinations of different conductor types/formats) may be provided for electrically coupling the control module (e.g., which may be at least partially and/or fully disposed within the control module housing) and the battery. For example, in one example, a wiring harness may be electrically coupled with the control module, and may extend from the control module housing to the battery (e.g., for electrically coupling with the battery via a suitable connector and/or arrangement of contracts). In some embodiments, the wiring harness may be weather sealed (e.g., weather and/or water resistant) at the point of passage through the control module housing. In some embodiments, the wiring harness may be weather sealed about the entire length from the control module housing to the battery (e.g., the battery connector and/or arrangement of contacts). As generally discussed above, other suitable conductors may be utilized in addition/as an alternative to a wiring harness. In some embodiments, the battery connector and/or arrangement of contacts may aid in removably retaining the battery to the pressure washer system and/or locating the battery relative to the pressure washer system.

It will be appreciated that while the illustrated embodiment depicts the control module mounted to the top of the mounting platform, and the battery disposed beneath the mounting platform, other configurations may be suitably utilized. For example, the mounting platform may be configured to removably retain the battery to the top of the mounting platform, and the control module (within the control module housing) may be mounted beneath the mounting platform (e.g., to an underside of the mounting platform). Further, as noted above, in some embodiments the control module may not be mounted to the mounting structure that removably retains the battery (either above the mounting platform or beneath the mounting platform), but may be separately mounted (e.g., to the pump, the engine, a chassis, or other structure), and may be electrically coupled with the battery via suitable conductors. Other variations and modifications will be readily appreciated, which are contemplated consistent with the present disclosure.

Figure 36:
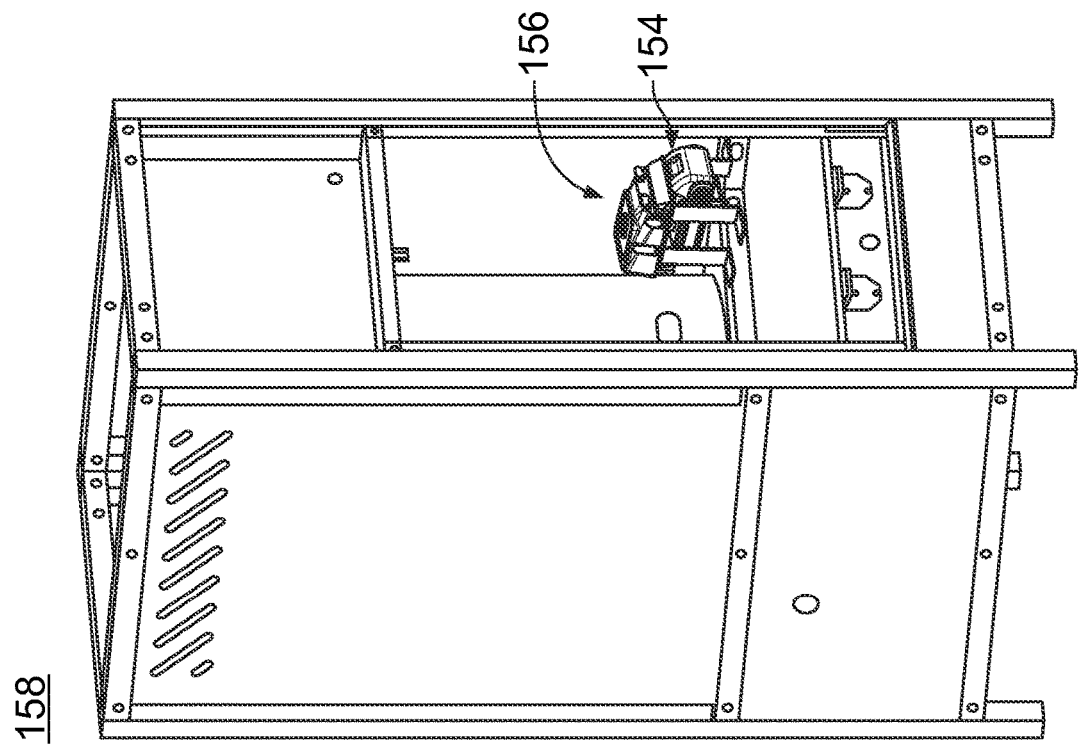
FIG. 36 depicts the example embodiment of a cabinet mounted pressure washer system according to FIG. 35, with a cabinet door in an opened position.
Figure 35:
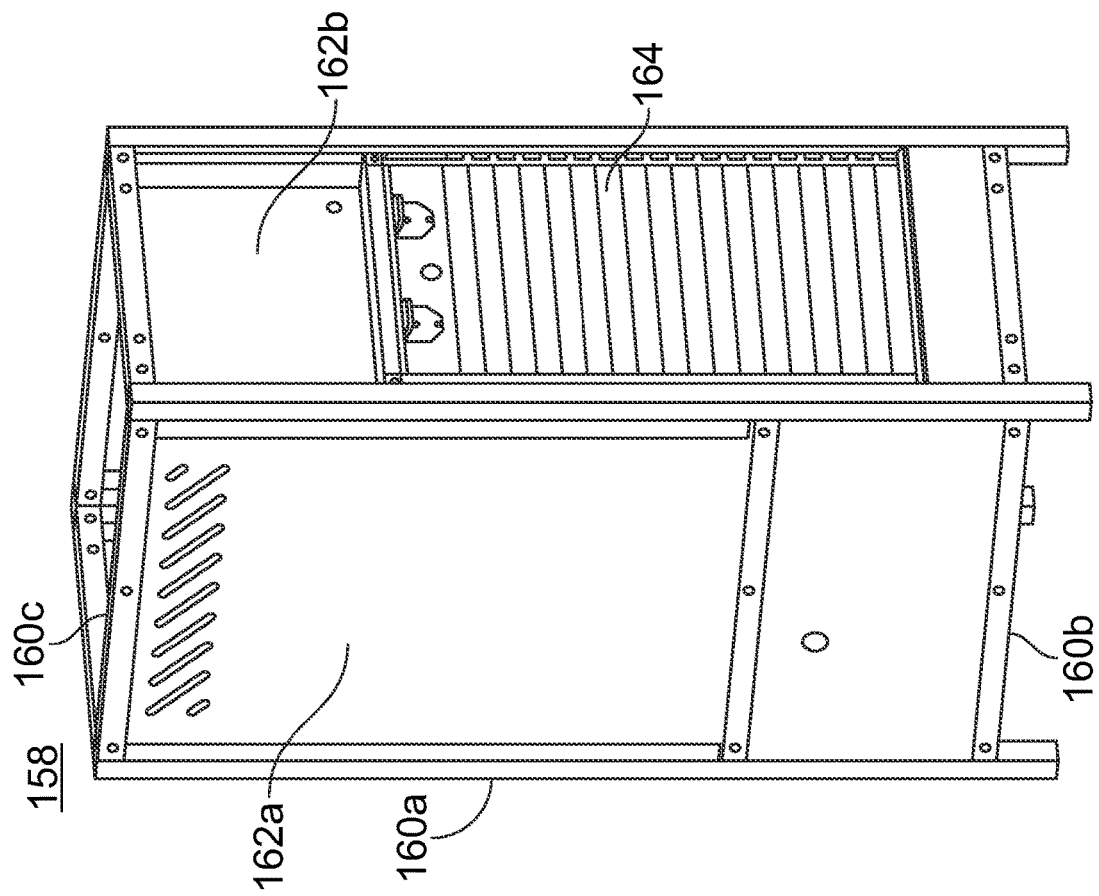
FIG. 35 depicts an illustrative example embodiment of a cabinet mounted pressure washer system.

As is generally known, the engine and pump, as well as various other features, of a pressure washer system may be mounted to a chassis, or the like. A chassis may generally support the components of the pressure washer system (e.g., to provide some degree of structural integrity for the various assembled components) and/or may provide mounting and/or retention for features such as fluid couplings, high pressure hoses, nozzle attachments, and the like. Additionally, a chassis may aid in moving the pressure washer system from one location to another. For example, in some embodiments, the chassis may include wheel and a handle that may facilitate moving the pressure washer system by a user. Referring also to FIGS. 35 and 36, an illustrative example embodiment of a chassis in the form of a cabinet 158 is depicted. Consistent with the illustrated example embodiment, the chassis may generally include various frame members (e.g., 160a-c, as well as various other frame members not specifically identified by reference numeral) that may support the pressure washer system, and various covers and/or panels (e.g., 162a-b, as well as various other panels and/or covers not specifically identified by reference numeral) that may at least partially enclose the pressure washer system (e.g., to afford some degree of environmental and/or physical protection for one or more features of the pressure washer system). As shown, in some embodiments, the housing for the pressure washer system (e.g., cabinet 158 in the illustrated embodiment) may include an access way to the interior of the housing (e.g., roll door 164, a hinged door, a removable panel, or the like). As shown in FIG. 36, in some embodiments, the control module (e.g., contained within control module housing 156) may be mounted within the cabinet 158 (and/or otherwise at least partially within a housing associated with the pressure washer system), e.g., via mounting platform 150. As generally discussed above, in some embodiments a battery pack (e.g., battery pack 154) may be removably coupled relative to the mounting platform and/or the control module housing. Accordingly, a user may access the control module and/or the battery by gaining access to the interior of the pressure washer housing (e.g., cabinet 158 in the illustrated example embodiment), for example to insert/remove the battery and/or to interact with the control module (e.g., via any suitable user interface arrangement, as discussed throughout this disclosure). As noted above, the pressure washer system may be mounted to other varieties of chassis other than a cabinet. For example, the chassis may include one or more structural members that may be connected to the engine and/or the pump. In some embodiments, the chassis may include wheels to facilitate transport of the pressure washer system. In some embodiments, the pressure washer system may be trailer mounted, e.g., to allow the pressure washer system to be towed by a vehicle. Various additional and/or alternative configurations will be appreciated by those skilled in the art.

Figure 8:
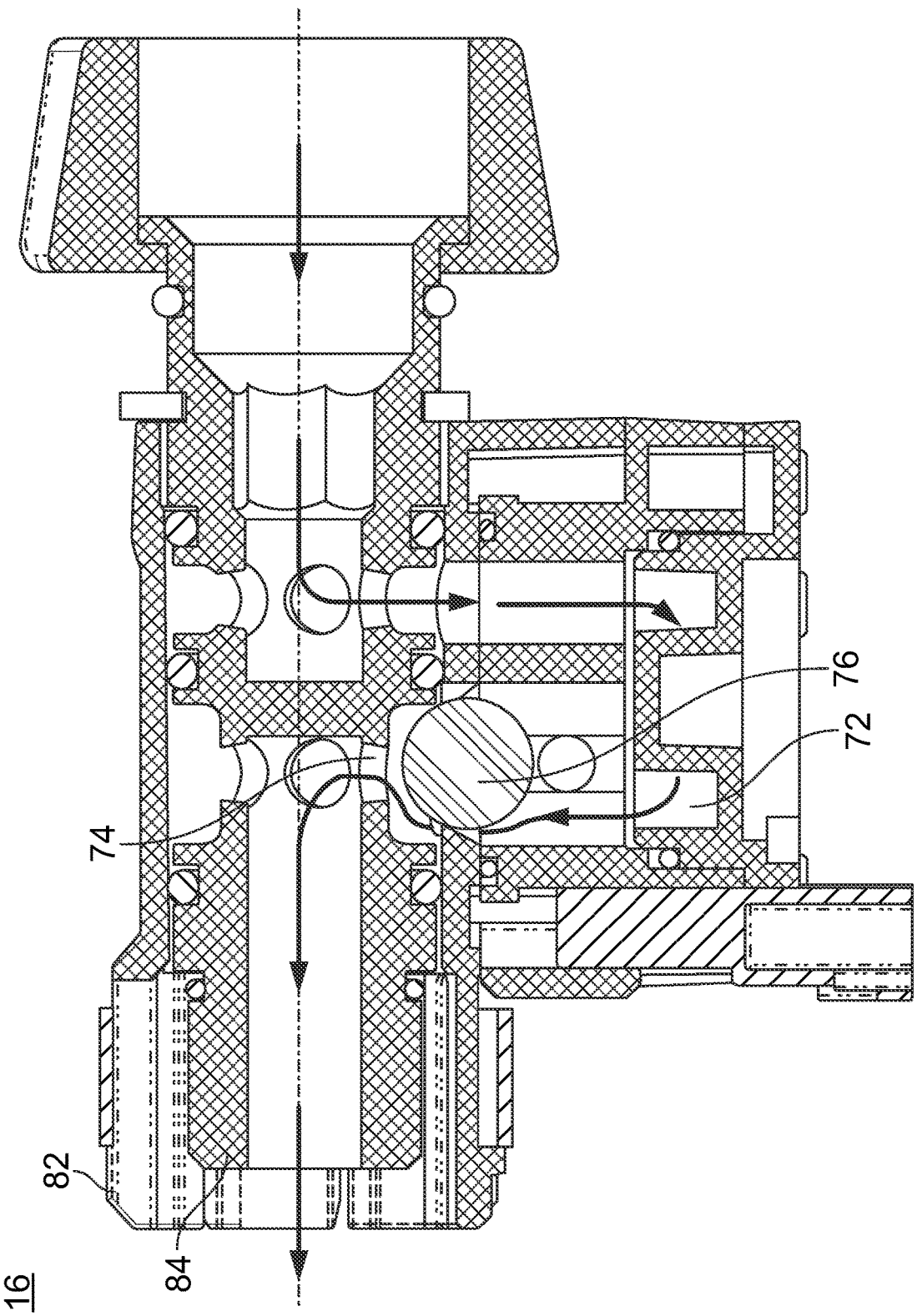
FIG. 8 is a cross-sectional view of an illustrative example embodiment of a flow sensor.

Referring to FIG. 8, an illustrative example embodiment of a flow sensor 16 that may suitably be used in connection with some embodiments of a pressure washer system 10 is shown in cross-sectional view. The illustrated example flow sensor may generally include an optical flow sensor, in which a non-floating (in an intended fluid for use with the pressure washer system, such as water) element is moved by the flow of fluid through the flow sensor between a position at least partially blocking an optical pathway through the sensor (no-flow condition) and a position at least partially removed from the optical pathway through the sensor (flow condition). The blocking element may be moved between the two positions (as well as any intermediary positions) by the flow of fluid through the flow sensor. As such, the use of springs or other mechanical features may be obviated. This may provide the advantage that such springs or mechanical features may be difficult to appropriately calibrate, and may be subject to wear and/or decreased operational performance over time. Accordingly, in some embodiments, such problems may be at least partially avoided and/or the impact of such problems may be reduced.

In general, the flow sensor may include a sensor chamber 70 having a fluid inlet 72 associated with a lower region of the sensor chamber 70 and a fluid outlet 74 associated with an upper region of the sensor chamber 70 to define a fluid pathway through the sensor chamber. A blocking element 76 may be disposed within the fluid chamber. In some embodiments, the blocking element 76 may rest adjacent the lower region of the sensor chamber in a no-flow condition. Correspondingly, in some embodiments the blocking element 76 may be raised toward the upper region of the sensor chamber during flow of fluid through the sensor chamber. The blocking element may have any suitable geometry, including spherical, cylindrical, polyhedral, and the like.

Figure 9:
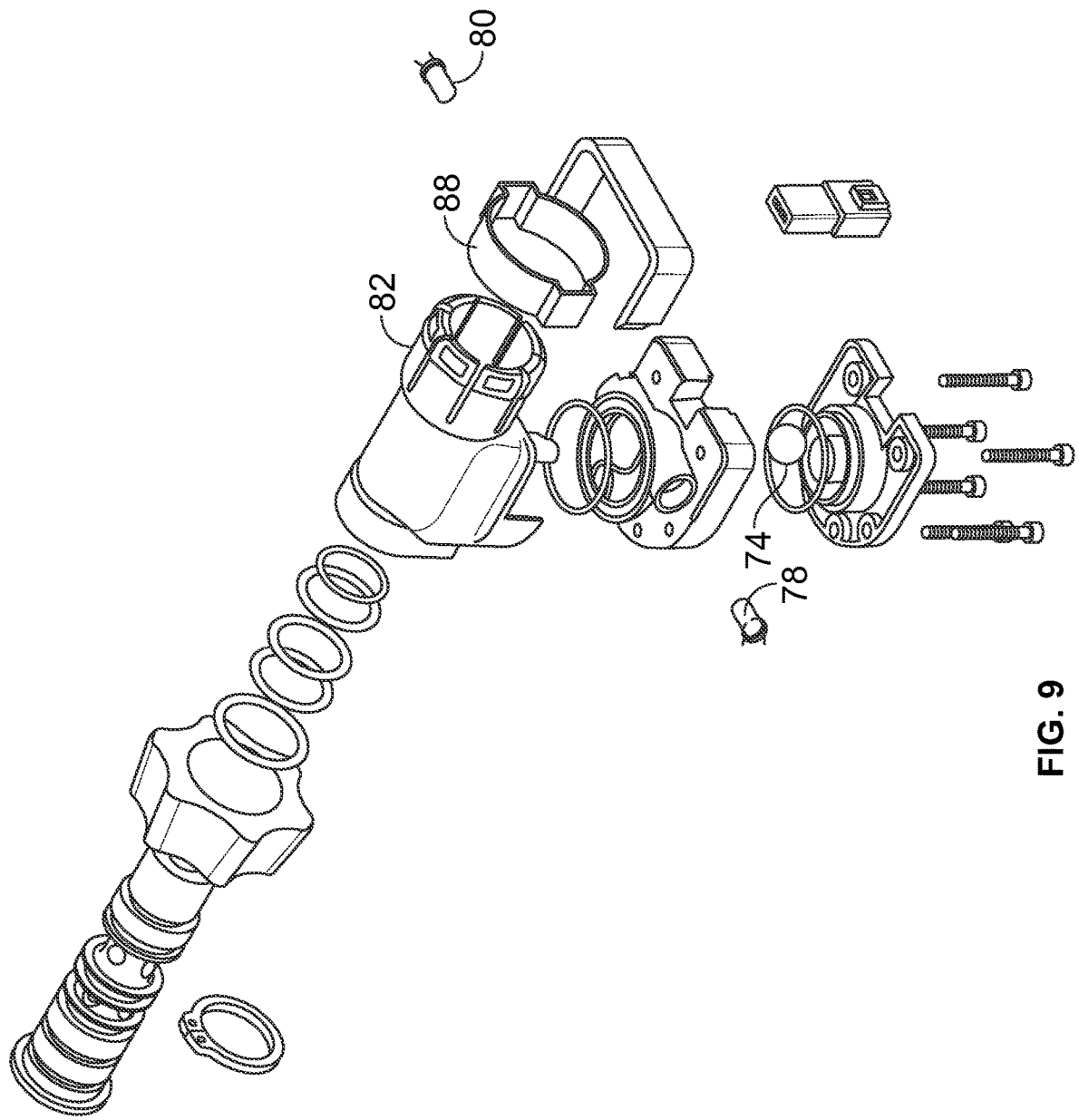
FIG. 9 is an exploded view of the illustrative example embodiment of the flow sensor shown in FIG. 8.

Referring also to FIG. 9, the flow sensor 16 may further include a sensing assembly that may include an optical transmitter 78 and an optical receiver 80. The optical transmitter 78 and the optical receiver 80 may be positioned relative to each other to define an optical pathway through the sensor chamber. That is, the optical pathway may include a pathway by which an optical signal emitted by the optical receiver 78 may be received by the optical receiver 80 (absent any obstruction within the optical pathway). The optical transmitter may include any suitable device that may be capable of emitting an optical signal in any desired range of the electromagnetic spectrum. The optical signal may include, but is not limited to, continuous illumination, intermittent illuminated, coded illumination (e.g., in which the optical signal is transmitted in a defined pattern), or the like. In one particular illustrative example embodiment, the optical transmitter may include an LED, such as an LED transmitting in the infrared range. Similarly, the optical receiver may include any suitable device that may be capable of providing an output in response to receiving the optical signal from the optical transmitter. The output may include, but is not limited, an electrical output generated in response to receiving optical signal, a change in voltage (e.g., based upon, at least in part, an applied excitation voltage), a change in resistance of through the optical receiver, or the like. In one particular illustrative example embodiment, the optical receiver may include an infrared phototransistor. While and LED transmitting in the infrared range, and a phototransistor receiving in the infrared range are discussed, this is intended by way of example only. In other embodiments, the optical signal may include a signal in the visible and/or ultraviolet range may also suitably be used.

The optical pathway through the sensor chamber may be provided by optical windows in sidewalls of the sensor chamber, which may be transparent within the wavelength of the optical transmitter and optical receiver. The optical windows may be sealed to the sidewalls of the sensor chamber, e.g., to prevent fluid leakage around the optical windows within the intended operating pressure of the flow sensor. In an illustrative example embodiment, the optical windows may include optically transparent, but fluid resistant, features of the optical transmitter and the optical receiver. In some embodiments, the sensor chamber may be constructed of a material that is optically transparent within the wavelengths of the optical transmitter and the optical receiver. In such an embodiment, the optical transmitter and the optical receiver may be disposed outside of the sensor chamber, and the sensor chamber sidewalls may form part of the optical pathway.

As generally discussed above, the blocking element may be moved between a position adjacent a lower portion of the sensor chamber and a position above the lower portion of the sensor chamber as a result of fluid flow through the sensor chamber. Consistent with an illustrative example embodiment, the blocking element 76 may at least partially obstruct the optical pathway in the no-flow condition. Further, the blocking element may be at least partially outside of the optical pathway during flow of fluid through the sensor chamber. Accordingly, the optical receiver may receive a different optical signal from the optical transmitter (e.g., different received intensity, receive the optical signal on a different portion of the optical receiver, etc.). The optical receiver may provide a different output based upon, at least in part, the different received optical signals, which may be indicative of the position of the blocking element (and thereby indicative of the presence and/or degree of fluid flow through the flow sensor), an optical transmissivity of the fluid (e.g., which may include water, or any other fluid that may be dispensed by the pressure washer system, that may be clean and/or cloudy/dirty to varying degrees).

In an embodiment, the blocking element may be a calibrated element that is configured to be a non-floating (in a fluid intended to be dispensed by the pressure washer system, such as water and/or any other fluid that may be dispensed by the pressure washer system) element. As such, the blocking element may tend to settle to bottom position within the sensor chamber in a no-flow condition (and/or when the flow rate through the flow sensor is lower than a minimum detectable flow rate), as a result of being a non-floating element. Accordingly, the blocking element may settle to at least partially obstruct the optical pathway in a no-flow condition, even when the sensor chamber is filled with fluid. Consistent with the foregoing, in some embodiments the blocking element may be selected to have a specific gravity that is higher than the fluid that is intended to be dispensed from the pressure washer system. Further, in some embodiments, while the blocking element may be selected to have a specific gravity greater than the intended fluid, the blocking element may be selected to have a specific gravity that is low enough that that it will move to a position at least partially out of the optical pathway at intended operational flow rates for the pressure washer system. For example, in an embodiment in which the pressure washer system is intended to be used with water, the blocking element may have a specific gravity of between about 1.09 to about 1.20. It will be appreciated that the blocking element may be provided having different specific gravities, e.g., depending upon the desired performance of the flow sensor and the intended fluid that the pressure washer system is to dispense.

Elaborating on the foregoing, in some illustrative example embodiments, the blocking element may be provided having a specific gravity that is high enough that, during a no-flow condition, the blocking element may settle to a lower region of the sensor chamber, even if fluid is present in the sensor chamber. In some embodiments, the blocking element may at least partially, and/or substantially or fully obstruct the optical pathway when it has settled to the lower region of the sensor chamber. Further, the blocking element may have a specific gravity that is low enough that it may readily be moved above the lower region of the sensor chamber (in some implementations, to an upper stop or ceiling of the sensor chamber) during flow of fluid through the sensor chamber within the design operating flow rates for the flow sensor. When the blocking element is moved above the lower region of the sensor chamber, the blocking element may be at least partially and/or substantially or fully out of the optical pathway. In the event of a decrease in flow below a design threshold, the blocking element may quickly (e.g., within a predetermined design parameter) settle to the lower region of the sensor chamber (e.g., thereby at least partially blocking the optical pathway). The specific gravity of the blocking element and the height above the optical pathway that the blocking element is moved during a flow condition may be selected to provide a desired response time by which the blocking element may settle to the lower region of the sensor chamber once fluid flow through the sensor chamber ceases and/or decreased below a predetermined threshold. Accordingly, the flow sensor, in some embodiments, may be calibrated for specific flow rates associated with desired operating flow rates of the pressure washer system, and may reliably maintain the blocking element at least partially out of the optical pathway during a flow condition. Further, the selection of the blocking element and the height above the optical pathway may help suspend the blocking element above the lower region of the flow chamber, e.g., which the flow sensor may experience vibration and movement during operation of the pressure washer system.

Consistent with the foregoing illustrative example embodiment, during a no-flow condition, the blocking element may at least partially (and/or substantially or fully) obstruct the optical pathway, and thereby block (and/or diminish) an optical signal transmitted by the optical transmitter and received by the optical receiver. Blocking the optical signal may result in an indication of the no-flow condition being received by the control module. The indication of the no-flow condition may include, but is not limited to, a measured output of the optical receiver. During a flow condition, the blocking element may be at least partially (and/or substantially or fully) out of the optical pathway, allowing an optical signal transmitted by the optical transmitter to be received by the optical receiver. Reception of the optical signal by the optical receiver may result in an indication of the flow condition being received by the control module. The indication of the flow condition may include, but is not limited to, a measured output of the optical receiver. In response to receiving the indication of the flow condition (and assuming any other relevant criteria are met), the control module may energize the starter to start the engine when the engine is not already running.

As shown, e.g., in FIGS. 7 and 9, in an illustrative example embodiment, the housing of the flow sensor 16 may include a plurality of flexible tabs (e.g., tabs 82, generally) extending around an outlet tube 84 of the flow sensor 16. As generally understood from the exploded view of FIG. 7, the outlet tube 84 of the flow sensor 16 may be received within an inlet port 86 of the pump 12 (e.g., and may be fluidly sealed via O-rings or other suitable sealing arrangement). The plurality of flexible tabs 82 may be generally received around the inlet port 86. A clamp 88 may be positioned around the flexible tabs 82, and may be secured to thereby secure the flow sensor 16 to the pump 12. During assembly of the flow sensor to the pump, the flow sensor may be arranged at a desired orientation relative to the pump. With the flow sensor arranged in the desired orientation relative to the pump, the clamp may be secured (e.g., by crimping or the like), to maintain the flow sensor in the desired orientation. It will be appreciated that any suitable clamp may be utilized, including, but not limited to, crimp clamps, spring claims, worm-drive clamps, and the like. Additionally, it will be appreciated that any suitable number of tabs may be utilized, including a single tab (e.g., a continuous tubular feature with a single longitudinal slot to permit crimping of the tab around the pump inlet port).

Figure 10:
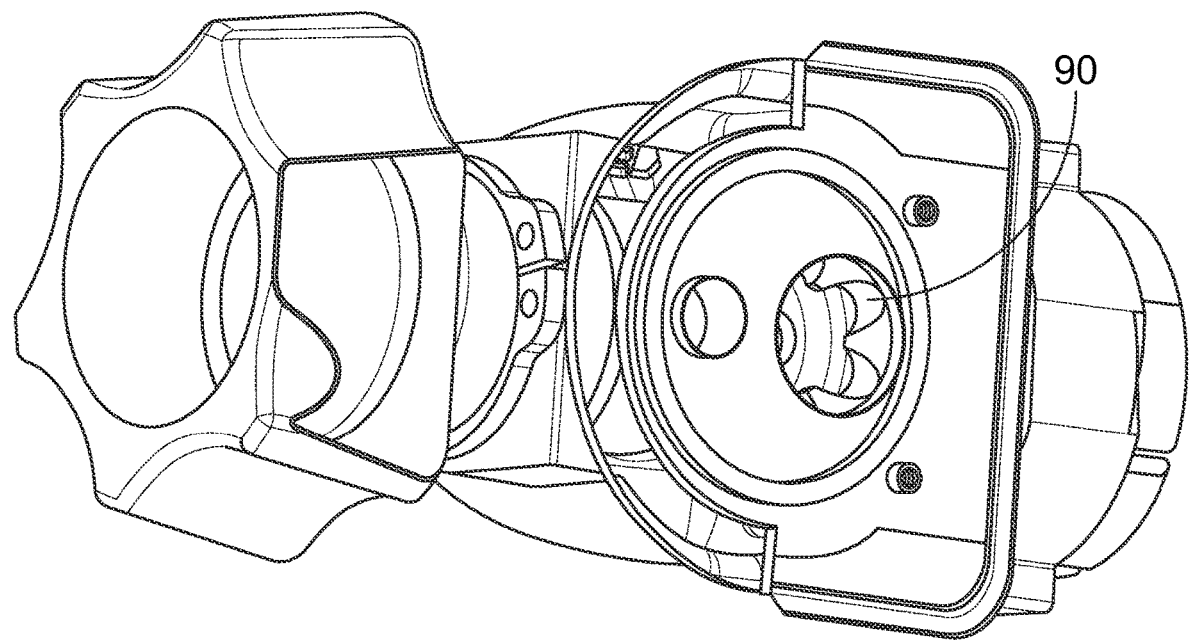
FIG. 10 is a partial cross-sectional view of the illustrative example embodiment of the flow sensor shown in FIG. 8, depicting an upper region of the sensor chamber, according to one embodiment.

Referring to FIG. 10, in some embodiments, the sensor chamber may be configured to allow fluid to continue to flow freely from the outlet, even when the blocking element is in the upper region of the sensor chamber during flow condition. In one illustrative embodiment, the upper region of the sensor chamber may include one or more channels to facilitate passage of fluid through the fluid outlet during flow of fluid through the sensor chamber. For example, as shown the upper region of the sensor chamber may include a plurality of fluted features (e.g., fluted feature 90). The fluted features may, for example, allow suitable flow rates through the flow sensor to be achieved, consistent with the design operating parameters of the pressure washer system, e.g., during both high pressure cleaning and relatively lower pressure chemical dispensing, without introducing an undesired flow restriction. While the channel is depicted as a plurality of fluted features generally extending radially from the outlet of the sensor chamber, it will be appreciated that other configurations can similarly be used, such as slots, or the like.

In some embodiments consistent with the disclosure, a sensor calibration module may be provided for calibrating the flow sensor. In general terms, the sensor calibration module may calibrate the flow sensor by adjusting the output signal of the optical transmitter to achieve an output from the optical receiving that is a desired value and/or within a desired range of values. Accordingly, the sensor calibration module may provide a wider operating range for the flow sensor, and may reduce the sensitivity of the flow sensor to cloudy fluid (e.g., which may impede the transmission of the optical signal), the accumulation of foreign material on the optical windows of the optical transmitter and/or the optical receiver. Additionally, the impact of other variables may be reduced, such as the impact of temperature on the performance of the optical transmitter and/or optical receiver, the impact of temperature on the optical pathway, the impact of the gain of the flow sensor, manufacturing tolerances in the components (e.g., the optical transmitter, the optical receiver, electronics associated with the detection of flow, as well as the physical components of the flow sensor itself). From a conceptual perspective, the flow sensor may be treated like a black box, in which a certain output, or output range, may be expected (e.g., in a flow condition), and the sensor calibration module may tune the flow senor to achieve the expected performance.

Figure 11:
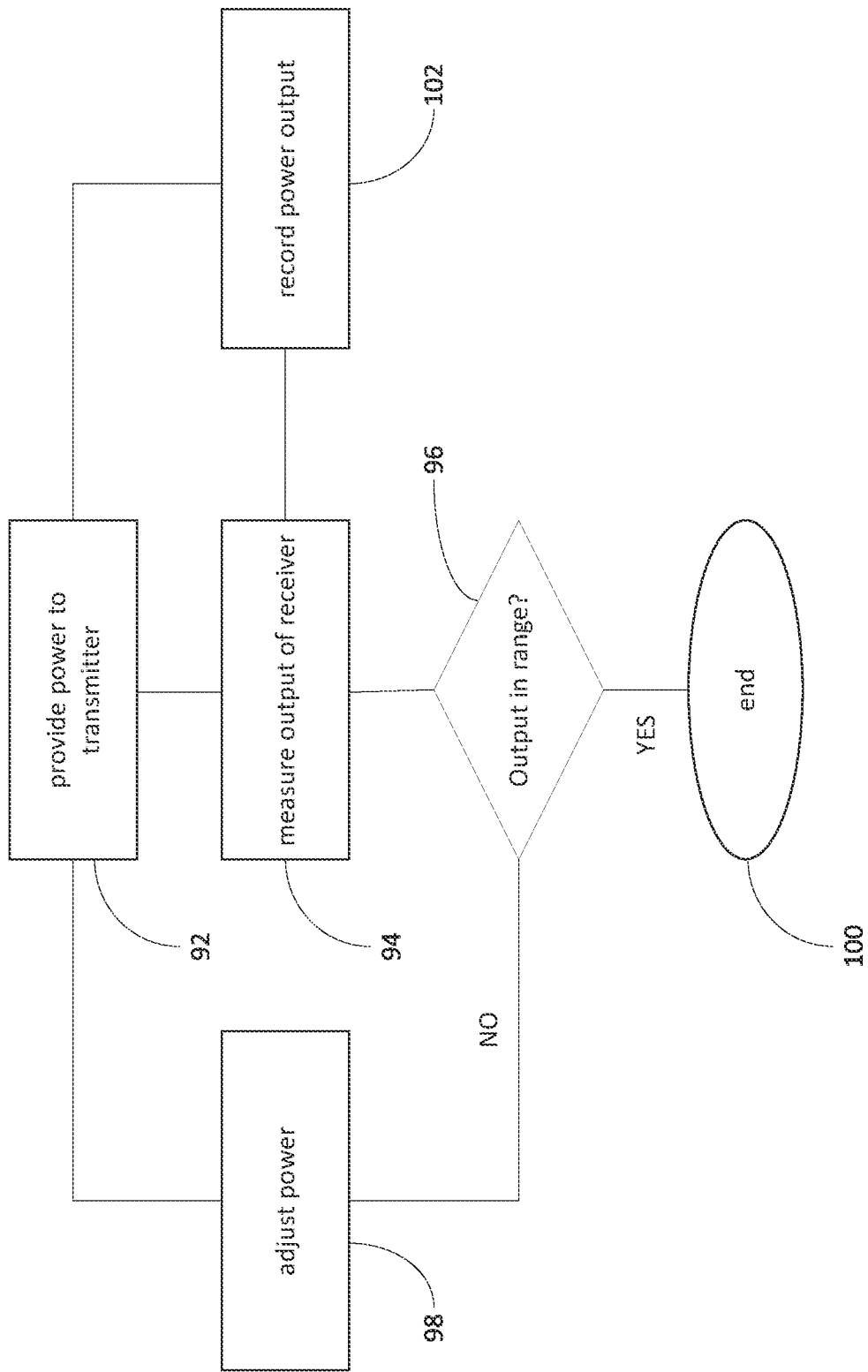
FIG. 11 is a flow chart of a sensor calibration process consistent with an illustrative example embodiment.

The sensor calibration module may, at least in part, include a processor (such as a microprocessor and/or a microcontroller) that is configured to execute computer program code (e.g., software, firmware, and/or combinations thereof) for performing various operations for calibrating the flow sensor, such as by tuning the power (i.e., one or more of the voltage and the current) driving the optical transmitter to control, vary, and/or adjust a resulting output (e.g., current and/or voltage) of the optical receiver. Accordingly, the operations described with respect to the sensor calibration module may be implemented entirely in firmware and/or software, entirely in hardware, and/or in a combination of firmware/software and hardware. Referring also to FIG. 11, the sensor calibration module may be configured to provide power 92 to the optical transmitter causing the optical transmitter to generate an optical signal based upon the power. For example, if the optical transmitter is an IR LED, the strength of the optical signal may be related to the current provided to the IR LED. The sensor calibration module may be also be configured to measure 94 an output of the optical receiver in response to receiving the optical signal. For example, if the optical receiver is a phototransistor, the output voltage of the phototransistor may be related to the strength of the optical signal received by the phototransistor. The sensor calibration module may determine 96 if the output of the optical receiver is in range (i.e., is equal to a desired output and/or within a desired output range). If the measured output of the optical receiver is not within range, the sensor calibration module may adjust 98 the power to the optical transmitter. The optical transmitter may then be driven with the adjusted power level, and the cycle may continue until the measured 94 output of the optical receiver is within range. At which point, the calibration process may end 100. Accordingly, the sensor calibration module may be configured to adjust the power to the optical transmitter to achieve the output of the optical receiver having one or more of a predefine threshold and a predefined threshold range. The power to the optical transmitter may be adjusted 98 in an incremental manner, e.g., which each adjustment step being a defined power increase. Additionally and/or alternatively, the power to the optical transmitter may be adjusted 98 based upon, at least in part, the measured 94 output of the optical receiver. For example, based upon the initial power provided to the optical transmitter and the measured output of the optical receiver, the sensor calibration module may calculate and/or look up (e.g., in a look up table or other data store) a drive power for the optical transmitter may be expected to place the output of the optical receiver within range.

Additionally, in some embodiments, the sensor calibration module (alone and/or in conjunction with one or more control systems) may record 102 the output of the optical receiver and/or the drive power provided to the optical transmitter. In various embodiments, the sensor calibration module may record the output of the optical receiver and/or the drive power to the optical transmitter at every adjustment (e.g., including the initial measurement), and/or the sensor calibration module may record the output of the optical receiver and/or the drive power to the optical transmitter once the output of the optical receiver is within range. In some implementations, the sensor calibration module may adjust the power to the optical transmitter every time an output is provided by the optical receiver (e.g., in response to receiving an optical signal from the optical transmitter). However, in some embodiments, the sensor calibration module may be configured to adjust the power to the optical transmitter based upon, at least in part, historically measured outputs of the optical receiver in response to receiving the optical signal. For example, over time (e.g., the last 10, 50, 100, etc. measurement cycles and/or operation cycles of the engine and/or the pressure washer system) the recorded output of the optical receiver may degrade for a given consistent drive power provided to the optical transmitter. Such a degradation of the recorded output over time may be indicative of the accumulation of foreign material in the optical pathway (e.g., on one or more of the optical windows), degradation of one or more of the components of the flow sensor (e.g., the optical transmitter and/or the optical receiver), and/or degradation of one or more components of the control module (e.g., which may control the drive power to the optical transmitter, in some embodiments). In such an implementation, upon the degradation of the output of the optical receiver by a predetermined amount (e.g., absolute value, percentage, or the like), the sensor calibration module may perform the calibration process. It will be appreciated that, in some embodiments, the sensor calibration module may perform the calibration process even if the output of the optical transmitter is within the predefined permitted operating range. For example, the calibration process may be performed to bring the output of the optical transmitter within a predetermined ideal range.

The control module may include any suitable collection of electronic circuitry, processors, memory devices, and the like that may carry out the operations described above, as will be appreciated by a person of skill in the art. In some implementations, the sensor calibration module may include a stand-alone module (e.g., which may be housed within the flow sensor and/or otherwise housed). In some implementations, the control module may include the sensor calibration module. That is, the sensor calibration module may be part of (e.g., a submodule), and/or commonly associated with, the control module of the pressure washer system (e.g., the circuitry, processors, memory devices, and the like, which may carry out the operations of the sensor calibration module may be included on PCB 42). For example, at least a portion of the functionality provided by the sensor calibration module may be provided by the control module.

In a particular illustrative example, when a user depresses the trigger of a pressure washer gun connected to the pressure washer system, the flow of fluid through the flow sensor may lift the blocking element out of the optical pathway. As such, an optical signal transmitted by the optical transmitter may be received by the optical receiver. There may be a brief period of time (e.g., 3 seconds, or any other desired time period) before engine starting is initiated. During this period of time the output of the optical receiver may be sampled. In one particular example, the output of the optical receiver may be sampled every 5 milliseconds. The output of the optical receiver may be qualitatively evaluated to determine if the output is within range. For example, in one embodiment, the absolute output range for a valid signal may be within the range of about 1.5 V to about 2.5 V. In some embodiments the 3 second (or other suitable time period) may be utilized for sampling the output of the optical receiver because during operation of the pressure washer the flow sensor may be subject to vibration from the engine and/or the pump. The vibration may make the output less reliable. Accordingly, the 3 second delay between the detection of flow and the initiation of engine start-up may provide a period during which relatively accurate measurements of the optical receiver output may be made.

If the measured output is within the valid range, absent other circumstances, upon the expiration of the 3 second time interval, start-up of the engine may be initiated. However, during sampling of the optical receiver output it may be determined that the measured output is 1.7 V, whereas 100 starting cycles (e.g., of the engine) ago the measured output of the optical receiver was 2 V. The degradation of the output of the optical receiver may be indicative of a dirty optical pathway (e.g., the accumulation of foreign material on the optical windows, or the like). In response to this determination, during the 3 second time interval the drive power (e.g., the current) to the optical transmitter may be incrementally increased (e.g., at 5 millisecond intervals), and the output of the optical receiver may be measured (e.g., also at 5 millisecond intervals) to achieve an optical receiver output in a desired range of between about 2 V to about 2.25 V. As such, the gain of the flow sensor may be increased over time, e.g., as the optical pathway becomes dirty and/or components of the flow sensor age. It will be appreciated that the time interval, output ranges, sampling frequency, and adjustment frequency are intended only for illustrative purposed, as other ranges and values may equally be utilized.

Consistent with the foregoing, the historical (e.g., over the last 100 starting cycles of the engine) change in the output of the optical receiver may be evaluated. In some embodiments, intervening measurements of the optical output may be evaluated, for example to determine if there has been a time-wise degradation of the output, or if the decrease represents an instantaneous decrease in the output. For example, the output of the optical receiver may have incrementally decreased over the last 100 starting cycles of the engine. Such an incremental decrease may indicate time-wise degradation of the optical pathway and/or components of the flow sensor. However, in some embodiments, an instantaneous decrease in the output of the optical receiver may be considered as indicative of a problem occurring during the current operating cycle, such as contaminated water, damage to a component of the flow sensor, or the like. In some embodiments, and depending upon the degree of the instantaneous drop in the output of the optical receiver, automatic starting of the engine may be prevented, e.g., as the instantaneous drop in the output of the optical receiver may indicate a problem that may result in damage or undue wear to the pressure washer system and/or an unsafe operating condition.

The control module may include a processor and a memory coupled with the processor. The processor may include, but is not limited to, one or more microprocessors and/or microcontrollers. In some embodiments, the processor may include a microcontroller having a number of input/output connections connected to one or more components for receiving various inputs from one or more hardware components and/or additional processors, and/or for providing control signals to various hardware components and/or additional processors. The processor may include, but is not limited to, a general purpose or specific purpose processor, and application specific integrated circuit (ASIC), one or more field programmable gate arrays (FPGA), a group of processing components (e.g., parallel processing units), a neural network processing system, or other applicable processing circuits. The processor may be configured to execute computer code or instructions stored in memory and/or other computer readable media. The memory may include, but is not limited to, RAM, ROM, flash memory, a hard drive storage, non-volatile memory, optical memory or other suitable memory. The computer readable media may include, but is not limited to, physical media (e.g., CD-ROM, DVD-ROM, flash drive, etc.), network drives, remote servers, mobile devices, and the like.

Figure 12:
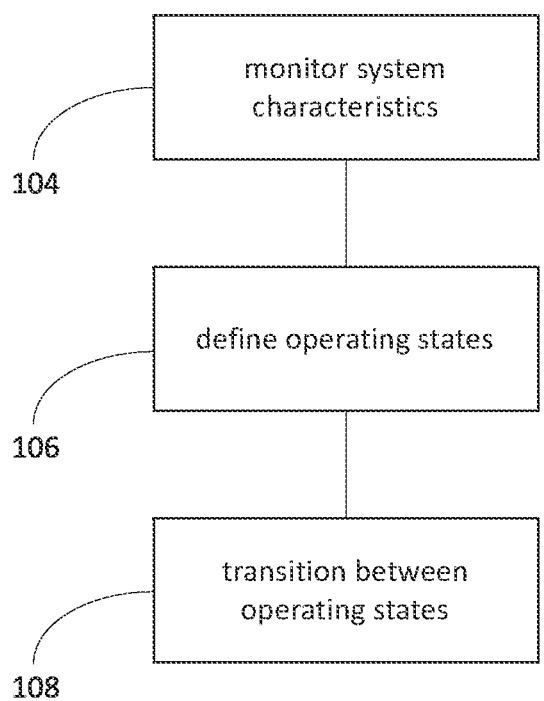
FIG. 12 is a flow chart of a system state process according to an illustrative example embodiment.

As noted above, the processor may be configured to execute computer program code, e.g., firmware and/or software. The computer program code may include instructions for performing various operations. Referring to FIG. 12, in an illustrative example embodiment, instructions may be included for monitoring 104 one or more system characteristics. The computer program code may also include instructions for defining 106 a plurality of discrete operating states of the pressure washer system. The computer program code may also include instructions for transitioning 108 the pressure washer system between the plurality of discrete operating states based upon, at least in part, one or more of the one or more system characteristics, and one or more user interactions with the pressure washer system.

Continuing with the above illustrative example embodiment, the control module may monitor 104 one or more system characteristics of the pressure washer system. The one or more system characteristics include, but are not limited to, one or more of flow through the flow sensor, engine speed of the internal combustion engine, battery voltage of a battery coupled with the control module, battery current of the battery coupled with the control module, ambient temperature of the control module, and temperature of the battery coupled with the control module. For example, the presence of flow through the flow sensor may be detected based upon, at least in part, the output from the optical receiver of the flow sensor. The engine speed may be determined based upon detected pulses from the magneto of the internal combustion engine. For example, as is understood, the magneto may provide a series of pulses each time the spark plug fires. Accordingly, the control module may identify the series of pulses as one firing sequence, and determine an engine speed of the internal combustion engine (e.g., based upon, for example, whether the engine is a two-stroke engine or a four-stroke engine). It will be appreciated that other arrangements for monitoring engine speed may be utilized, such as, but not limited to, an engine crank sensor or the like. Further, the control module may include a voltage sensing circuit that may determine the voltage of a battery connected to the pressure washer system (e.g., inserted into the battery interface). The voltage sensing circuit may provide a signal to the processor by which the processor can determine the voltage of the battery. Similarly, the control module may include a current sensing circuit that may determine the current being drawn from the battery, e.g., on an instantaneous basis, a time-averaged basis, and/or any other suitable basis. Further, the control module may include a temperature sensing circuit, e.g., utilizing a thermistor or other suitable components, to determine the ambient temperature and/or the temperature of the control module itself (e.g., a temperature of the PCB and/or a temperature within the control module housing. Similarly, the control module may include a temperature sensing circuit that may leverage a temperature sensing element included within the battery itself, and/or in contact with, or proximate to, the battery to determine the temperature of the battery.

It will be appreciated at least a portion of the functionality described above may be performed by features outside of the control module. For example, a circuit sensing the pulses from the magneto may be, at least in part, associated with the engine. Similarly, at least the optical receiver (and possibly any processing circuitry associated with the output of the optical receiver) may be associated with the flow sensor. Further, at least a temperature sensing element for sensing the temperature of the battery may be associated with the battery itself. However, even if components associated with detecting one or more system characteristics may be remote from the control module, the information regarding the system characteristics (e.g., in the form of signals perceptible by the processor) may be received by the processor such that the processor may determine the relevant system characteristics.

Figure 13:
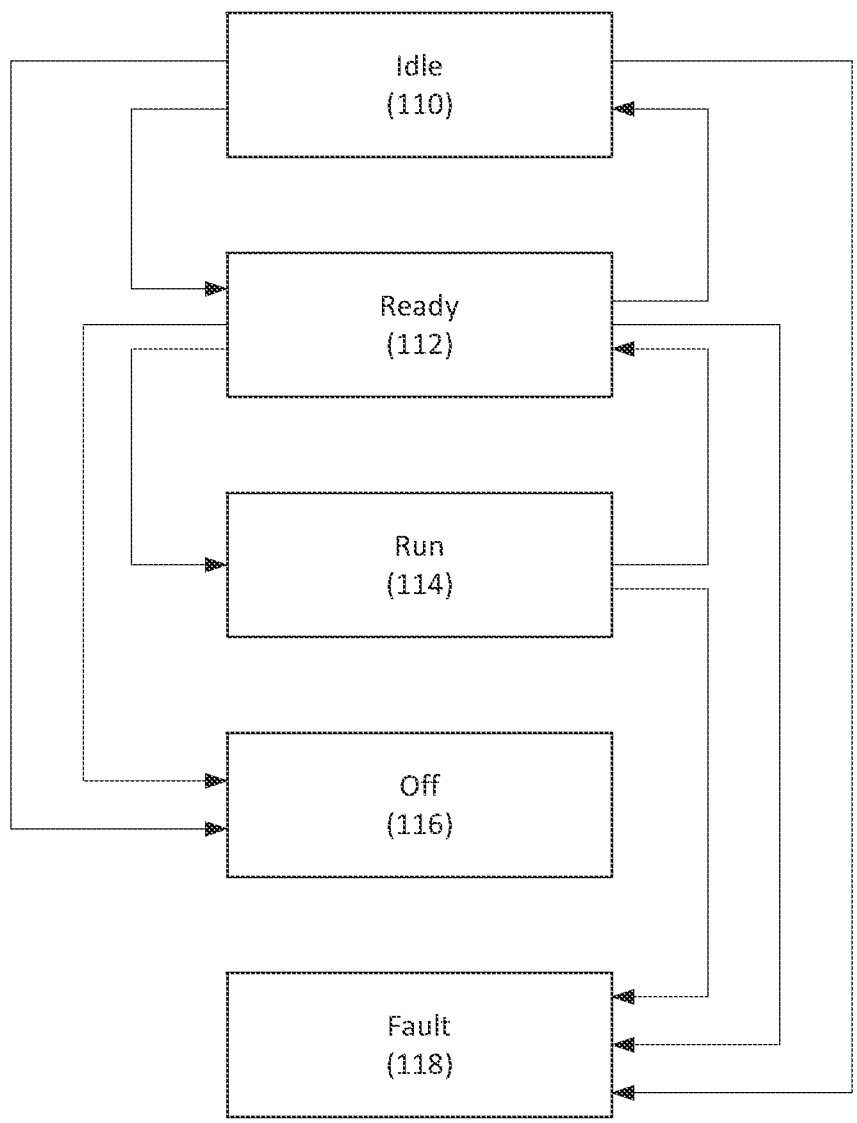
FIG. 13 is a state diagram according to an illustrative example embodiment.

As discussed above, the control module, based upon, at least in part the firmware/software execute by the processor, may define 106 a plurality of discrete operating states of the pressure washer system, and may transition 108 the pressure washer system between the plurality of discrete operating states based upon, at least in part, one or more of the one or more system characteristics, and one or more user interactions with the pressure washer system. In one illustrative example embodiment, and referring to FIG. 13, the plurality of discrete operating states comprise one or more of an idle state 110, a ready state 112, a run state 114, an off state 116, a fault state 118, and an event state 120.

Consistent with the illustrative example, the idle state 110 may define a state during which the control module is powered, one or more self tests are performed, and is awaiting a user input indicating an intent to begin operation of the pressure washer system. For example, the idle state 110 may be entered into when the control module is first turned on, either through the activation of a control button by a user, or by the connection of a battery (e.g., the insertion of a battery into the battery interface). In one particular embodiment, a single multifunction control button may be utilized, which may control different operations of the control module and/or the pressure washer system, for example, depending upon the state that the control module is in, the length of time that the control button is pressed, and the like. It will be appreciated that, while reference is made to a control button, various additional and/or alternative user interface controls may be implemented, including, but not limited to, various switches, series of buttons, touch interfaces, and the like. Upon entering the idle state 110 on initial power-up, the control module may perform various self tests to ensure appropriate conditions for operation are met. Such self tests may include, but are not limited to, tests to determine that the processor and firmware are operating according to programmed requirements. A user perceptible indication that the control module is in the idle state may be provided, such as a slow blinking blue LED. However, it will be appreciated that while specific examples of user perceptible indications may be described in connection with this illustrative example embodiment, various additional and/or alternative indications may be utilized, including, but not limited to, different colored LEDs, different blinking patterns of LEDs, individual LEDs associated with each piece of information to be conveyed to the user, a graphical display (e.g., and LCD display), combination of any of the foregoing, as well as various different modes for conveying information to a user, as will readily be understood.

Further, in the idle state the processor may monitor one or more of the system characteristics to determine if the control module may transition 108 to another operating state. The necessary values and/or ranges of the various system characteristics relating to the idle state 110, and/or to any other state, may programmatically defined, e.g., within the firmware/software executed by the processor. For example, in the idle state 110 the control module may monitor 104 the battery voltage to determine if the battery is in an appropriate state of charge for safe operation of the pressure washer system. If the battery voltage is outside of the appropriate range, the control module may transition 108 to the fault state 118. Additionally, the control module may evaluate the flow sensor for the possibility of damage, defect, or other undesirable condition (e.g., an out of range, or no, drive current or voltage applied to the optical transmitter, and out of range output from the optical receiver, or the like). If the flow sensor is determined to improperly functioning, the control module may transition 108 to the fault state. Additionally, the control module may determine if flow is detected through the flow pump (e.g., based upon an output of the flow sensor), for example, which may result from the high pressure outlet hose being disconnected or leaking, a depressed or defective trigger of the high pressure wand, a defective or damaged flow sensor, or the like. If flow is detected, the control module may be transitioned 108 to the ready state 112 (e.g., as described below), but automatic starting of the engine may be disabled until a no-flow condition is detected. At battery insertion, the control module may determine if the control button is in a depressed state, e.g., which may be indicative of a damaged or defective control button, the control module may transition 108 to the fault state 118. Upon initial power up (e.g., through the insertion of a battery) the control module may determine if the engine is running (e.g., based upon the detection of magneto pulses). If the engine is running, the control module may shut down the engine and then enter the idle state 110. Further, both the control module temperature and the battery temperature may be monitored to determine if both are within range. If either temperature is out of range, the control module may transition 108 to the fault state 118. Within the idle state 110, the control module may ready the system for operation, for example, by opening the choke (e.g., via a choke actuator, such as a stepper or servo motor) to index the choke position for subsequent operation of the engine. From within the idle state 110, the control module may transition 108 to the ready state 112 in response to a user action, such as a long press (e.g., greater than two seconds, or other predetermined time period) of the control button. It will be appreciated that other user interactions may be implemented for transitioning to the ready state, depending upon the desired user interface features. Further, in some implementations, the control module may implement a session timer. For example, if no user interaction is detected within a predetermined time period (e.g., 30 minutes, or other predetermined time period), the control module may transition 108 to the off state 116.

The ready state 112 may define a state during which the control module may start the internal combustion engine in response to receiving the indication of flow through the pump. When the control module is in the ready state 112, as user perceptible indication may be provided, such as a solid lit green LED and a solid lit blue LED. As mentioned above, other suitable indications may be implemented. In the ready state 112 the control module may monitor the flow sensor for the presence of flow, e.g., which may result from the user depressing the trigger of the pressure washer gun, indicating a demand for high pressure output from the pressure washer. In response to detecting flow through the pump, the control module may close the choke (e.g., via the previously discussed choke actuator) and energize the starter to initiate starting of the engine. The control module may also monitor the engine speed (e.g., via the magneto pulses) to identify successful engine starting within a predetermined period of time. Upon successful starting of the engine, the control module may fully open the choke (e.g., after a predetermined time period, upon achieving a predetermined engine temperature, or based upon one or more other parameters and/or combinations of parameters). Upon successful starting of the engine, the control module may transition 108 to the run state 114. As discussed previously, in some embodiments, the control module may implement a delay between the detection of flow and initiating engine start, e.g., to allow for calibration of the flow sensor and/or to perform other diagnostics.

In the ready state 112 the control module may also monitor the control button, e.g., to identify a user interaction, such as a short press of the control button. Upon detecting a short press of the control button the control module may transition 108 back to the idle state 110. The control module may monitor 104 the battery voltage to ensure that the battery voltage is within a range to safely start the engine. If the battery voltage is out of range, the control module may transition 108 to the fault state 118. Similarly, the control module may monitor the control module temperature and the battery temperature to ensure that both are within safe operating ranges. If either temperature is out of range, the control module may transition 108 to the fault state 118. Further, in the ready state 112 the control module may implement a session timer. If the control module does not receive a demand for high pressure water (e.g., as may be indicated by the detection of flow via the flow sensor) within a predetermined period of time (e.g., 30 minutes, or any other predetermined period of time), the control module may transition 108 to the off state 116.

The run state 114 may define a state during which the internal combustion engine is running. In an embodiment, the control module may provide a visually perceptible indication of the run state, such as via a solid lit yellow LED, a solid lit green LED, and a solid lit blue LED, and/or via any other suitable indication mode, as generally discussed above. In the run state 114 the control module may monitor 104 the engine speed of the engine. If engine rotation is detected, the control module may allow the engine to continue running as long as engine rotation is detected (e.g., as long as the engine has a suitable supply of fuel), unless an engine problem is detected (e.g., the detection of a low oil condition by an oil level sensor associated with the engine). If engine rotation above a threshold speed, indicating successful starting of the engine, is not detected within the predetermined time that the starter is energized, the control module may de-energize the starter for a predetermined wait time period (e.g., 2 seconds, or any other suitable predetermined time period). After the wait time period, the control module may again energize the starter to attempt to start the engine. If the second attempt to start the engine does not result in a detected engine speed above the predetermined threshold, the control module may again de-energize the starter. In some embodiments, a predetermined number of engine start attempts may be made (e.g., three start attempts, and/or any other suitable predetermined number of start attempts), e.g., three start attempts, or any other predetermined number of start attempts. If the engine is not successfully started within the predetermined number of start attempts, the control module may transition 108 to the fault state. Additionally, it will be appreciated that other system characteristics may be monitored during starting of the engine to ensure desired and safe operation of the pressure washer system. For example a current draw of the starter during start attempts may be monitored 104, to ensure that the current draw does not exceed a predetermined threshold (e.g., 140 amps, or any other predetermined threshold), which may indicate a locked rotor condition, or the like. As such, excessive current draw, which may damage the battery and/or other components of the pressure washer system may be avoided.

Further, as the control module may monitor 104 the engine speed, if the engine speed ever stopped (and/or otherwise drops below a predetermined threshold), the control module may transition 108 to the fault state 118. For example, the engine stopping may be indicative of the engine being out of fuel, and/or otherwise experiencing a condition that has caused the engine to stop running. Transitioning 118 to the fault state 118 may prevent, e.g., inadvertent starting of the engine during refueling and/or other troubleshooting activities to determine why the engine has stopped running and/or during attempts to remedy the cause of the stopped engine.

In the run state 114, the control module may monitor 104 the flow sensor to determine if flow through the pump is detected. As long as flow is detected it may be assumed that high pressure output of the pressure washer is desired. Flow through the pump may cease, for example, when the user releases the trigger of the pressure washer spray gun, e.g., indicating that high pressure output is not currently desired. Upon detecting no-flow through the pump, e.g., via the flow sensor, the control module may initiate a Time-to-Kill-Engine timer, having a predetermined time period. If flow is detected before the expiration of the Time-to-Kill-Engine timer, the timer may be reset, and the engine may continue to run. If no flow is detected at the expiration of the Time-to-Kill-Engine timer, the control module may shut down the engine, and the control module may transition 108 to the ready state 112. Additionally, the control module may monitor 104 the control button. If a single press (or other input) of the control button is detected, the control module may shut down the engine, and transition 108 to the ready state 112.

The off state 116 may define a state during which the control module is not actively controlling the pressure washer system. The control module may transition 108 to the off state 116 upon the passing of a predetermined period of time of an engine start not being requested (e.g., based upon a detection of flow through the pump). In the off state 116 power to at least a portion of the control module may be turned off, e.g., to conserve battery power. In some embodiments, the power may be turned off to the processor and at least a portion of the detection circuits. Additionally, any status indicator lights may also be turned off. According to various embodiments, to exit the off state 116 the battery may be removed and reinserted (e.g., disconnected and reconnected), the control button may be pressed, and/or any other suitable interaction with the control module may be invoked.

The fault state 118 may define a state during which the control module has detected a failure of one or more tested operating conditions. As generally discussed above, the control module may transition 108 to the fault state 118 in response to detecting a variety of system characteristics that may be indicative of an unsafe and/or unsuitable condition for operating the automatic starting of the engine. For example, the control module may transition 108 to the fault state 118 in response to detecting a battery voltage below a predetermined threshold, detecting that the flow sensor is defective, detecting that the control button is depressed and/or defected at the time of battery insertion, detecting control module temperature above a predetermined threshold, detecting that the battery temperature is above a predetermined threshold. Various additional and/or alternative conditions may cause the control module to transition 108 to the fault state 118. In some embodiments, user perceivable indications may be provided based upon the detected system characteristic and/or the nature of the detected system characteristic causing the transition to the fault state 118. In some embodiments, a user may exit the fault state 118 by pressing a control button for a predetermined period of time and/or in a predetermined sequence, by removing an reinserting the battery, and/or via other suitable interaction.

The event state 120 may define a state during which the control module has identified one or more actionable operating conditions. For example, various events may occur during the operation of the pressure washer system that may be detected by the control module and may be actionable. For example, during operation of the pressure washer system, and unexpected stopping of the engine may be detected (e.g., rather than the control module shutting the engine down as a result of the expiration of the Time-to-Kill-Engine timer). For example, the engine may run out of fuel, a low oil level may be detected by the engine, or other cause. As a result of detecting an unexpected engine stop, the control module may transition 108 to the fault state 118. In some situations the control module may detect a hard start of the engine from the ready state 112. For example, the engine may fail to start after the predetermined number of starting attempts. Upon unsuccessful starting within the predetermined number of starting attempts, the control module may transition 108 to the fault state 118. The control module may detect an engine speed above a predetermined threshold, e.g., during a starting attempt and/or when the control module is in the run state 114. As such, the control module may determine that the engine is on/running. The control module may detect that the battery voltage is below a predetermined threshold. As a safety precaution, e.g., to ensure there will be enough voltage to perform a proper shut down sequence, the control module may shut down the engine if it is running. The control module may transition 108 to the fault state 118. The control module may remain in the fault state until a battery having a voltage above the predetermined threshold is inserted. If no action is taken within a predetermined time period (e.g., 30 minutes, or any other predetermined time period), the control module may transition 108 to the off state 116. The control module may detect a voltage of the battery that is at a predetermined voltage indicating the battery is significantly depleted. The control module may transition 108 to the fault state 118 for a predetermined period of time (e.g., 3 seconds and/or any other predetermined period of time), and may then transition to the off state 116. The control module may detect that service of the system is required, e.g., as a result of a failure being detected within the system (e.g., a problem with the control module itself, a defective flow sensor, a defective control button, etc.) and/or no rotation of the engine was detected (e.g., as opposed to detecting rotation of the engine which may or may not be above the threshold for determining that the engine has started/is running) within a predetermined time period of energizing the starter (e.g., no rotation of the engine within 100 milliseconds of energizing the starter, and/or any other suitable predetermined time period). In response to detecting a service required event, complete reset of the system may be required, e.g., by removing and reinserting the battery. As such, the control module may transition 108 to the fault state 118. As noted above, the fault state, when a service required event is detected, may require a complete reset of the system. Upon the complete reset of the system, the control module may monitor 104 the various system characteristics, and may detect if the condition giving rise to the service required event has been remedies and/or if the condition giving rise to the service required event persists.

Consistent with some example embodiments, the control module may provide generally continuous monitoring of the flow through the pump (e.g., via the flow sensor). In conjunction with the self-calibrating operation of the flow sensor, in some embodiments, during the engine starting and engine shut down operations (including when the engine is running to detect a no-flow condition that may give rise to engine shut down), the control module may be capable of reliably identifying when high pressure dispensing is requested, and when high pressure dispensing is no longer requested. As such, in some embodiments, the control module may be capable of providing reliable control without the need for other inputs regarding the high pressure dispensing (such as monitoring of the pressure of the dispensed fluid). However, in other embodiments, other such inputs (e.g., pressure of the dispensed fluid) may be utilized by the control module, e.g., as additional process control inputs and/or in connection with additional safety features, to improve operation of the pressure washer system.

As generally discussed above, in some embodiments the pressure washer system may be operated without using the automatic engine starting capabilities provided by the control module. For example, when no battery is connected to the control module and/or the control module is an off or sleep state, a user may still use the pressure washer system in a manual manner. For example, the user may turn on the fuel supply and turn on an engine stop switch associated with the engine. The user may manually set the choke, and may then start the engine, e.g., using a recoil starter and/or using manually actuated electric starting (e.g., by pressing a starter button or switch). The user may then use the pressure washer system with the engine running continuously (even when high pressure output is not desired) until the engine is manually turned off by the user. As generally described above, if the engine has been started manually, and a battery having a voltage above a predetermine threshold is connected to the control module, the control module may shut off the engine, and may enter the idle state 110.

As generally described above, the control module may include a processor that may execute various firmware/software to control the operation of the pressure washer system. The processor may receive various inputs that may be interpreted by the processor, e.g., for monitoring and/or detecting system characteristics and the like (e.g., determine battery temperature, voltage, and current; determining an engine speed and/or run state of the engine; determining an output of the flow sensor, etc.). Further, the processor may provide various outputs for accomplishing different operations (e.g., starting the engine, stopping the engine, adjusting the engine choke, adjusting a drive power to the optical transmitter, turning off at least a portion of the control module, etc.). The processor may receive the various inputs from one or more circuits, components, and/or additional processors (e.g., which may execute computer program instructions). Similarly, the processor may provide outputs to one or more circuits, components and/or additional processors (e.g., which may execute computer program instructions). For the convenience of description, such additional circuits, components, and/or additional processors will generally be described as included by the control module. However, the various circuits, components, and/or additional processors may be entirely included within the control module (e.g., contained on the PCB 42 and/or commonly housed within the control module housing 18), may be partially included within the control module and partially located external to the control module (including, but not limited to, being associated with the pump, the engine, the engine starter, the flow sensor, and/or a frame or chassis of the pressure washer system), and/or may be entirely located external to the control module. All such implementations should be understood as being contemplated within this disclosure. Further, while various illustrative example circuit and/or portions of circuits are shown and discussed below, it will be appreciated that the functionality of such circuits may be implemented in various additional and/or alternative way. As such, the present disclosure is not intended to be limited to the following illustrated example embodiments.

In the following description, various illustrative example embodiments of circuits and/or components that may be included in the control module, and/or may otherwise interact with the control module, are discussed with reference to associated figures. In the various figures a variety of different electrical components are depicted and may be represented as having associated values (e.g., resistance values, capacitance values, component identifications, etc.). It will be appreciated that the depicted associated values of the different electrical components are intended only for the purpose of illustrating specific example embodiments, and that the principles and operation of the depicted circuits and/or components are not intended to be limited to such associated values. As such, electrical components having associated values different from those included in the depicted illustrative example embodiments may suitably be used to achieve the described functionality of the circuits and/or components. Accordingly, the illustrated associated values of the various electrical components should not be construed as limitations of the present disclosure.

Figure 14:
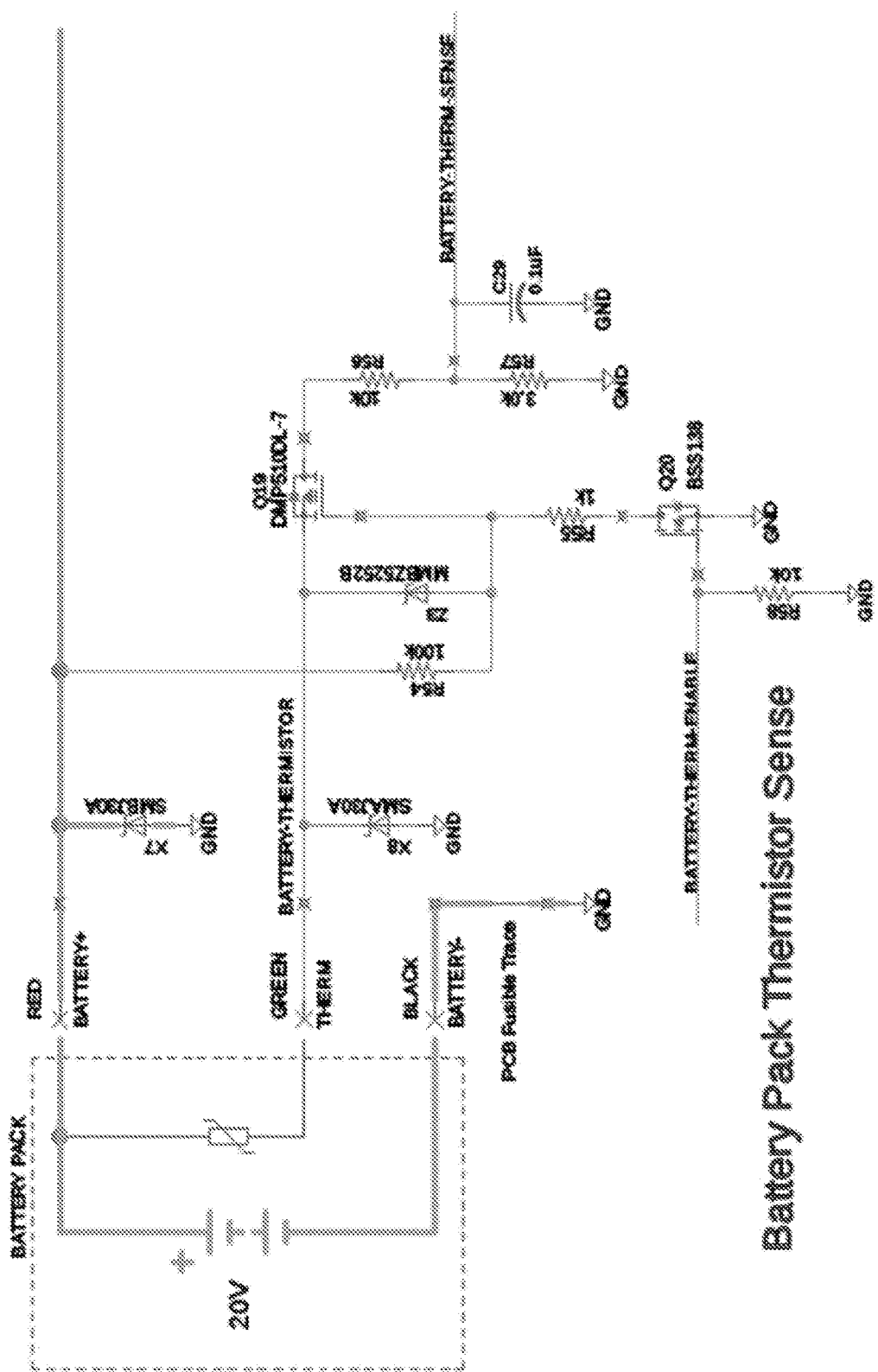
FIG. 14 is an illustrative example embodiment of a battery pack thermistor sense circuit.

As generally discussed above, the control module may be configured to sense the temperature of a battery connected to the control module (e.g., by being inserted into the battery interface, and/or otherwise electrically and/or mechanically coupled with the pressure washer system). For example, the control module may prevent the starter from being energized if the battery temperature is outside of a predetermined range, etc. Referring to FIG. 14, and illustrative example embodiment of a battery temperature sense circuit is shown. In the illustrative embodiment, the battery sense circuit may utilize a thermistor included in the battery back (e.g., as may be intended for monitoring battery temperature during charging), however, in other embodiments a thermistor (or other temperature sensitive component) may be located adjacent to and/or in contract with the battery. Consistent with the illustrated circuit, the thermistor may be leveraged to monitor the temperature of the battery during use (e.g., discharge) to ensure the battery temperature remains within the predetermined range. For example, starting the engine may represent a high current draw event (e.g., particularly for a relatively small lithium ion battery). As such, the battery may be susceptible to reaching an undesirable temperature during starting of the engine. Other conditions may similarly cause the battery to experience a temperature outside of the predetermined range.

As shown in the example circuit of FIG. 14, the internal battery pack thermistor is referenced to the battery pack plus terminal. The voltage across the battery pack thermistor may be determined by subtracting the voltage across the battery pack (measured by the battery voltage sense circuit, described below) and the thermistor voltage is measured by the combination of R56 and R57. The current thru the thermistor is the same as the current thru R57. The voltage across, and the current through, the thermistor are known. Therefore, the resistance of the thermistor may be calculated by the processor. As the thermistor resistance in known, the temperature of the thermistor may be calculated by the processor. Further, transorbs X7 and X8 may provide surge protection during battery pack insertion and starter motor operation. The circuit composed of R54, Q19, R55, Q20, R58 may allow the battery pack thermistor sensing circuit to be turned off to reduce battery load current. The function is controlled by the signal "BATTERY-THERM-ENABLE" from the processor. When the signal is high the processor may sense the battery pack temperature. When the signal is low, the battery temperature circuit may be placed in a low draw state (e.g., which may be less than 5 microamps in some embodiments). As such, when, for example, the control module is off or in a sleep mode, the battery sense circuit may not significantly drain the battery.

Figure 15:
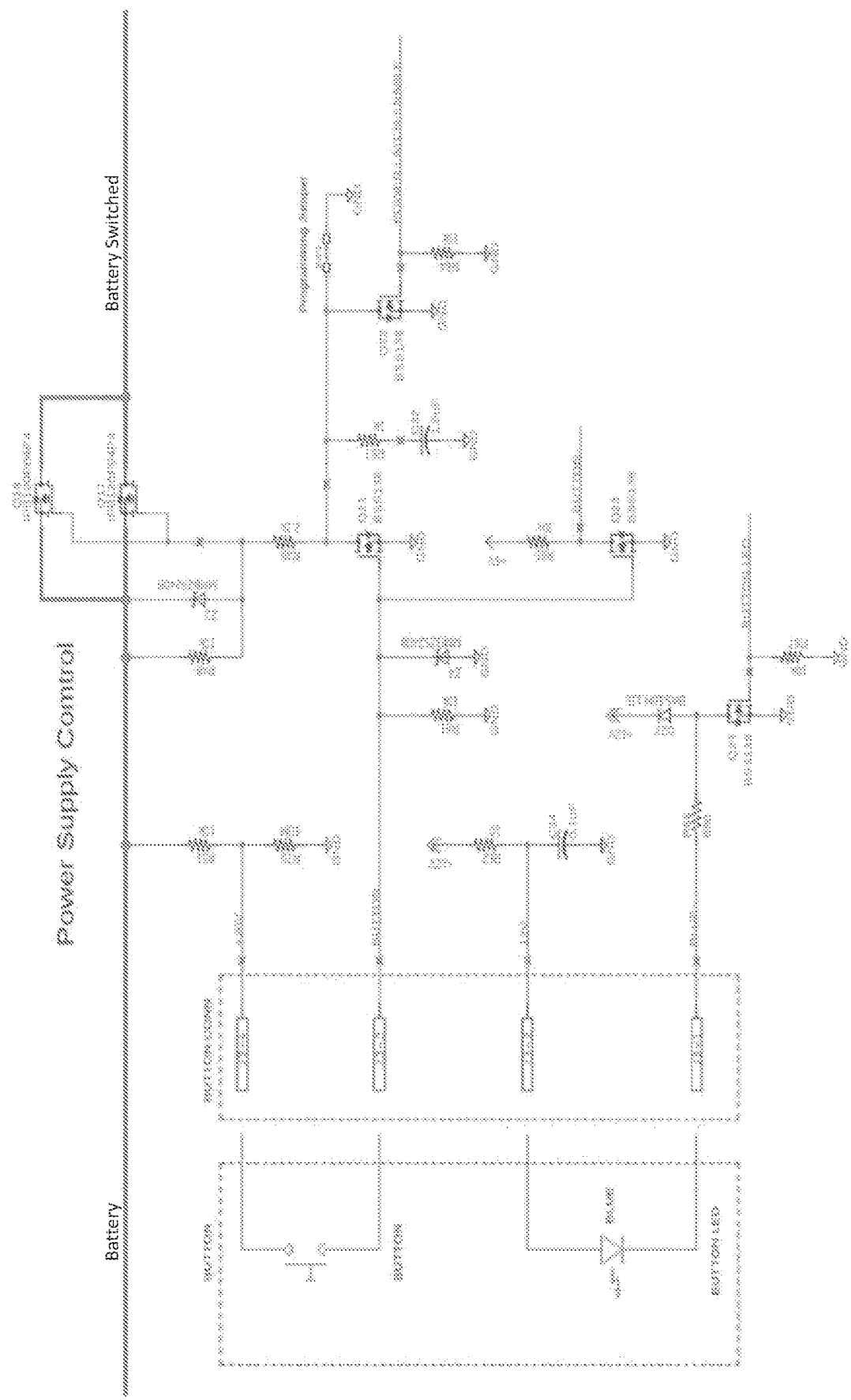
FIG. 15 is an illustrative example embodiment of a power supply control circuit.

The control module may also provide power supply control. In general, the power supply control may operate as a main power switch. When the switch is off, power may be removed from everything else in the circuit, which may provide a very low power draw on the battery. Referring to FIG. 15, and illustrative example of a power supply control circuit is shown. In the depicted example circuit, when "BUTTON" is high (push button pressed) Q21 turns on and quickly discharges the combination of R63 and C32. Discharging R63 and C32 places a negative voltage (referenced to the FET source pins) on the gates of Q17 and Q18. The negative voltage causes these transistors to turn on and supply battery voltage to power supply voltage regulators (described below). While C32 remains discharged Q17 and Q18 will remain on temporarily after the push button is released. The processor may keep C32 discharged (and the system powered up) by asserting signal "POWER-LATCH-ENABLE" through the circuit including Q22 and R64. The control module may be powered down by the processor releasing signal "POWER-LATCH-ENABLE" and allowing C32 to charge up to battery voltage disabling FET's Q17 and Q18. As C32 is discharged when a battery is inserted, Q17 and Q18 will turn on, and supply power to the system, allowing the processor to set the signal "POWER-LATCH-ENABLE" and keep system power on. Resistor R70 will discharge the various power supply capacitors and C32 after the battery is removed to make sure the system is ready for the next battery insertion. In the illustrated example, when the push button is pressed the signal "BUTTON" rises from 0 volts to around ½ battery voltage by the combination of R51 and R62. This voltage may be limited to 10 Volts by zener diode Z4 if desired. When "BUTTON" is high (push button pressed) Q23 turns on and the signal "BUTTON-" goes low. This signal may be used by the processor to detect the push button has been pressed. Zener Z2 protects the gates of Q17 and Q18 from overvoltage. Jumper JMP1 may force the system to stay powered up during firmware debugging if desired. The circuit composed of R66, Q24 and R67 may allow control of a buttons internal LED through signal "BUTTON LED".

Consistent with some embodiments, C32 may be a "sticky capacitor". That is, when this capacitor is discharged (zero volts across the capacitor) the main power transistors will be on (system power on). When this capacitor is charged (close to battery voltage across the capacitor) the main power transistors will be off (system power off). This may allow the system to control the power supply by managing the voltage across the sticky capacitor. In an example embodiment it may take the capacitor around 10 milliseconds to charge or for the system to go from the on state to the off state, hence the sticky name. When a battery is inserted into the system the capacitor will be in a discharged state. The main power transistors may turn on immediately and the systems starts up. As the system starts up, the processor may issue the signal "POWER-LATCH-ENABLE" (discharging the capacitor) to force the system to remain on. When a battery is already inserted and the system is off, and the control button is pressed the sticky capacitor may be quickly discharged and the system starts up. System power may be turned off (main power transistors off) by removing signal "POWER-LATCH-ENABLE" and letting the sticky capacitor charge up, shutting off the main transistors. The source of system startup (battery insertion or pressing the button) may be determined by polling the signal "BUTTON-" to determine the status of the button during startup. This may allow different startup routines to be used for different startup conditions. Further, in some embodiments, the main power transistors may also be used to insure system safety. If an unsafe operating condition is detected (such as battery current to high) and other shutdown routines have failed, system power may be removed by shutting down these transistors to achieve a safe shutdown.

Figure 16:
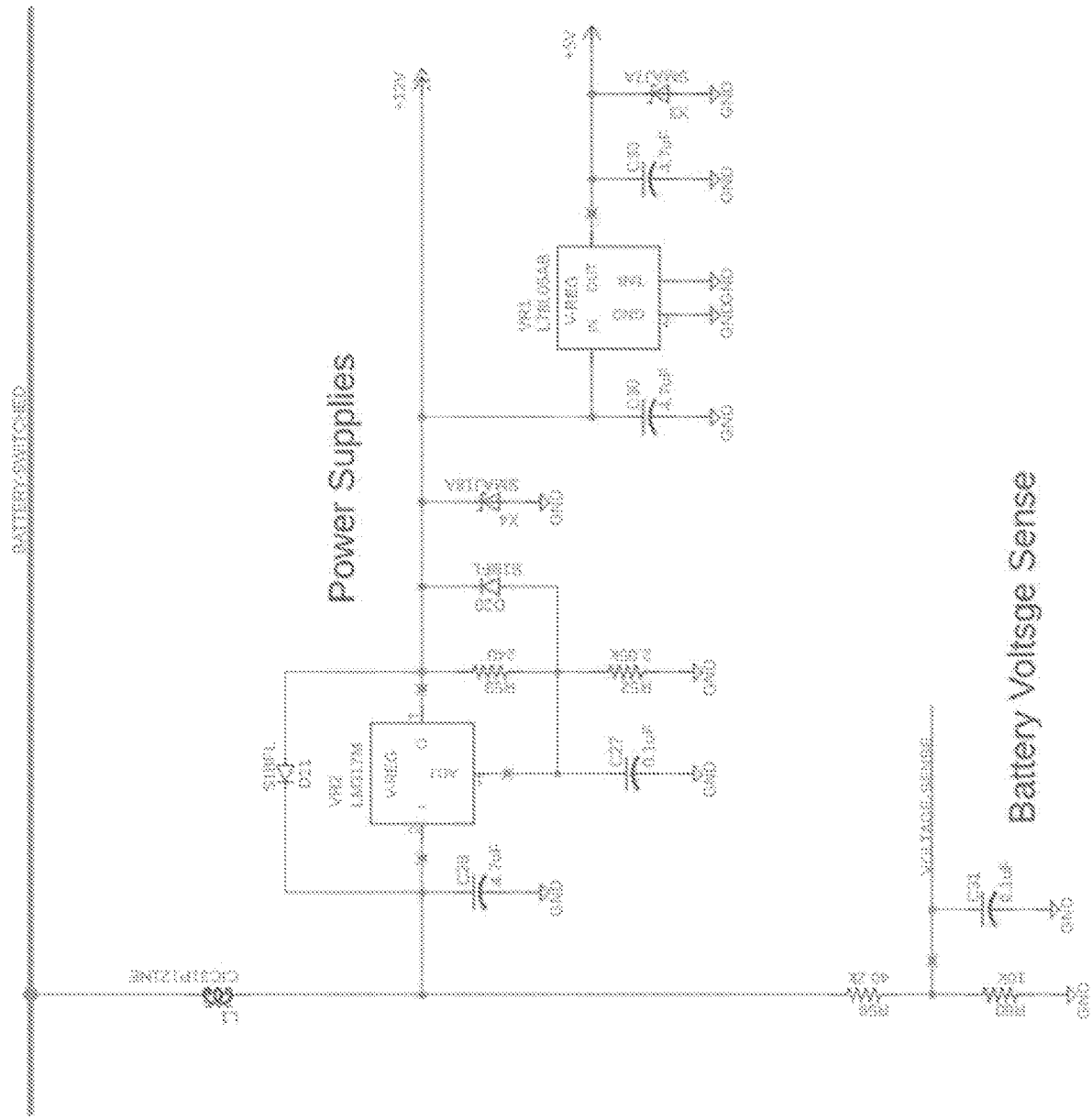
FIG. 16 is an illustrative example embodiment of a power supply circuit.

The control module may also provide one or more power supply circuits for supplying stable, voltage regulated power. For example, referring to FIG. 16, an illustrative example power supply circuit and battery voltage sensing circuit are shown. As shown, the circuit composed of L1, R59, and R60 may allow the micro-controller to sense battery pack voltage thru signal "VOLTAGE_SENSE". L1 may provide improved noise immunity, e.g., during starter operation. Voltage regulator VR2 provides +12 Volts to various on board systems. The regulator output voltage is set by the combination of R52 and R53. Diodes D20 and D21 provide improved spike protection for regulator VR2 during starter motor operation. Transorb X4 protects the board from any unusual spikes found on the +12V a supply rail. Voltage regulator VR1 provides +5 Volts to various on board systems. Transorb X3 protects the board from any unusual spikes found on the +5V a supply rail.

Figure 17:
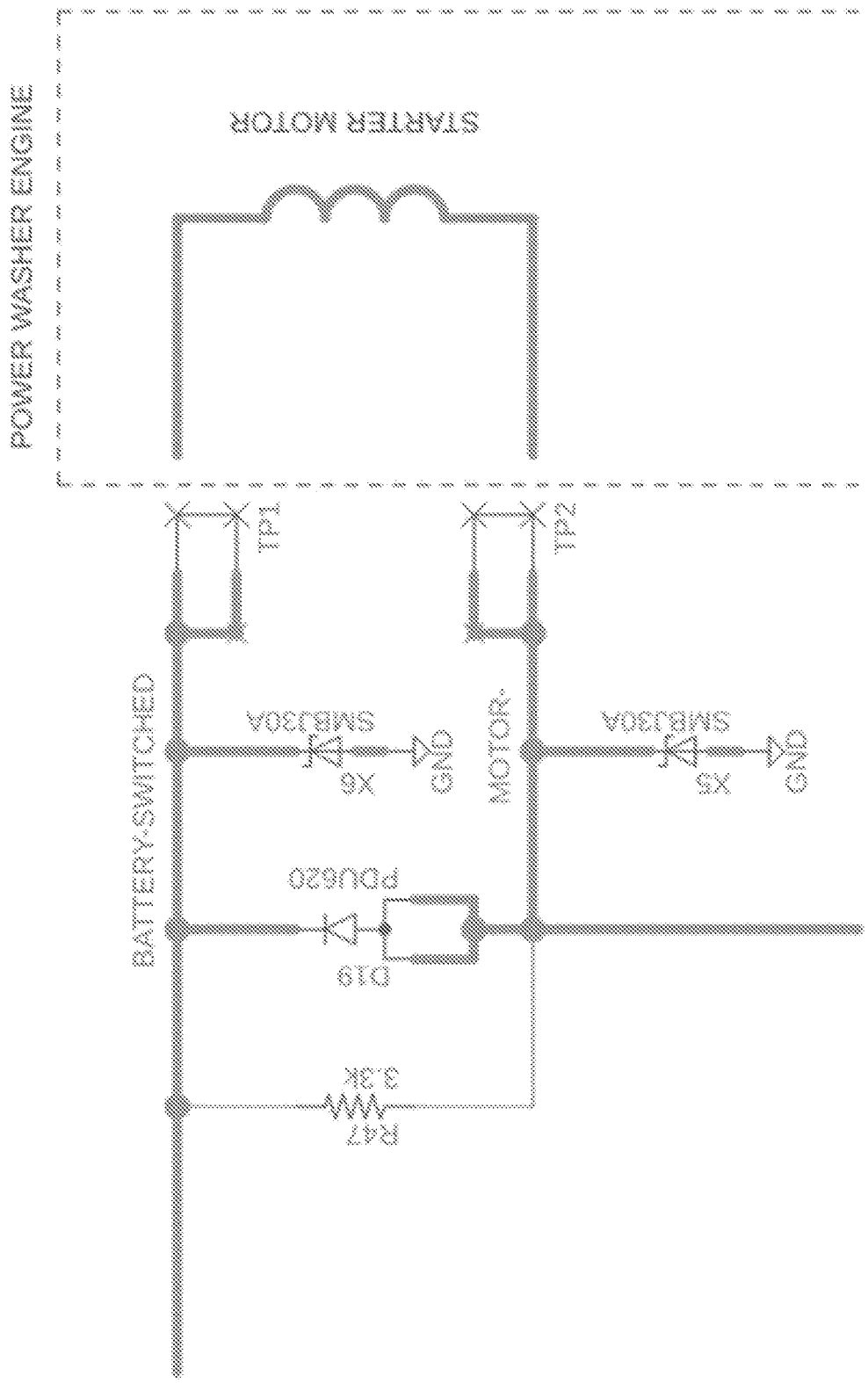
FIG. 17 is an illustrative example embodiment of a starter interface circuit.

As discussed above, in one aspect of the present disclosure, the control module may start the engine upon detected a demand for high pressure discharge from the pressure washer (e.g., flow through the pump, which may result from a user depressing a trigger of the pressure washer gun). Accordingly, the control module may include a starter motor interface for providing power to the engine starter to initiate starting of the engine. FIG. 17 depicts an example embodiment of a starter motor interface. When starter operation is engaged current passes from the battery through the combination of Q17 and Q18 of the power supply control (e.g., shown in FIG. 15) and then through the started motor, by way of Q16 (shown in FIG. 18), and then through RS1 (shown in FIG. 19) and back to the battery. Diode D19 may provide a re-circulating current path for the starter motor during initial PWM operation (discussed below). Transorbs X5 and X6 may provide feedback spike protection during starter motor operation.

Figure 18:
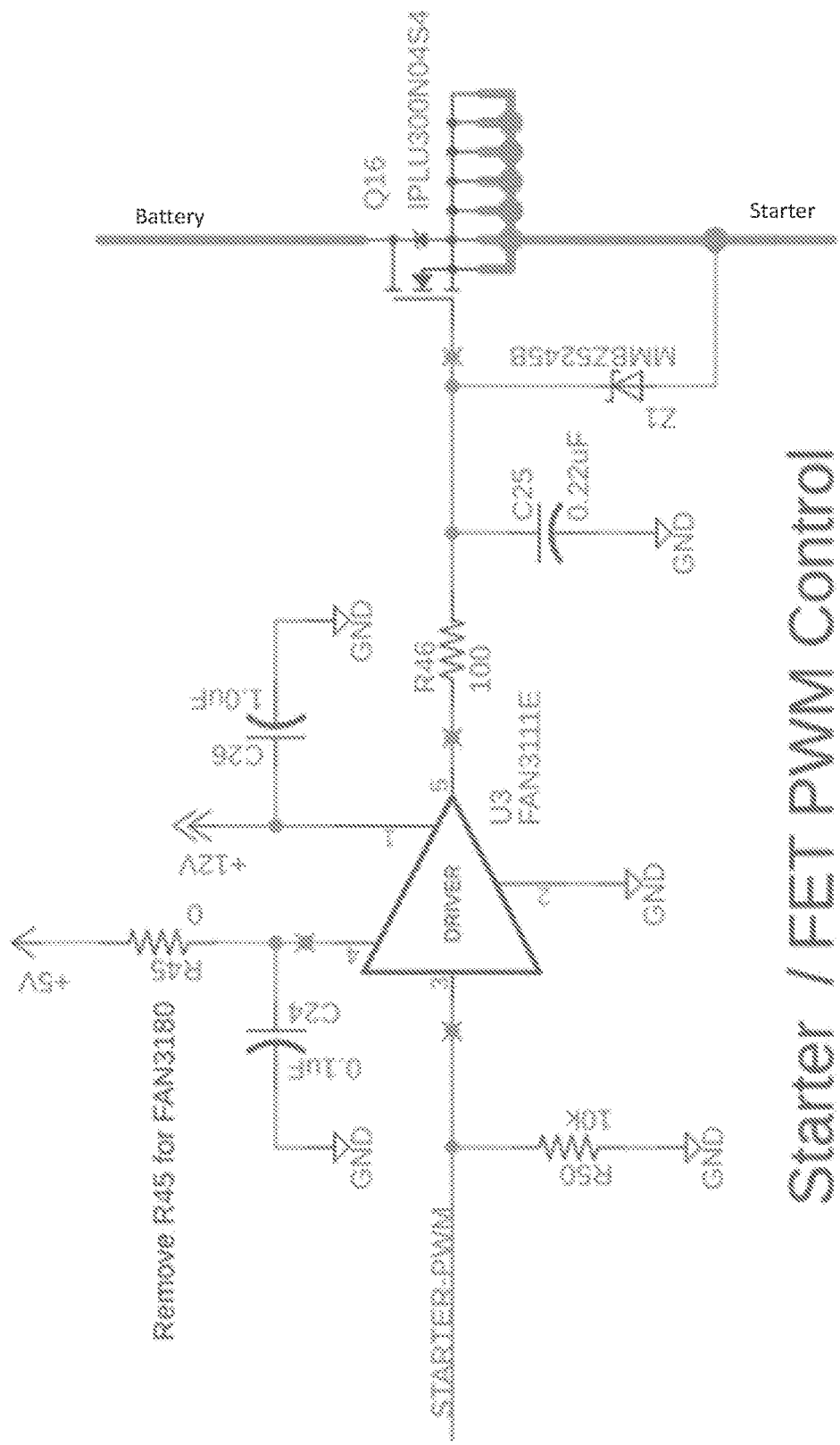
FIG. 18 is an illustrative example embodiment of a starter PWM control circuit.

As generally described above, in some embodiments the control module may energize an engine starter to start the engine. When the starter is initially energized the currently may initially be relatively high (e.g., as compared to later in the starting process), for example, as the inertia and static friction of the starter and engine components is overcome. Further, and as generally described, in some embodiments the pressure washer system may be configured to use a lithium ion battery, in some particular embodiments a lithium ion battery that may have a relatively small capacity (e.g., as compared to batteries that are typically used for engine starting), such as a power tool battery. Accordingly, in some illustrative embodiments the control module may include one or more circuits that may limit the current provided to the starter during the initial phase of the starting operation. For example, the power to the starter may be provided as a pulse width modulated (PWM) signal, in which the duty cycle of the PWM signal may be controlled to control the power provided to the starter. For example, when the starter is first energized the PWM signal may have a first duty cycle, and over time (e.g., when the current draw of the starter may normally decrease) the duty cycle of the PWM signal may be increase (either incrementally and/or in a step-wise manner). Referring to FIG. 18 and illustrative example of a starter PWM control circuit is shown. Consistent with the illustrated example circuit, a signal "STARTER-PWM" may be generated by the processor. The signal may be a PWM signal operating at 1.0 kHz (and/or any other suitable predetermined cycle rate). The PWM signal may allow for control of the starter motor current during the first instant of starter operation. The duty cycle of the "STARTER-PWM" may be set to 80% (and/or any other suitable predetermined duty cycle) initially and advances to 100% (or any other suitable predetermined higher duty cycle) within 80 milliseconds (and/or any other suitable predetermined time period). This may prevent very high battery currents during starting, which may aid in protecting the battery and other on board circuits from high currents. In the illustrated circuit, FET driver U3 is used to control the gate turn on/off of FET Q16. It provides high gate charge/discharge currents while protecting against the reverse transfer side effects of high performance FET's. The Gate drive voltage may be +12V to assure low on resistance in FET Q16. R46, C25 and Z1 may help protect U3 and Q16 from these effects as well.

In an embodiment, the two transistors Q17 and Q18 of the power supply control circuit of FIG. 15, along with Q16, may make up two series switches that connect the starter motor to the battery. If the PWM control circuit fails (e.g., Q16 burns open), the two transistors of the power supply circuit may quickly turn off (e.g., on the order of a few milliseconds). As such, a failure of Q16, and the resulting off state of the power supply control circuit transistors, may protect against subsequent starter energization. Accordingly, the safety of the system may be greatly improved. The state of Q16 may be known, at least in part, based upon a sensed battery current (discussed below). Accordingly, if the current draw on the battery is above a predetermined threshold at an unexpected time, the processor may shut off the two transistors of the power supply control circuit, thereby increasing the safety of the pressure washer system. Accordingly, the starter PWM control circuit may, at least in part, protect the battery from larger starter current draws (e.g., which may damage the battery, control module, and/or starter motor, and/or otherwise present a potentially unsafe condition), while allowing a relatively small lithium ion battery to be used with the pressure washer system to effectively start the engine.

As generally discussed above, it may be an important safety feature to be able to determine the current draw on the battery (e.g., during operation of the engine starter, to determine high current draws at unexpected time, and the like). For example, an excessively high current draw by the starter may indicate a locked rotor condition, in which the starter is not able to rotate the crankshaft of the engine (e.g., due to the starter coils being shorted, the engine being seized or hydro locked, or other damage to, or malfunction associated with, the starter or the engine). As such, being able to quickly identify a current draw above a predetermined threshold (e.g., 140 amps, and/or any other suitable predetermined threshold) may allow the processor to shut down power to the starter, e.g., either via the starter PWM control circuit or via the power supply control circuit. However, accurately measuring the current of a PWM signal is typically very challenging, as the measurement must occur during the on state of the PWM signal, and even then the on state may represent a rising, time varying event as the signal turns on.

In an example embodiment, the challenges of measuring the current of a PWM signal may be overcome by sampling the current of the PWM signal in sequence to the timing of the PWM signal to measure the current during the on state of the PWM signal. Additionally, in some embodiments, the current may be oversampled during the on state of the PWM signal, and peak detection may be applied to determine an actual maximum current draw. For example, battery current may be or particular interest during an engine-starting attempt, especially during the first 100 milliseconds (and/or other suitable initial time interval) of starter motor activation. A starter motor PWM control may be used to prevent excessive battery currents during the first 100 milliseconds of starter operation (as generally discussed above). This makes measuring starter motor current difficult as the starter motor current is not constant but has a ramped/pulsing nature. During starter motor operation the battery current may be sampled every 200 microseconds (and/or other suitable oversampling rate based upon, at least in part, the cycle rate of the PWM signal to provide a sampling rate that is significantly greater than the cycle rater of the PWM signal). In general, consistent with some embodiments, the sampling frequency may be greater than about three times the frequency of the PWM signal. For example, in the above illustrative example embodiment, the sampling frequency may be about 5 kHz, whereas the frequency of the PWM signal is 1 kHz. It will be appreciated that other sampling frequencies may be utilized. This data may then passed into a peak detection routine of the processor, and any value greater than a previous saved value for the given starter attempt may be re-saved and any value less than the previous saved value may be discarded. If the starter motor current is ever greater than a preset value, the starting attempt may be immediately shut down. The starter motor current peak value may be saved for later use in the diagnostic system.

Figure 19:
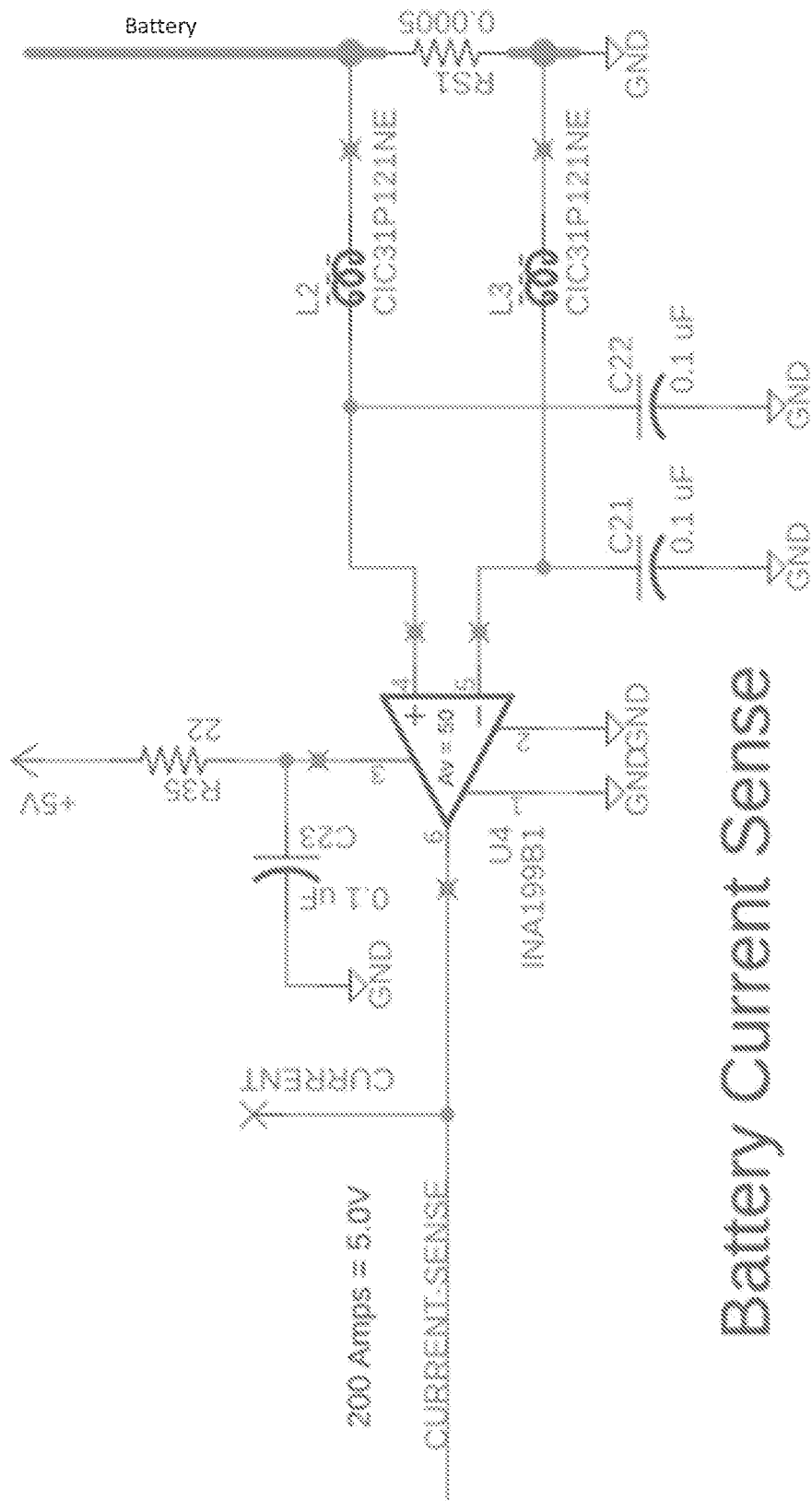
FIG. 19 is an illustrative example embodiment of a battery current sense circuit.

Referring to FIG. 19, an illustrative example embodiment of a battery current sense circuit is shown. In the depicted circuit, a sense resistor RS1 senses current while the starter motor is operating. The voltage across RS1 is sensed and amplified by amplifier U4. The signal "CURRENT-SENSE" can be read by the micro-controller to measure starter motor current. Components C21, C22, L2 and L3 may provide improved noise and some spike filtering for the starter motor current signal "CURRENT-SENSE". The test point "CURRENT" may allow for probing of real-time starter motor current.

Figure 20:
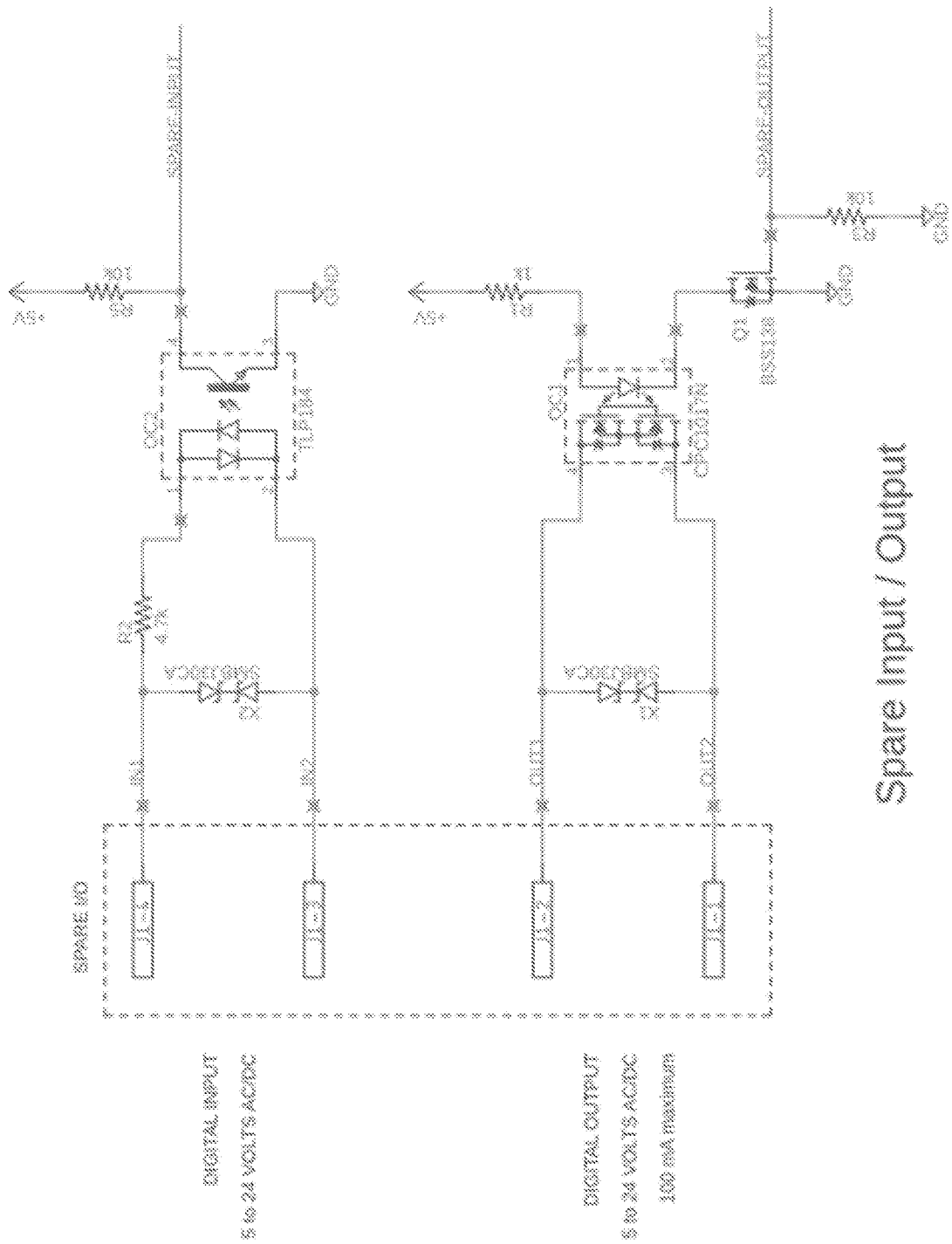
FIG. 20 is an illustrative example embodiment of a spare input/output circuit.

In some embodiments, the control module may include capabilities for additional inputs and/or outputs, e.g., that may be used with additional accessories of the pressure washer system, or the like. FIG. 20 depicts an illustrative example embodiment of a spare input/output circuit, e.g., that may allow inputs and/or outputs to other components or accessories. As shown, the spare input/output circuits may be configured to provide two spare inputs and two spare outputs. In the illustrated circuit, components X2, R2, OC2, and R5 may provide an isolated input. Correspondingly, components X1, OC1, R1, Q1, and R3 may provide an isolated output.

Figure 21:
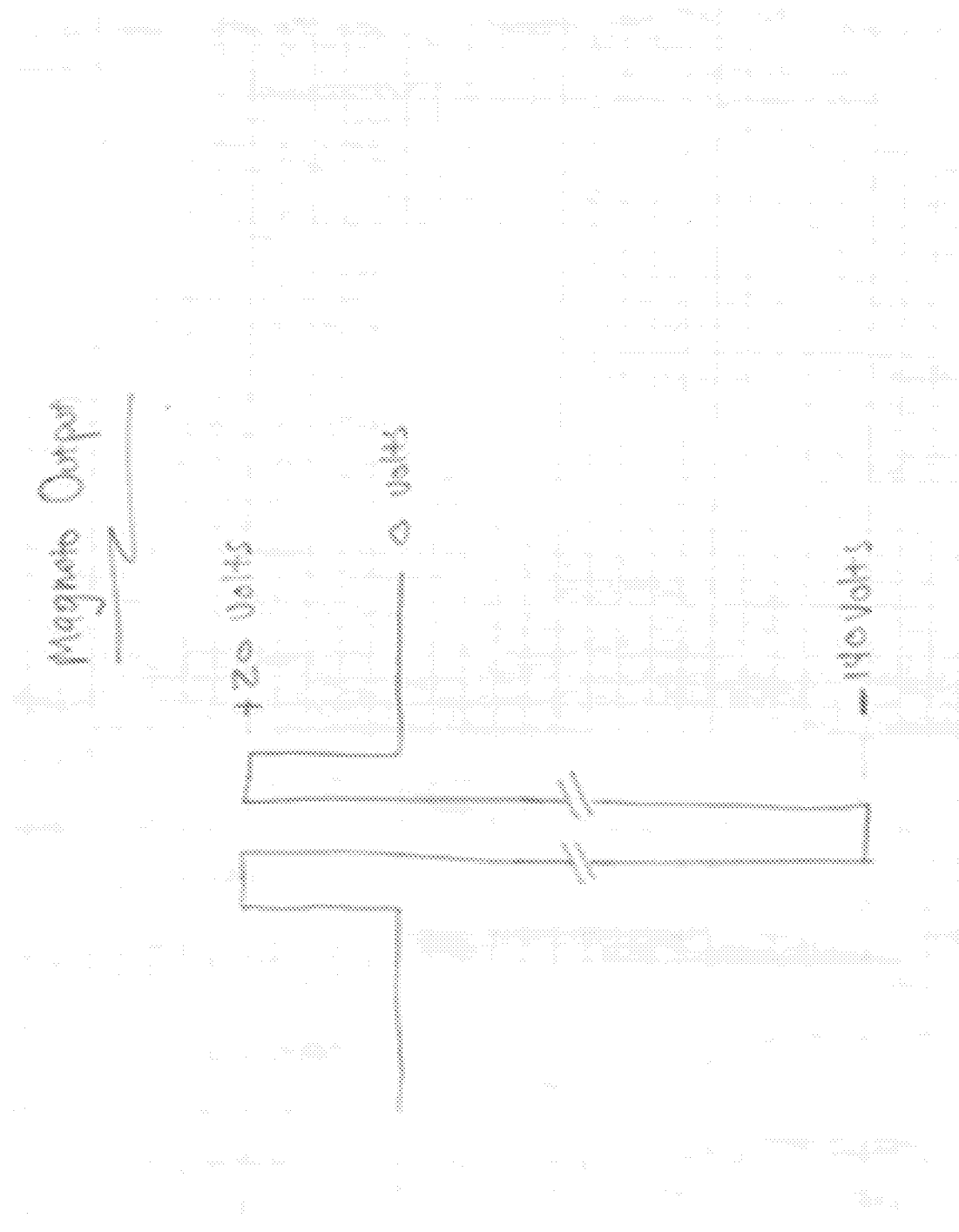
FIG. 21 diagrammatically depicts an embodiment of a magneto firing pulse.
Figure 22:
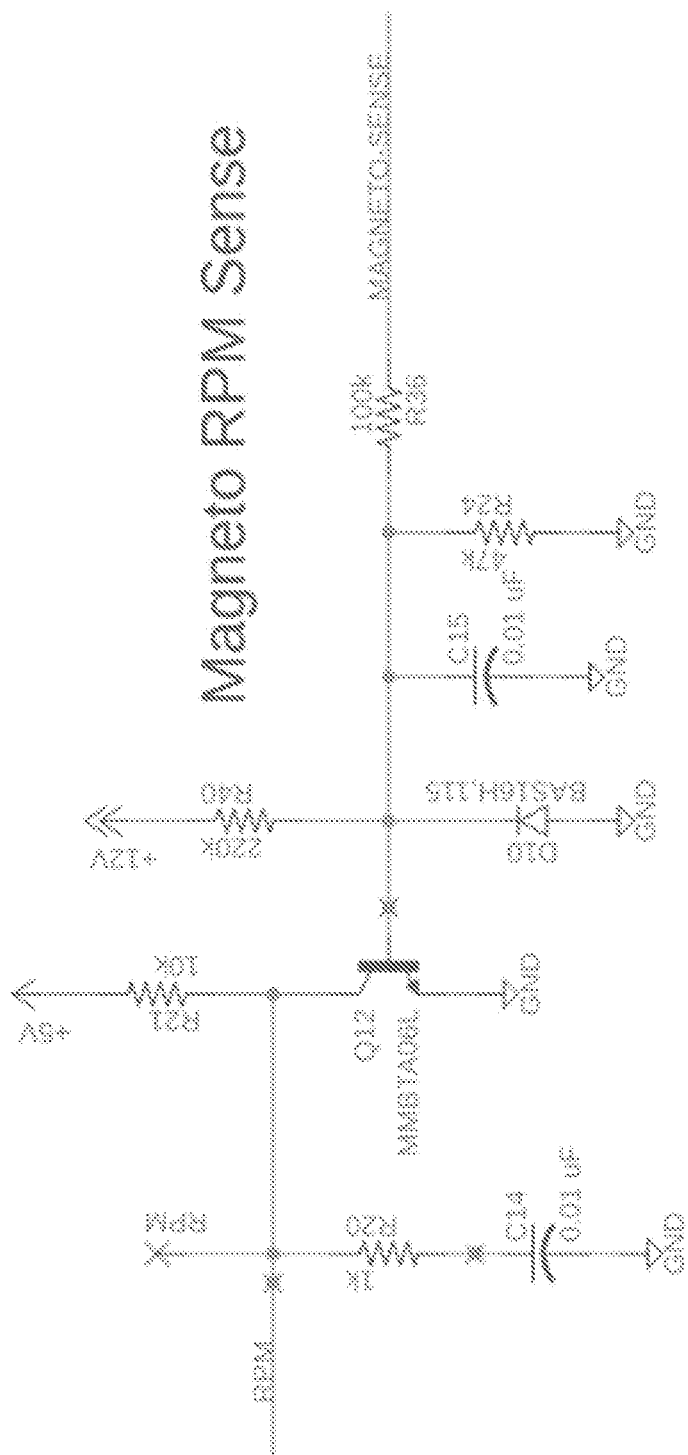
FIG. 22 is an illustrative example embodiment of a magneto RPM sense circuit.

As generally discussed above, the control module may detect and/or monitor the engine speed of the engine, for example, to determine whether the engine is currently runner, to determine if the engine has started, etc. In some embodiments, a crank sensor (such as a Hall effect sensor), or other suitable sensor may be utilized. In some embodiments, the engine speed may be determined and/or monitored based upon, at least in part, magneto pulses associated with the firing of a spark plug of the engine. Typically, a magneto primary side voltage may be characterized by a large negative pulse (e.g., of around −140V, although the value may vary depending upon the design of the magneto, this is when the spark occurs) and is preceded and followed by a moderate positive voltage (e.g., of around +20V to +30V, although the value may vary depending upon the design of the magneto) each time the engine fires the spark plug, which is generally depicted in FIG. 21. Referring to FIG. 22 an illustrative example embodiment of a magneto RPM sense circuit is shown. In the depicted circuit, the signal "MAGNETO-SENSE" may be connected to the engine magneto through a filter composed of components R33 and C20. Components R36, R24, C15 may provide additional noise filtering of the magneto primary signal. Diode D10 may protect the base of transistor Q12 from reverse voltages (e.g., the large negative pulse is rejected by D10). Resistor R40 provides a slight positive bias to the base of transistor Q12 for additional ground noise immunity. Transistor Q12 may recognize the dual positive pulses of the "MAGNETO-SENSE" signal. This transistor may still be somewhat responsive to noise so it's output may be filtered by the combination of R20/C14. The dual positive pulses may also filtered by a firmware/hardware within the processor. Positive pulses that are too narrow or too wide may be rejected by the processor. For example, the processor may measure the time between pulses, and if the time is either too short or too long it is also rejected. The time between the positive pulse pairs is used to calculate engine RPM. For example, signal "RPM" pulses twice per engine spark plug firing. The processor may measure the time between these pulse pairs in order to calculate engine rpm. Test point "RPM" allows probing of real-time engine RPM.

Figure 23:
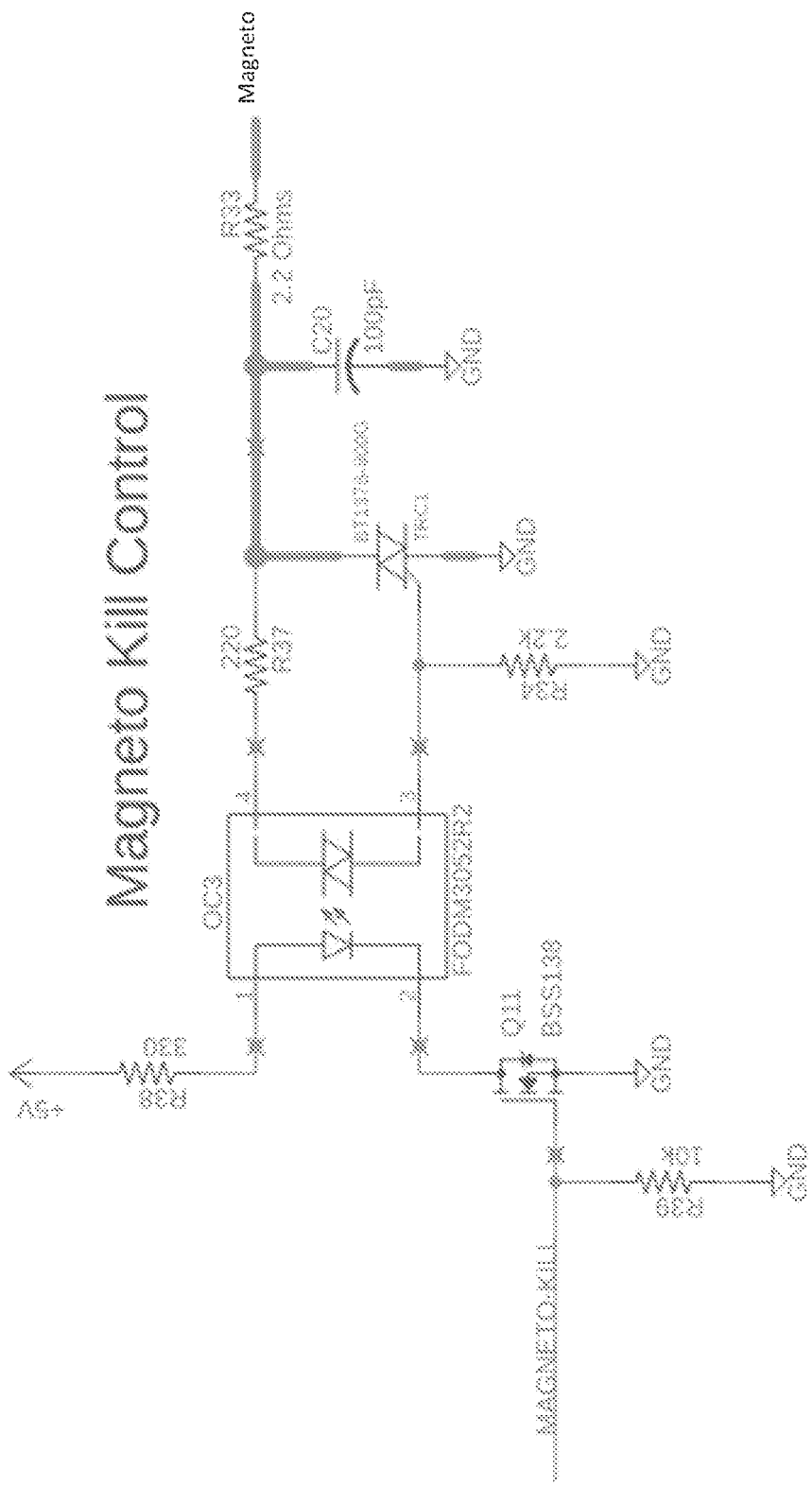
FIG. 23 is an illustrative example embodiment of a magneto kill control circuit.

During the operation of the pressure washer system, the control module may stop the engine (e.g., for safety reasons and/or because high pressure output is no longer requested by the user, e.g., as indicated by a no-flow condition through the pump). In an illustrative example embodiment, control module may shut down the engine via a magneto kill control circuit, as shown in FIG. 23. In the illustrated circuit, a running engine may be shut down by shorting out the magneto to prevent spark delivery to the engine. This is accomplished by activating the signal "MAGNETO-KILL" from the processor. The engine shutdown control or the magneto kill circuit uses a TRIAC, TRC1, to short out the magneto primary and prevent the engine spark plug from firing. As is generally known, commonly, and economically available TRIACs may be extremely difficult to trigger, particularly in quadrants 2 and 4 (gate trigger currents flowing opposite from the main TRIAC current). By using an opto-TRIAC, OC3, to trigger TRC1 two benefits may be achieved. First the gate current may always be in the same direction as the main TRIAC TRC1 current (quadrants 1 and 3), allowing for easy triggering. Second the opto-TRIAC may provide an additional layer of isolation between the magneto (very electrically noisy) and the low voltage digital electronics in the control module. Further, the opto-TRIAC may represent a relatively low cost approach for effectively triggering TRC1. When the magneto-kill signal is active the opto-TRIAC, OC3, is on and the main TRIAC, TRC1, is triggered and the magneto is shorted, preventing engine spark. For example, components R38, OC3, Q11, and R39 may supply in-phase gate current to TRIAC TRC1. If OC3 is on gate current is supplied to the TRIAC thru R37 during the beginning of a positive or negative magneto pulse. Once TRC1 is triggered on it will remain on for the duration of that positive or negative pulse, effectively shorting out the magneto and preventing engine operation. TRC1 may be prevented from false dv/dt triggering by filter C20 and R33 and the very high dv/dt rating of TRIAC TRC1 (e.g., >200 v/uS). R33 also provides some peak current limiting during magneto shut down.

Figure 24:
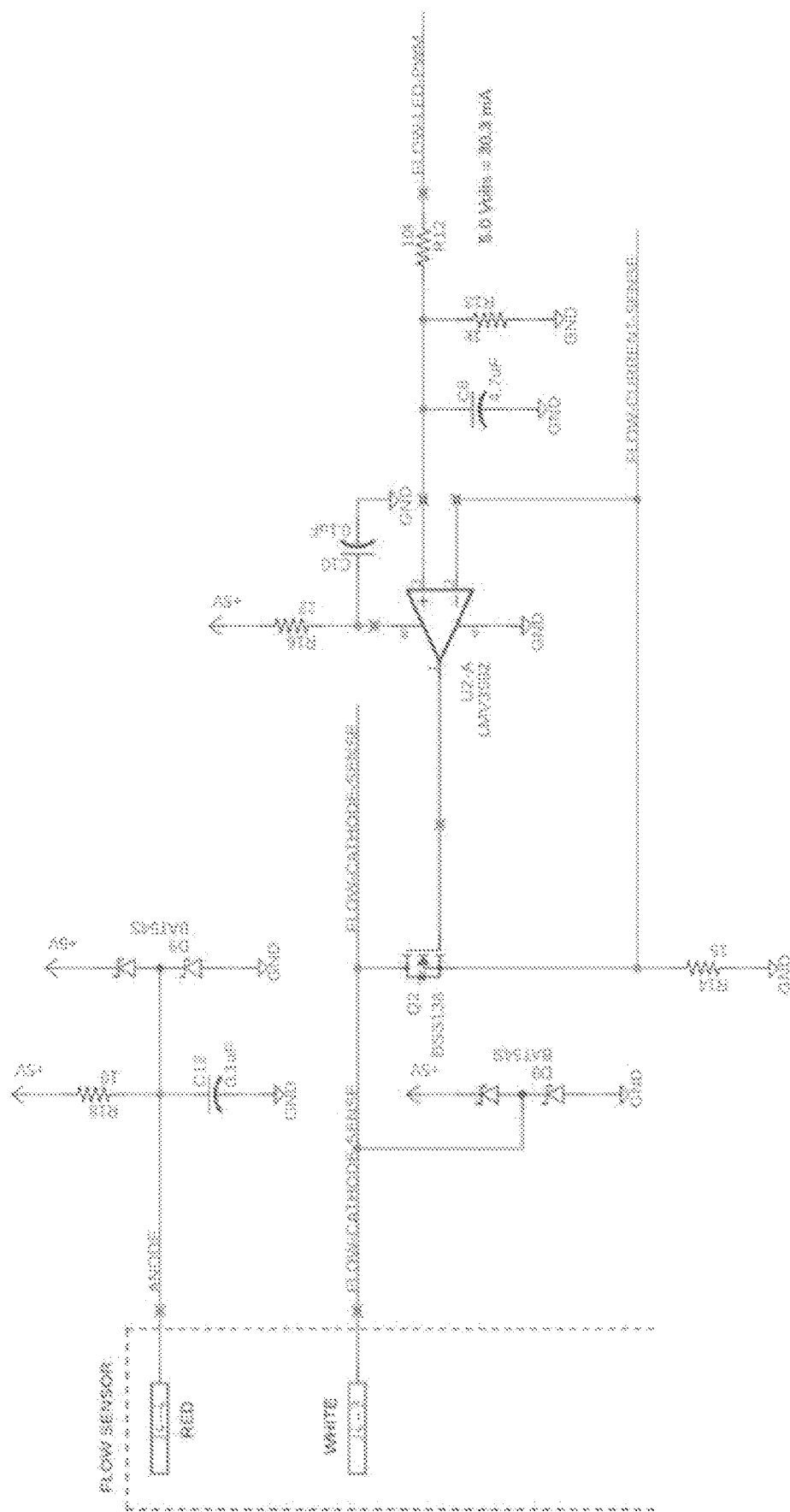
FIG. 24 is an illustrative example embodiment of a flow sensor LED current control circuit.

As discussed above, e.g., with reference to the flow sensor calibration module, the drive current to the optical transmitter may be controlled, at least in part, to achieve a desired output and/or output range from the optical receiver. Referring to FIG. 24, an illustrative embodiment of a flow sensor LED current control circuit is depicted, which may allow the current of the optical transmitter to be controlled. Consistent with the depicted example circuit, the drive current applied to the optical transmitter may be controlled by a firmware/software algorithm executed by the processor. Additionally, the circuit may provide various safety advantages. For example, the circuit may take the signal "FLOW-CATHODE-SENSE" and may check the voltage across the optical transmitter (e.g., which may include an LED) to ensure that it is proper (e.g., is within a predetermined range). As such, the signal "FLOW-CATHODE-SENSE" may allow a broken cable to the flow sensor to be determined. For example, if the intended drive voltage to the optical transmitter is 1.5 volts, a variation in the voltage of more than 0.5 volts may indicate a cabling or component problem. It will be understood that the specified drive voltage and variance threshold are intended for example purposes only, and that any suitable drive voltage and variance range may be utilized, and that the drive voltage may be asymmetric (e.g., a different low variance and high variance may be utilized). Additionally, by setting a desired drive current for the optical transmitter, and actually sensing the drive current experienced by the optical transmitter, any discrepancy (outside of a threshold range) may be indicative of a problem with the cabling and/or components associated with the flow sensor and/or the flow sensor current control circuit. Consistent with various embodiments, the drive current to the optical transmitter may be continuously and/or intermittently evaluated (e.g., every 5 milliseconds, and/or any other suitable predetermined time interval). As with any other detected problems or unexpected states with any aspects of the control module, such a detected possible problem may result in an action by the control module (e.g., via hardware and/or firmware/software executed by the processor), such as transitioning to a fault state, shutting down the engine, shutting down the control module, or the like. It will be appreciated that the action taken by the control module may vary depending upon the nature of the detected possible problem.

With specific reference to the example flow sensor LED current control circuit of FIG. 24, the flow sensor led current may be set by signal "FLOW-LED-PWM". This PWM signal is generated by the processor. In a particular illustrative example, the PWM signal may have a frequency of 2.0 kHz, however any suitable frequency may be utilized. The duty cycle of this signal is converted to a DC voltage by filter R12, R13, and C8. This voltage may be compared to the actual flow sensor led current generated by the voltage across R14. Op-amp U2-A will raise its output voltage if the LED current is to low or lower its output voltage if the LED current is too high. If the gate voltage of transistor Q2 is raised then it will raise its source/drain current and hence the flow sensor LED current. In this way the LED current may be maintained directly proportional to only the duty cycle of the signal "FLOW-LED-PWM".

As generally discussed above, the voltage across the flow sensor LED may be read by the processor through signal "FLOW-CATHODE-SENSE" and the current through the flow sensor LED may be read by the processor through signal "FLOW-CURRENT-SENSE". These signal may be used to detect a faulty flow sensor LED or cable failures to the flow sensor LED. Components R18, C12, D9 and D8 may provide additional noise and spike protection for the flow sensor LED current circuit.

Figure 25:
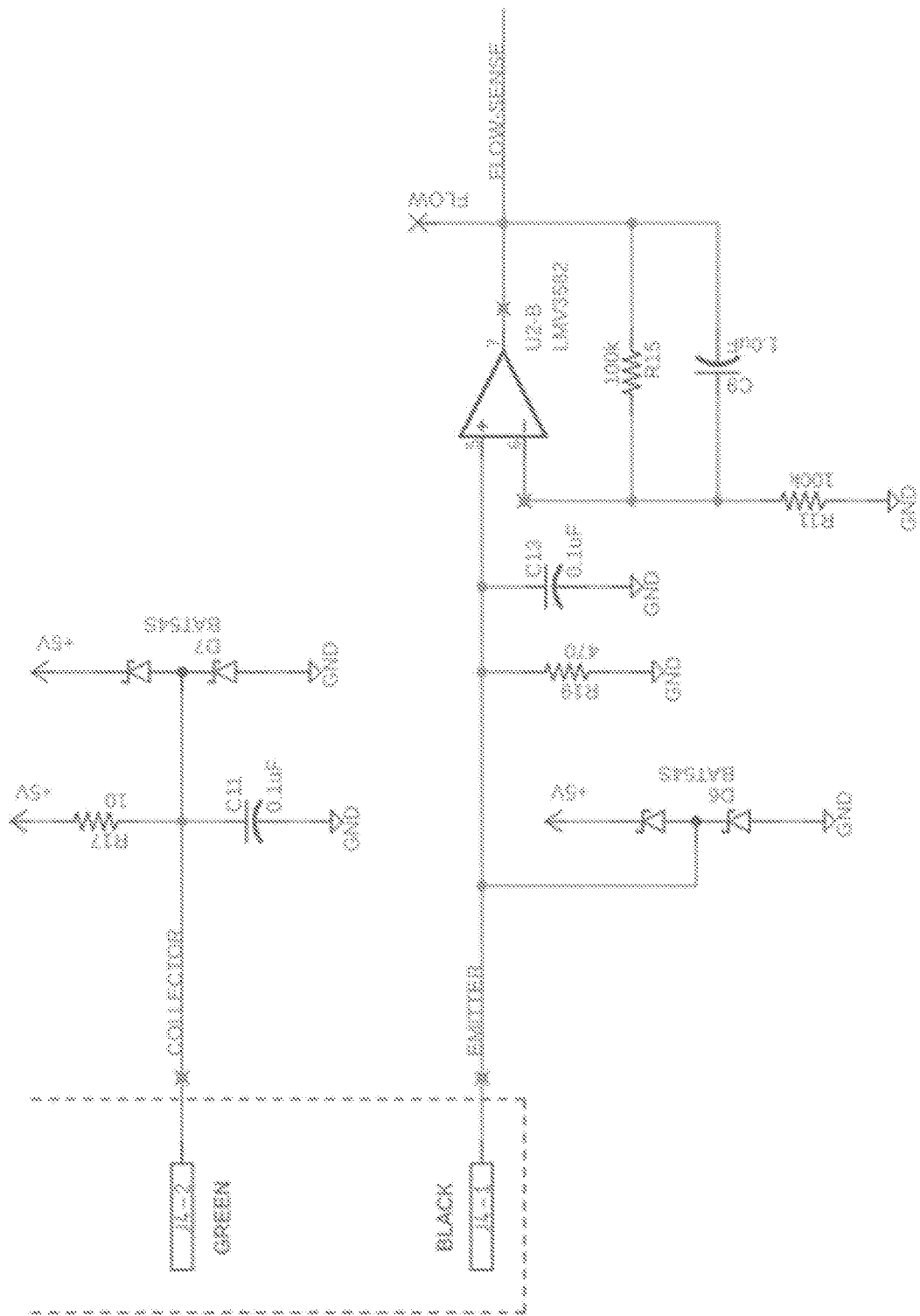
FIG. 25 is an illustrative example embodiment of a flow sensor phototransistor current sense circuit.

As also previously discussed, the output of the flow sensor optical receiver may be monitored, e.g., to determine a flow condition or a no-flow condition through the flow sensor. Additionally, the output may be evaluated to determine, for example, a degradation of the optical pathway through the flow sensor, cloudy water passing through the flow sensor, a degradation of any of the components associated with the flow sensor (e.g., components associated with controlling the drive power to the optical transmitter and/or components associated with receiving and/or analyzing the output of the optical receiver, or the like). Referring to FIG. 25, and illustrative example embodiment of a flow sensor phototransistor current sense circuit is shown (e.g., for use with a phototransistor as an optical receiver). Consistent with the depicted circuit, the current through the flow sensor phototransistor may be proportional to the light it receives and hence an indication of flow. The flow sensor phototransistor current may be sensed by resistor R19. This signal is filtered initially by capacitor C13. The voltage across R19 is amplified by op-amp U2-B. Resistors R11 and R15 provide a fixed gain (e.g., of 2 in the example embodiment, however other suitable gain factors may be utilized) and capacitor C9 provides additional signal filtering for the flow sensor signal. The processor may sample the flow sensor phototransistor current by reading signal "FLOW-SENSE". Components R17, C11, D7 and D6 may provide additional noise and spike protection for the flow sensor photo-transistor sense circuit. A test point "FLOW" may allow probing of real-time flow sensor operation.

In some embodiments, the control module may be configured to control the engine speed of the engine, for example, via a control actuator (e.g., a stepper motor, a servo motor, or other suitable actuator) capable of adjusting the throttle of the engine. Further, in some embodiments, the control module may adjust the throttle in conjunction with the sensing the engine speed to achieve a desired engine speed. Accordingly, in some embodiments the control module may provide digital throttle control and/or digital governing. In some embodiments, the engine speed may be controlled based upon the mode of operation of the pressure washer system. For example, when the pump is a positive displacement pump, the engine speed may be increased to increase the flow rate through the pump and may be decreased to decrease the flow rate. Further, controlling the throttle may be utilized to improve the overall user experience. For example, when high pressure water is not being requested by the user (e.g., there is not flow through the pump because the user is not depressing the trigger of the spray gun), but the engine is running, the engine may be throttled down, which may decrease fuel consumption, decrease noise, and decrease exhaust production.

Figure 26:
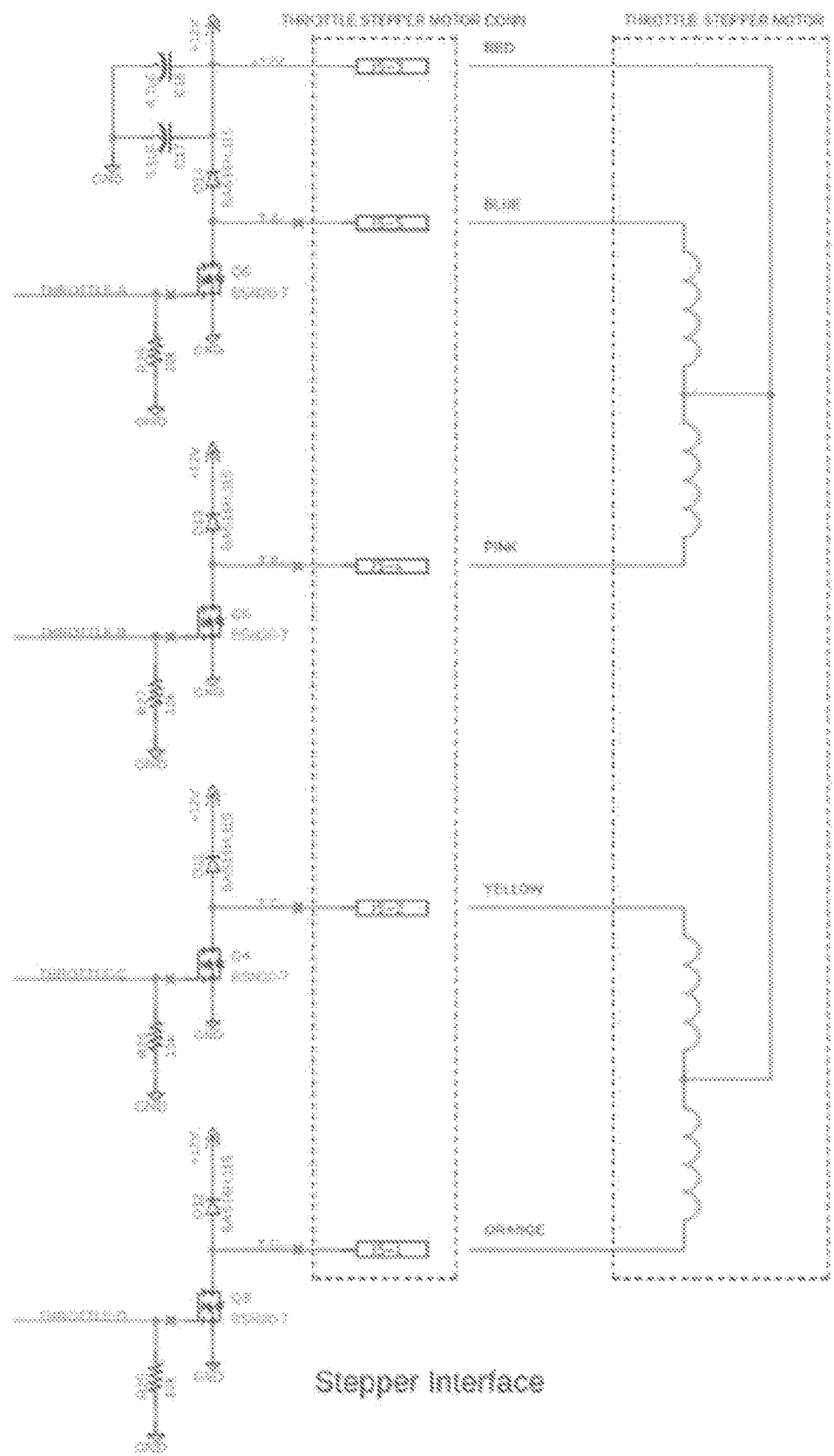
FIG. 26 is an illustrative example embodiment of a throttle stepper motor control circuit.

Referring to FIG. 26, an illustrative example embodiment of a throttle stepper motor control circuit is depicted, e.g., as may be used in an embodiment in which the throttle actuator is a stepper motor. In the depicted circuit, the throttle stepper motor control circuit is composed of 4 identical phase drivers, A, B, C, and D. The processor may activate the 4 phases in sequence to cause the stepper motor to rotate clockwise or counter clockwise thru signals "THROTTLE-A", "THROTTLE-B", "THROTTLE-C", "THROTTLE-D" Each phase may be controlled by an individual transistor, Q3-Q6, when the transistor in on, current flows from the +12V supply through the stepper motor phase winding, and then through the control transistor. Recirculating diodes D11-D14 are provided for each stepper motor phase winding to prevent return spikes. The power supply filtering may be provided by capacitors C16 and C17. In one embodiment, the phase cycle time is 5 milliseconds, however, any suitable predetermined cycle time may be utilized.

Figure 27:
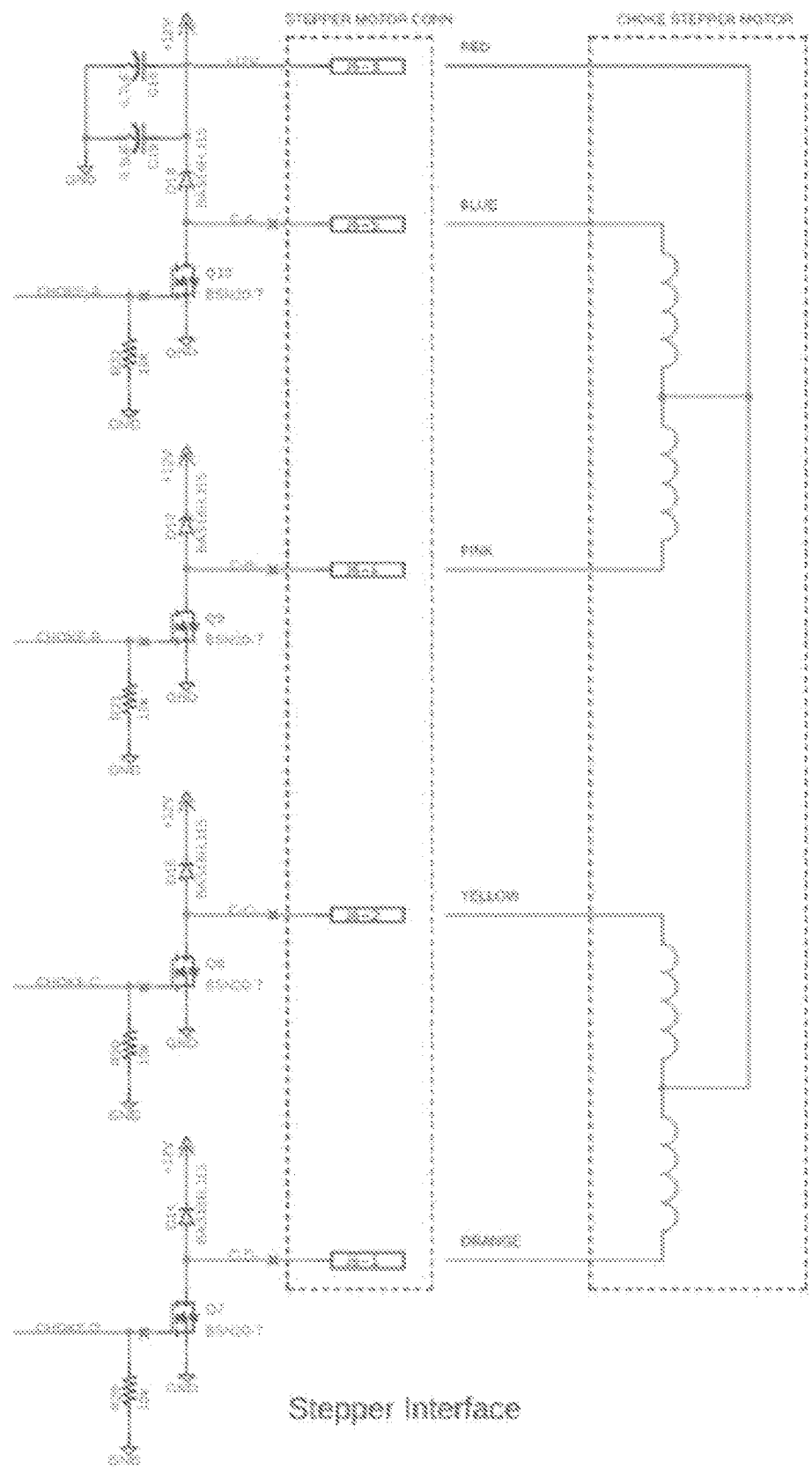
FIG. 27 is an illustrative example embodiment of a choke stepper motor control circuit.

As part of the engine starting operation, the control module may adjust the position of the engine's choke. In a similar manner as the throttle control, various actuators may be used for adjusting the position of the choke, such as a stepper motor, a servo motor, a solenoid, or the like. In an illustrative example embodiment, the control module may adjust the position of the choke using a stepper motor. Consistent with such an embodiment, the stepper motor may be controlled by a choke stepper motor control circuit, as depicted in the example circuit of FIG. 27. In general, the depicted circuit, the choke stepper motor control circuit is composed of 4 identical phase drivers, A, B, C, and D. The processor may activate the 4 phases in sequence to cause the stepper motor to rotate clockwise or counter clockwise thru signals "CHOKE-A", "CHOKE-B", "CHOKE-C", "CHOKE-D" Each phase may be controlled by an individual transistor, Q7-Q10, when the transistor in on, current flows from the +12V supply through the stepper motor phase winding, and then through the control transistor. Recirculating diodes D15-D18 may be provided for each stepper motor phase winding to prevent return spikes. The power supply filtering may be provided by capacitors C18 and C19. The phase cycle time may be 5 milliseconds, however, any suitable predetermined cycle time may be utilized.

Figure 28:
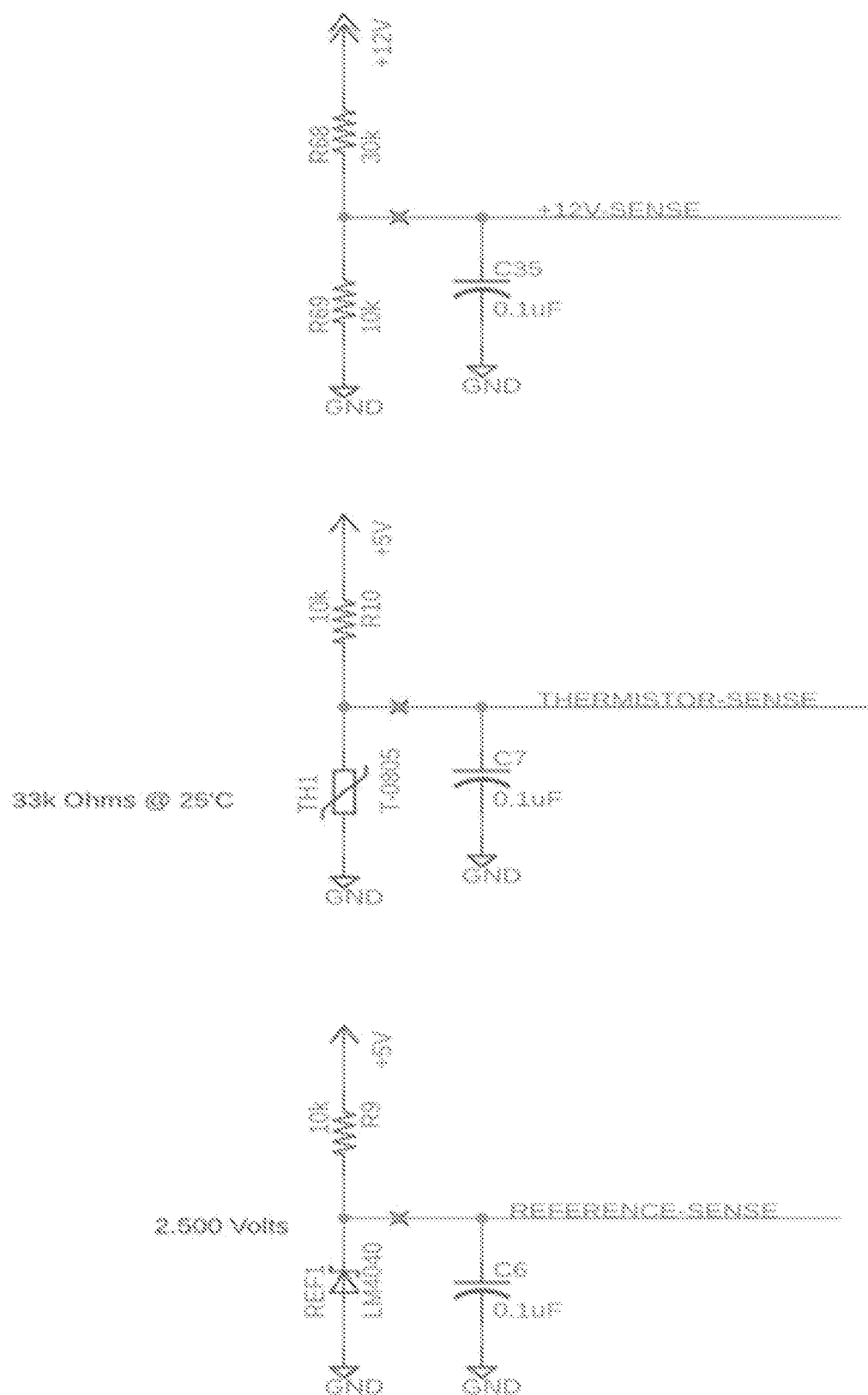
FIG. 28 is an illustrative example embodiment of a system support circuit.

In some embodiments, the control module may be configured to sense various internal activity or conditions within the control module. For example, and referring to FIG. 28, the control module may include a system support circuit. In part, the system support circuit may monitor the voltage on the 12 volt rail of the control module to ensure that the appropriate voltage is present. In the event that the voltage of the 12 volt rail is out of range, the control module may, for example, enter a fault state, disable certain functions of the pressure washer system, shut down the control module, or the like. In the example circuit of FIG. 28, components R68, R69, and C35 allow the processor to sense the +12 volt power supply level. In some embodiments, the control module may also monitor a temperature of the control module (e.g., of the PCB 42, within the control module housing 18, or otherwise adjacent to the control module. Similar to the 12 volt rail sense, in the event that the temperature of the control module is out of range, the control module may, for example, enter a fault state, disable certain functions of the pressure washer system, shut down the control module, or the like. In the example system support circuit, components R10, TH1, and C7 allow the processor to sense the on-board thermistor TH1 to determine the PCB temperature. Further, in some embodiments, the system support circuit may monitor an external reference voltage. For example, in the illustrated circuit of FIG. 28, components R9, REF1, and C6 may allow the processor to sense the precision of the on-board 2.500 volt reference. This reference voltage may be checked by firmware/software against the processor internal voltage reference to assure functionality. In the event that the external reference voltage is out of range, the control module is out of range, the control module may, for example, enter a fault state, disable certain functions of the pressure washer system, shut down the control module, or the like. It will be appreciated that while the illustrative example system support circuit is configured to sense the 12 volt rail, the control module temperature, and the external reference voltage, in some embodiments, each of the function may be provided by a separate circuit.

Figure 29:
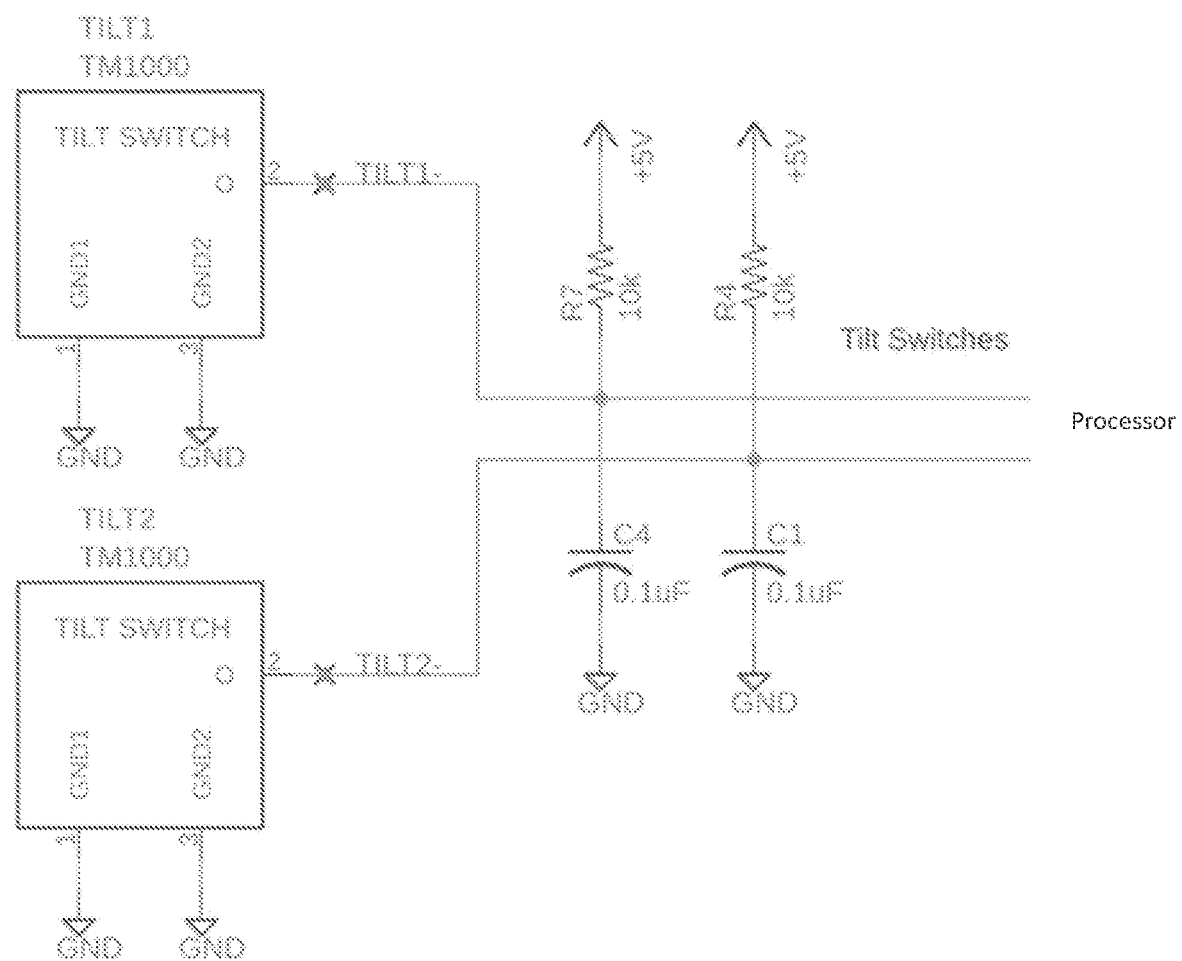
FIG. 29 is an illustrative example embodiment of a tilt sensor circuit.

In some embodiments, the pressure washer system may be equipped with one or more tilt sensors. The tilt sensors may determine and absolute tilt angle of the pressure washer system and/or may determine if the pressure washer system tilts beyond a predetermined threshold tilt angle. For example, in an illustrative example embodiment, the control module may include two tilt sensors arranged on the x-y axis of the pressure washer system (e.g., on the horizontal axes) that may indicate if the pressure washer tilts beyond 45 degrees (and/or any other suitable predetermined threshold angle), for example as a result of being tipped over. It will be appreciated that if the pressure washer system tilts beyond the threshold angle, safe operation of the pressure washer. If a tilt angle beyond the threshold angle is detected, the control module may, for example, prevent the engine from being started, may enter a fault state, and/or take other action. Referring to FIG. 29, an illustrative example embodiment of a tilt sensor circuit is depicted. As shown, the example tilt sensor circuit may include two tilt sensors that may provide an output indicative of the tilt angle and/or if the tilt angle exceeds a predefined threshold.

As is generally know, tilt sensors may be susceptible to vibration. For example, excessive vibration may make the tilt sensors susceptible to providing inaccurate and/or false indications of the tilt angle. Such vibration may occur, for example, when the engine is running. Accordingly, in an embodiment, the processor may disregard the tilt sensor inputs (and/or may turn off the tilt sensor circuit) when the engine is running. As such, the processor may not act on (and/or may not receive) signals from the tilt sensors when the engine is running and the tilt angle indications from the tilt sensors may not be reliable. When the engine stops running, the processor enable the tilt sensors (e.g., may monitor and/or receive tilt angle indications from the tilt sensors). Consistent with such an implementation, it may be possible to effectively utilize economical tilt sensor, e.g., which may not be required to be tolerant of vibration such as may occur when the engine is running. In this manner, the processor may isolated the time/conditions when the tilt indication from the tilt sensor is likely to be reliable, thereby overcoming the limitations of the tilt sensors. In the event that the pressure washer system tips over while the engine is running, one or more of the flow sensor and an oil level sensor of the engine may detect the a fault condition, and may, therefore, at least minimize the amount of time that the engine may continue running when the pressure washer system is tipped over. Additionally, in some embodiments, the tilt sensors may be mounted on the PCB 42. In such a configuration, the tilt sensors may be positioned above the driveline of the engine and the fluid pump. Therefore, the tilt sensors may be positioned between the two heaviest components of the pressure washer system, which may provide an optimization of the center of gravity of the pressure washer system.

Figure 30:
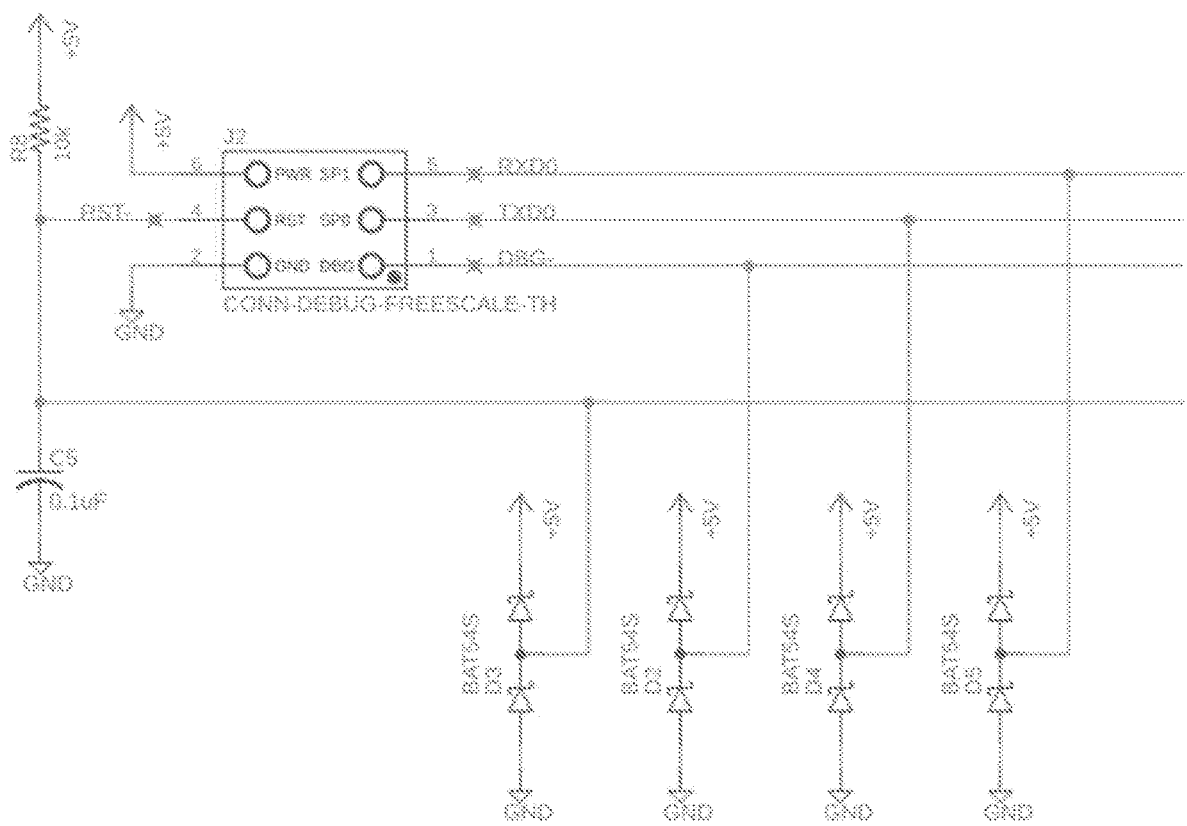
FIG. 30 is an illustrative example embodiment of a debug-programming-diagnostics interface.

Referring to FIG. 30, in an embodiment the control module may include a debug-programming-diagnostic interface. For example, in the depicted interface, connector J2 provides a debug, programing and diagnostic interface for the processor and system firmware/software. Diodes D2-D5 may provide improved spike protection for this interface. Components R8 and C5 may provide an extended system reset pulse when the control module is first powered up.

Figure 31:
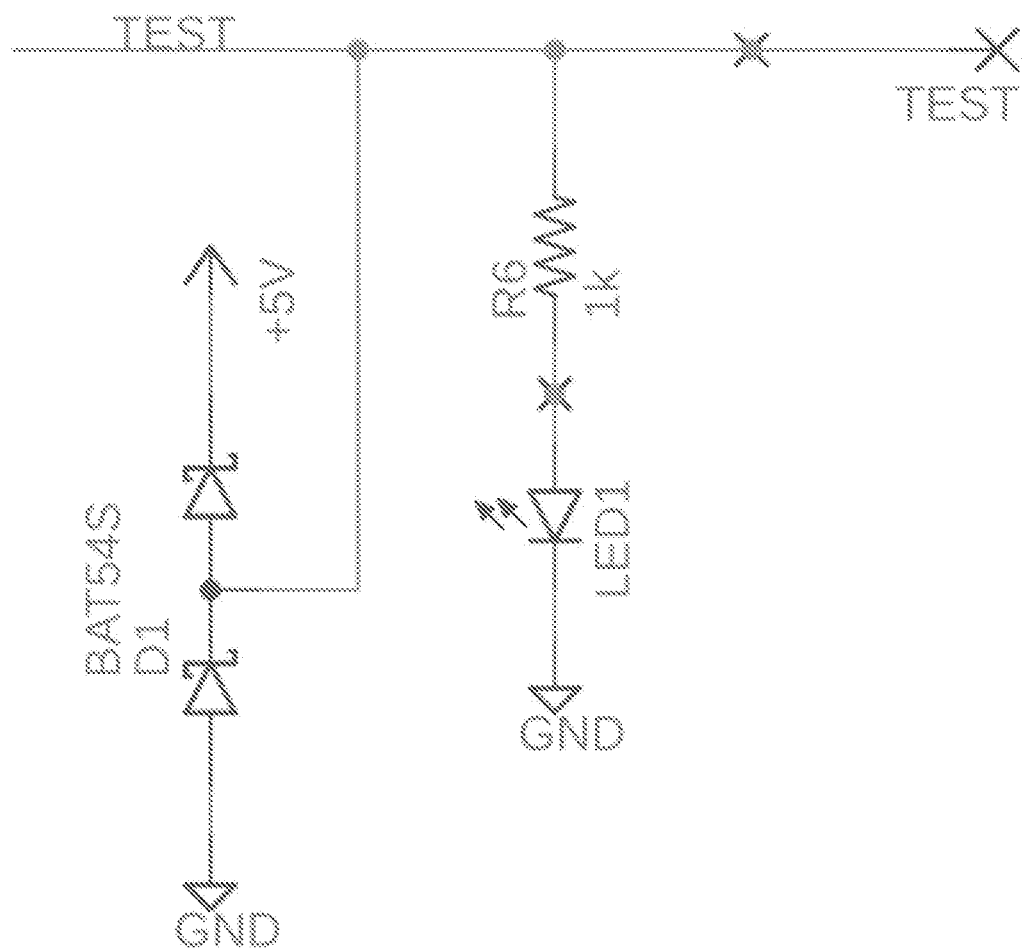
FIG. 31 is an illustrative example embodiment of a system test output circuit.

Referring to FIG. 31, in some embodiments, the control module may include a system test output. For example, the system test output may include an LED that may provide a user (and/or technician) perceptible indication of the status of the firmware/software. In this regard, the system test output may function as a health light that may be illuminated when the firmware/software is operating properly. In one example embodiment, the LED may be turned on at the beginning of an analysis cycle (e.g., a firmware/software self diagnostic routine) and may turn off at the end of the analysis cycle. In an embodiment, the analysis cycle may occur every 5 milliseconds (and/or any other predetermined time interval). Accordingly, if the LED is brightly illuminated a problem may be inferred (e.g., as it may indicate that the analysis cycle cannot be completed). Similarly, if the LED is not illuminated a problem may be inferred (e.g., as it may indicate that the processor is not properly entering the analysis cycle according to the predetermined time period). In the depicted example circuit, components R6 and LED1 provide a visual indication that the control module is operating properly. The point labeled "TEST" provides a 200 Hz PWM duty cycle output (and/or other suitable predetermined duty cycle output) that is proportional to processor firmware/software execution. When this signal is high the processor is executing firmware/software code. When this signal is low the firmware/software is waiting for the next timer interrupt.

Figure 32:
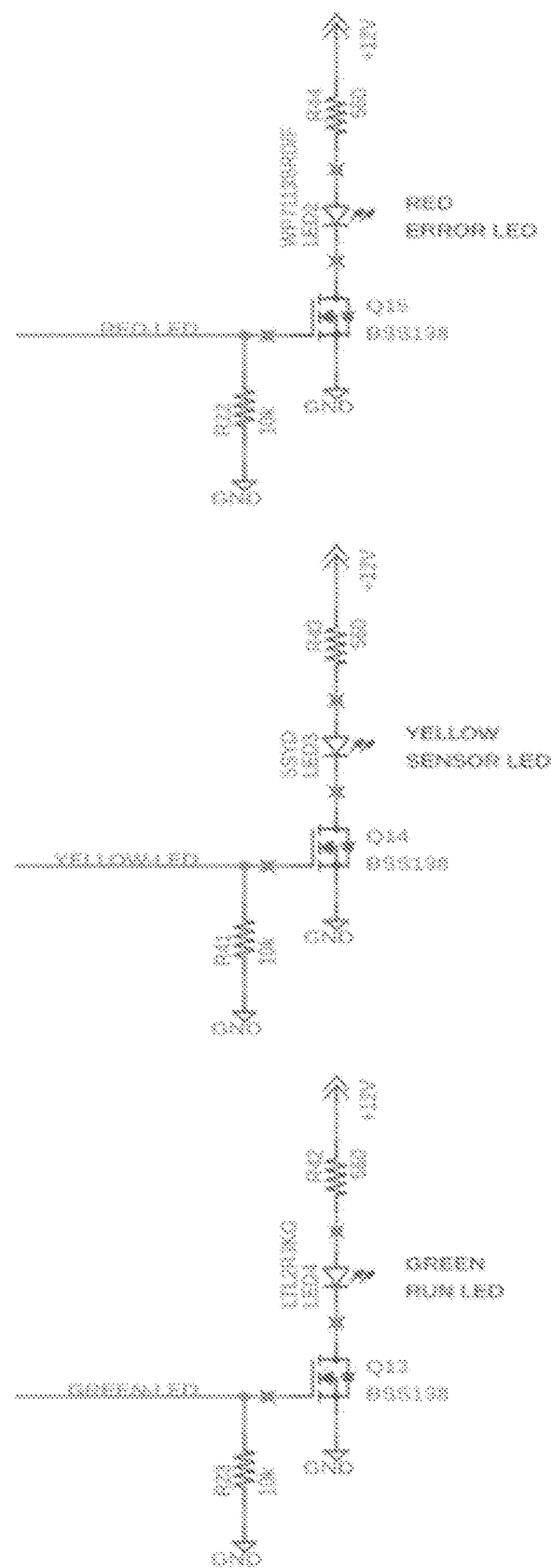
FIG. 32 is an illustrative example embodiment of a LED indicator circuit.

As generally discussed above, the control module may include one or more user interface indicators, which may provide a user perceptible indication of the status of the pressure washer system, an operational state of the pressure washer system, and/or other information regarding the pressure washer system and/or the control module. The user interface indicators may include, but is not limited to, a single LED that may change colors to provide different indications, a single LED that may blink at different rates (including remaining continuously lit) to provide different indicators, a plurality of LEDs (having the same color and/or different colors) that may individually, in defined groupings, and/or collectively be associated with different indicators, an LCD display that may provide various indications, and the like. Referring to FIG. 32, in a particular illustrative embodiment, the control module may include three LEDs having different colors and capable of blinking at different rates (including remaining continuously lit) for providing different indicators. For example, components LED2, LED3, and LED4 may provide the user with various indications of system status. The Green LED2 may provide an indication of idle vs. run states. The Yellow LED3 may provide an indication of flow sensor status. The Red LED4 may provide an indication of fault status. These LEDs may be driven by transistors Q13, Q14 and Q15. Further, the LEDs may be fully, and/or at least partially, under processor firmware/software control. As such, the behavior and indications provided by the LEDs may be programmatically defined.

In the foregoing description, various operations have been discussed including illustrative example timing values, attempt values and the like. Examples of such values may include, but are not limited to: a delay between detection of flow through the pump and initiation of engine start, a number of historical measurements/operation cycles associated with calibration of the flow sensor, a sampling rate of the output of the optical receiver, an interval for increasing the drive power to the optical transmitter, current and voltage values and/or ranges associated with the flow sensor, control button press times for effectuating different operations and/or actions of the control module, a time delay for the control module to enter a sleep or an off state, a number of start attempt before entering a fault mode, a time between consecutive start attempts, a time between detection of no-flow and engine shut down, a time for which the starter is energized before determining a failure to start, a time over which the starter PWM duty cycle is ramped up during a starting operation, an initial and a final duty cycle of the starter PWM signal, a duty cycle frequency of the starter PWM signal, a sampling frequency of the starter current, etc. It will be appreciated that any and all such disclosed values, and any additional disclosed values, are set forth for the purpose of illustration, and are not intended as limitations of the present disclosure, as other suitable values may be utilized. Further, such values may be defines and/or implemented as needed and/or desired. The values may be defined, e.g., in firmware/software, in hardware, or the like, and may be varied according to preference, need, and/or system specifications.

While various embodiments have been described herein, including features and combinations of features, it will be appreciated that a pressure washer system may be provided consistent with the present disclosure that incorporates various combinations of elements and features described across the many embodiments, and/or that may incorporate additional and/or alternative elements and features and/or combinations of elements and features. As such the embodiments should be understood as describing possible features, objectives, and advantages of the present disclosure, and are intended for illustrative purposes only. Further, the elements, features, and concepts of the present disclosure are susceptible to modification and variation, as will be appreciated by those having skill in the art. As such, the scope of the present invention should not be construed as limited to any of the described embodiments, but rather only be the appended claims.

What is claimed is:

1. A pressure washer system comprising:
   a fluid pump having a fluid inlet and a fluid outlet;
   a flow sensor in fluid communication with one of the fluid inlet and the fluid outlet, wherein the flow sensor comprises
      a sensor chamber having a fluid inlet associated with a lower region of the sensor chamber and a fluid outlet associated with an upper region of the sensor chamber to define a fluid pathway through the sensor chamber;
      a blocking element disposed within the sensor chamber, the blocking element resting adjacent the lower region of the sensor chamber in a no-flow condition and raised toward the upper region of the sensor chamber during flow of fluid through the sensor chamber; and
      a sensing assembly including an optical transmitter and an optical receiver defining an optical pathway through the sensor chamber, the blocking element at least partially obstructing the optical pathway in the no-flow condition and the blocking element at least partially outside of the optical pathway during flow of fluid through the sensor chamber;
   an internal combustion engine in driving communication with the fluid pump; and
   a control module mounted to the fluid pump, the control module configured to receive an indication of flow through the fluid pump and to control a starting operation of the internal combustion engine to start the internal combustion engine in response to receiving the indication of flow through the fluid pump when the internal combustion engine is not running.

2. The pressure washer system according to claim 1, wherein the control module is mounted to the fluid pump by one or more vibration isolating members.

3. The pressure washer system according to claim 2, wherein the one or more vibration isolating members include respective rubber bushings attached to a control module mounting bracket about an exterior of the rubber bushings, and a compression sleeve extending through a generally central portion of the rubber bushings for receiving fasteners affixing the control module mounting bracket to the fluid pump.

4. The pressure washer system according to claim 1, wherein the control module is disposed within a cavity of a control module housing, the control module housing further comprising a battery interface for removably mechanically coupling a battery to the control module housing, and removably electrically coupling the battery to the control module.

5. The pressure washer system according to claim 1, wherein the upper region of the sensor chamber includes one or more channels to facilitate passage of fluid through the fluid outlet of the sensor chamber during flow of fluid through the sensor chamber.

6. The pressure washer system according to claim 1, wherein the blocking element has a specific gravity of between about 1.09 to about 1.20.

7. The pressure washer system according to claim 1, further comprising a sensor calibration module configured to:
   provide power to the optical transmitter causing the optical transmitter to generate an optical signal based upon the power;
   measure an output of the optical receiver in response to receiving the optical signal; and
   adjust the power to the optical transmitter to achieve the output of the optical receiver having one or more of a predefined threshold and a predefined threshold range.

8. The pressure washer system according to claim 7, wherein the sensor calibration module is configured to adjust the power to the optical transmitter based upon, at least in part, historically measured outputs of the optical receiver in response to receiving the optical signal.

9. The pressure washer system according to claim 7, wherein the control module comprises the sensor calibration module.

10. The pressure washer system according to claim 1, wherein the control module comprises a processor and a memory coupled with the processor, the processor configured to execute computer program code comprising instructions for:
    monitoring one or more system characteristics;
    defining a plurality of discrete operating states of the pressure washer system; and
    transitioning the pressure washer system between the plurality of discrete operating states based upon, at least in part, one or more of the one or more system characteristics, and one or more user interactions with the pressure washer system.

11. The pressure washer system according to claim 10, wherein the one or more system characteristics include one or more of:
    flow through the flow sensor;
    engine speed of the internal combustion engine;
    battery voltage of a battery coupled with the control module;
    battery current of the battery coupled with the control module;
    ambient temperature of the control module; and
    temperature of the battery coupled with the control module.

12. The pressure washer system according to claim 10, wherein the plurality of discrete operating states comprise one or more of:
    an idle state;
    a ready state;

a run state;
an off state;
a fault state; and
an event state.

13. The pressure washer system according to claim 12, wherein the idle state defines a state during which the control module is powered, one or more self tests are performed, and is awaiting a user input indicating an intent to begin operation of the pressure washer system.

14. The pressure washer system according to claim 12, wherein the ready state defines a state during which the control module may start the internal combustion engine in response to receiving the indication of flow through the pump.

15. The pressure washer system according to claim 12, wherein the run state defines a state during which the internal combustion engine is running.

16. The pressure washer system according to claim 12, wherein the off state defines a state during which the control module is not actively controlling the pressure washer system.

17. The pressure washer system according to claim 12, wherein the fault state defines a state during which the control module has detected a failure of one or more tested operating conditions.

18. The pressure washer system according to claim 12, wherein the event state defines a state during which the control module has identified one or more actionable operating conditions.

19. The pressure washer system according to claim 1, wherein the control module is further configured to:
provide power to a starter associated with the engine as a pulse width modulated signal having a first duty cycle at a first time period; and
provide power to the starter as a pulse width modulated signal having a second duty cycle at a second time period, the second duty cycle being greater than the first duty cycle, and the second time period being after the first time period.

20. The pressure washer system according to claim 19, wherein providing the power at the second pulse width modulated duty cycle includes incrementally increasing the duty cycle over a period of time.

21. The pressure washer system according to claim 19, wherein the control module is further configured to measure a current of the power provided to the starter during one or more of the first time period and the second time period comprising:
sampling the current of the power provided to the starter at a sampling frequency substantially greater than a cycle rate of the pulse width modulated signal;
storing a sample of the current;
iteratively comparing a subsequent sample of the current to the stored sample of the current; and
if the subsequent sample of the current is greater than the stored sample of the current, storing the subsequent sample of the current and discarding the earlier sample of the current.

22. The pressure washer system according to claim 1, wherein the control module includes a tilt sensor, and the control module is configured to:
determine if the internal combustion engine is running;
disable the tilt sensor when the internal combustion engine is running; and
enable the tilt sensor when the internal combustion engine is not running;
wherein the control module is further configured to prevent starting of the internal combustion engine in response to the tilt sensor detecting a tilt angle greater than a predetermined threshold.

23. The pressure washer system according to claim 22, wherein:
disabling the tilt sensor includes one or more of not acting on a signal from the tilt sensor, and depowering the tilt sensor; and
enabling the tilt sensor includes one or more of acting on a signal from the tilt sensor, and powering the tilt sensor.

24. The pressure washer system according to claim 1, wherein the control module comprises:
an engine shutdown module configured to stop the internal combustion engine from a running state in response to a signal from a processor of the control module, the engine shutdown module comprising:
a TRIAC coupled with a magneto of the internal combustion engine to short the magneto to ground when the TRIAC is triggered; and
an opto-TRIAC configured to trigger the TRIAC in response to receiving the signal from the processor.

25. A pressure washer system comprising:
a fluid pump having a fluid inlet and a fluid outlet;
a flow sensor including:
a sensor chamber in fluid communication with one of the fluid inlet and the fluid outlet;
an optical transmitter and an optical receiver defining an optical pathway through the sensor chamber; and
a blocking element configured to be at least partially disposed within the optical pathway in the absence of fluid flow through the sensor chamber and to be at least partially removed from the optical pathway during fluid flow through the sensor chamber;
an internal combustion engine in driving communication with the fluid pump; and
a control module mounted to the fluid pump by one or more vibration isolating members, the control module configured to:
receive a flow signal from the optical receiver when the blocking element is at least partially removed from the optical pathway; and
initiate a starting operation of the internal combustion engine in response to receiving the flow signal when the internal combustion engine is not running.

26. The pressure washer system according to claim 25, wherein the control module is further configured to:
provide power to the optical transmitter causing the optical transmitter to generate an optical signal based upon, at least in part, the power;
measure an output of the optical receiver in response to receiving the optical signal; and
adjust the power to the optical transmitter to achieve the output of the optical receiver within a predefined range.

27. The pressure washer system according to claim 25, wherein, when the internal combustion engine is running, the control module is configured to shut down the internal combustion engine at a predetermined time after the flow signal is no longer being received.

28. The pressure washer system according to claim 25, wherein initiating the starting operation of the internal combustion engine comprises:
providing power to a starter associated with the internal combustion engine as a pulse width modulated signal having a first duty cycle at a first time; and incrementally increasing a duty cycle of the pulse width modulated signal to achieve a second duty cycle at a second time, the second time being after the first time.

29. The pressure washer system according to claim 25, wherein the control module includes a tilt sensor, and the control module is configured to:
   determine if the internal combustion engine is running:
   disable the tilt sensor when the internal combustion engine is running; and
   enable the tilt sensor when the internal combustion engine is not running;
   wherein the control module is further configured to prevent starting of the internal combustion engine in response to the tilt sensor detecting a tilt angle greater than a predetermined threshold.

30. The pressure washer system according to claim 25, wherein the control module comprises:
   a processor and a memory coupled with the processor, the processor configured to execute computer program instructions for:
      monitoring one or more system characteristics;
      defining a plurality of discrete operating states of the pressure washer system; and
      transitioning between the plurality of discrete operating states based upon, at least in part, one or more of the one or more system characteristics.

* * * * *